June 12, 1928.  1,673,278
A. DOW
VARIABLE SPEED POWER TRANSMISSION
Filed July 11, 1924   22 Sheets-Sheet 3

INVENTOR
Alexander Dow
BY F. H. Gibbs
ATTORNEY

June 12, 1928.  
A. DOW  
1,673,278  
VARIABLE SPEED POWER TRANSMISSION  
Filed July 11, 1924    22 Sheets-Sheet 5

Fig. 5.

INVENTOR  
*Alexander Dow*  
BY *F. H. Gibbs*  
ATTORNEY

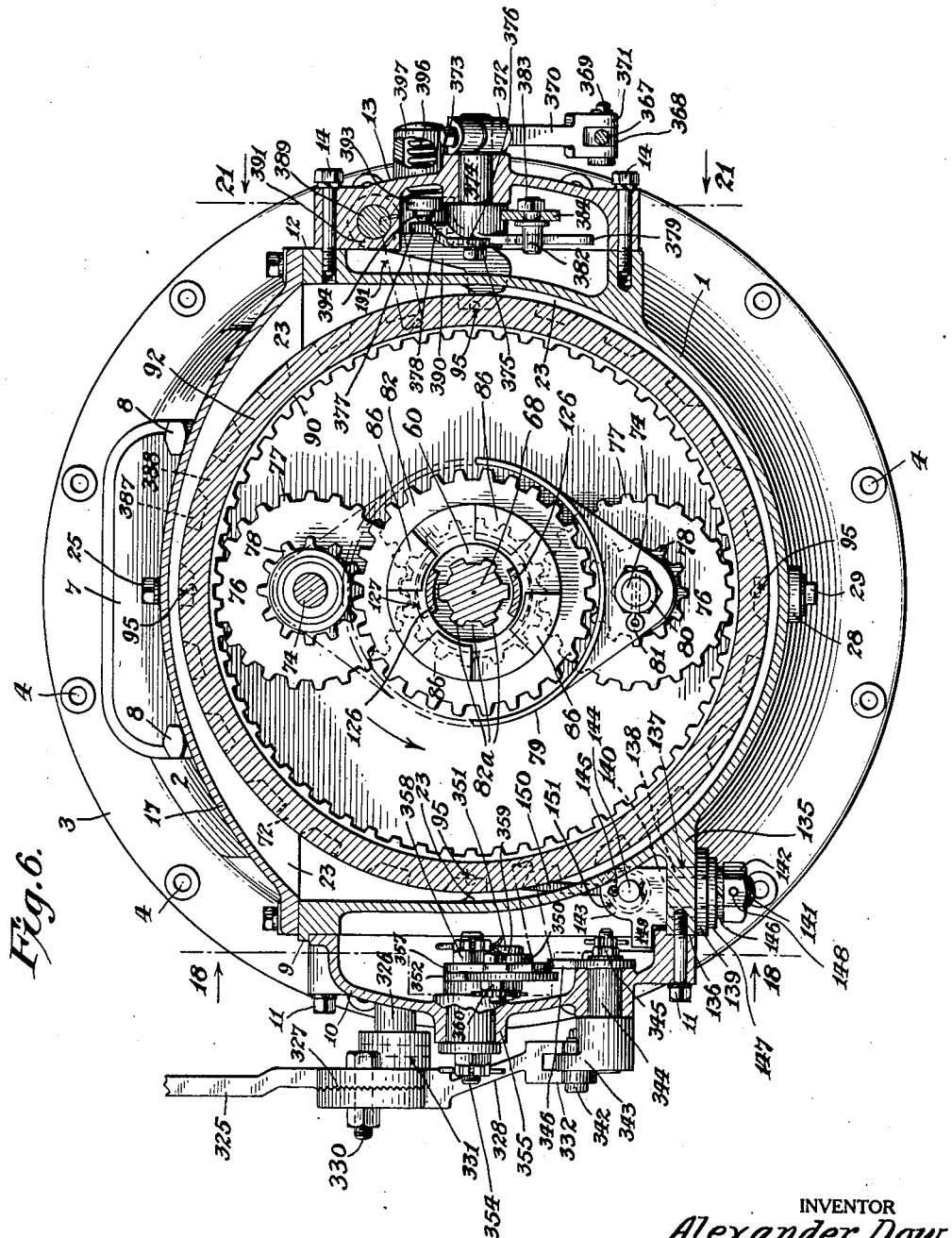

June 12, 1928.
A. DOW
1,673,278
VARIABLE SPEED POWER TRANSMISSION
Filed July 11, 1924     22 Sheets-Sheet 7
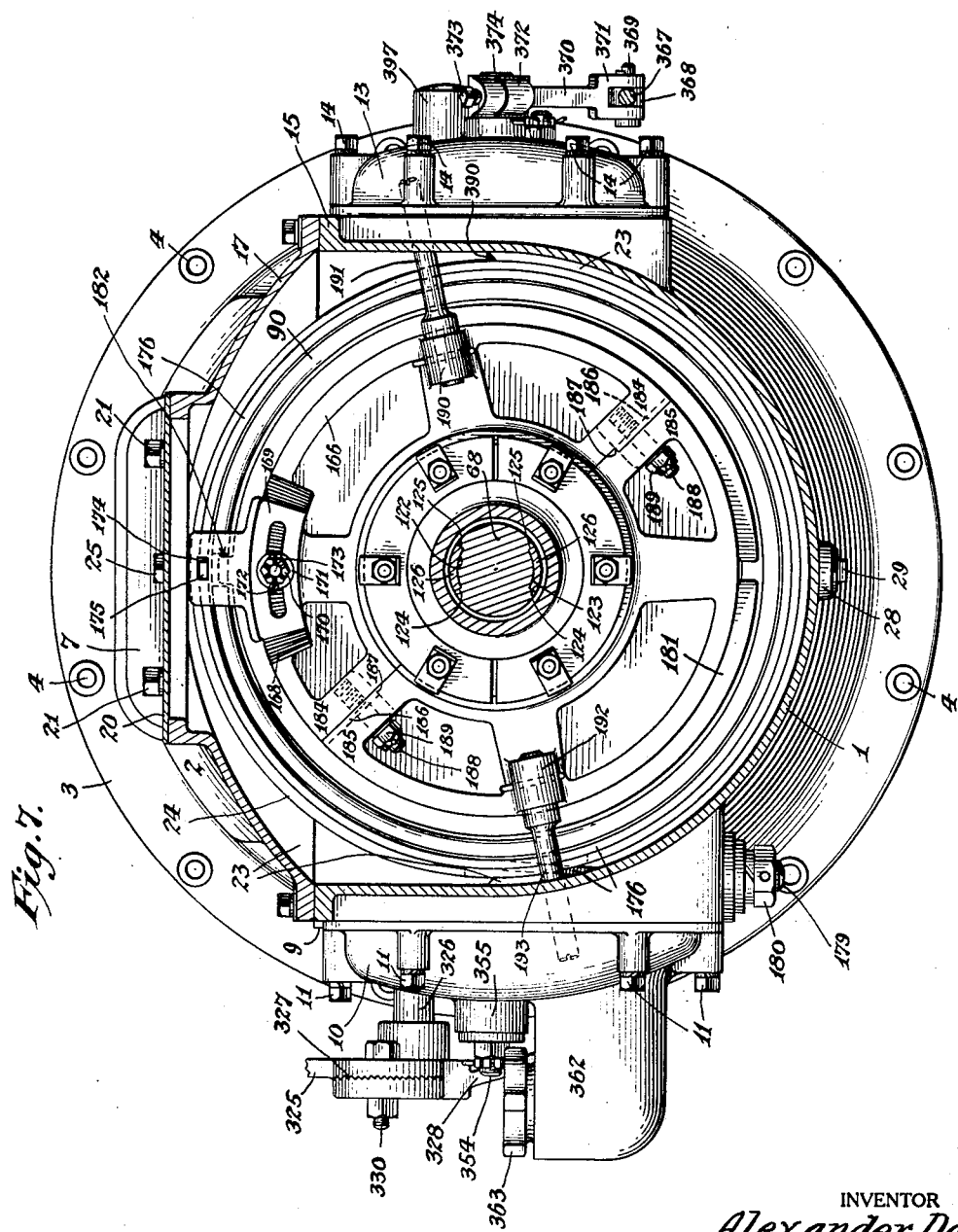
INVENTOR
*Alexander Dow*
BY
ATTORNEY

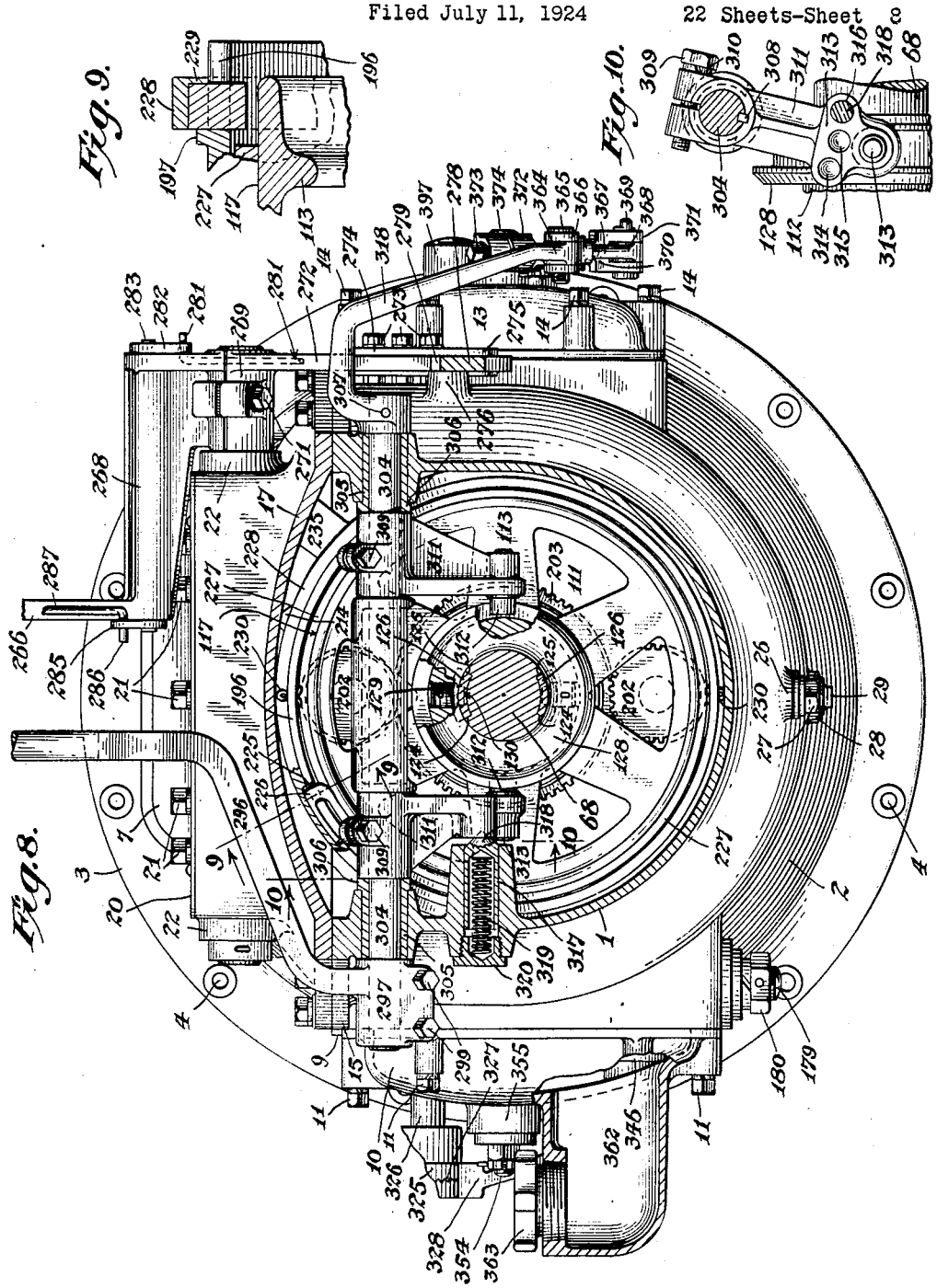

June 12, 1928.
A. DOW
1,673,278
VARIABLE SPEED POWER TRANSMISSION
Filed July 11, 1924 22 Sheets-Sheet 9
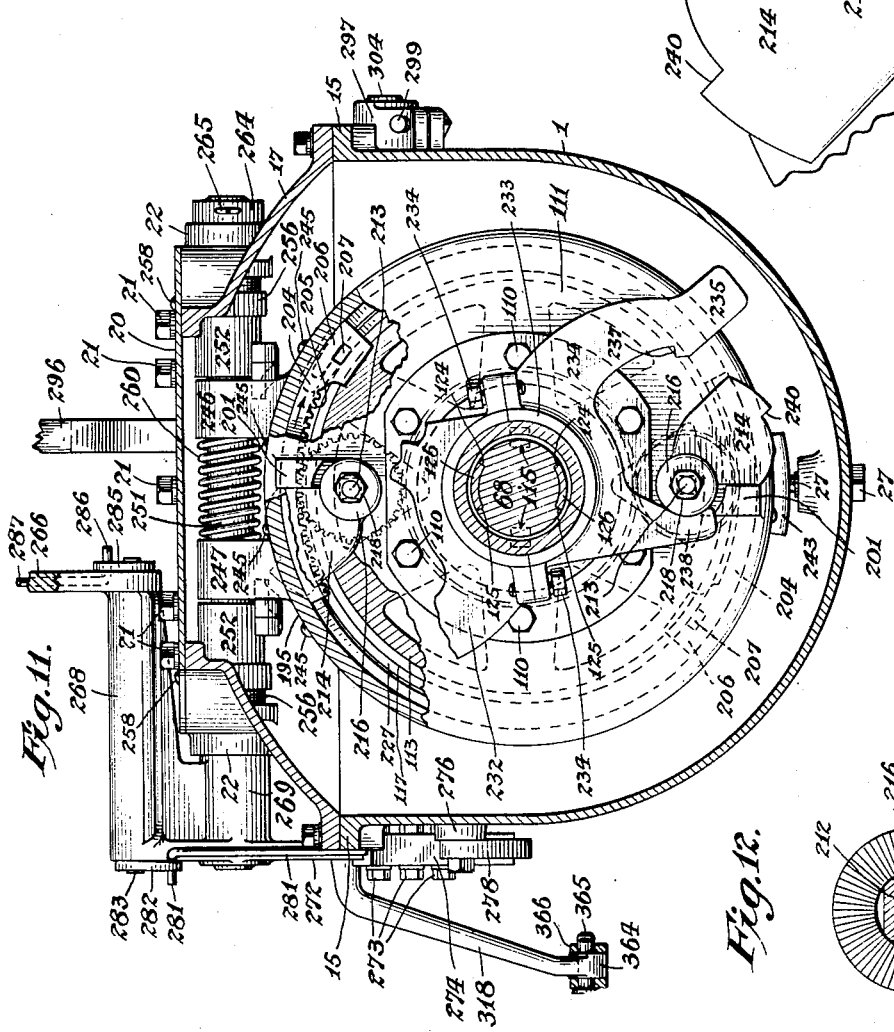
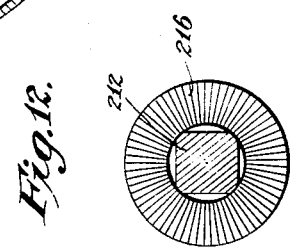
INVENTOR
*Alexander Dow*
BY *F. H. Gibbs*
ATTORNEY

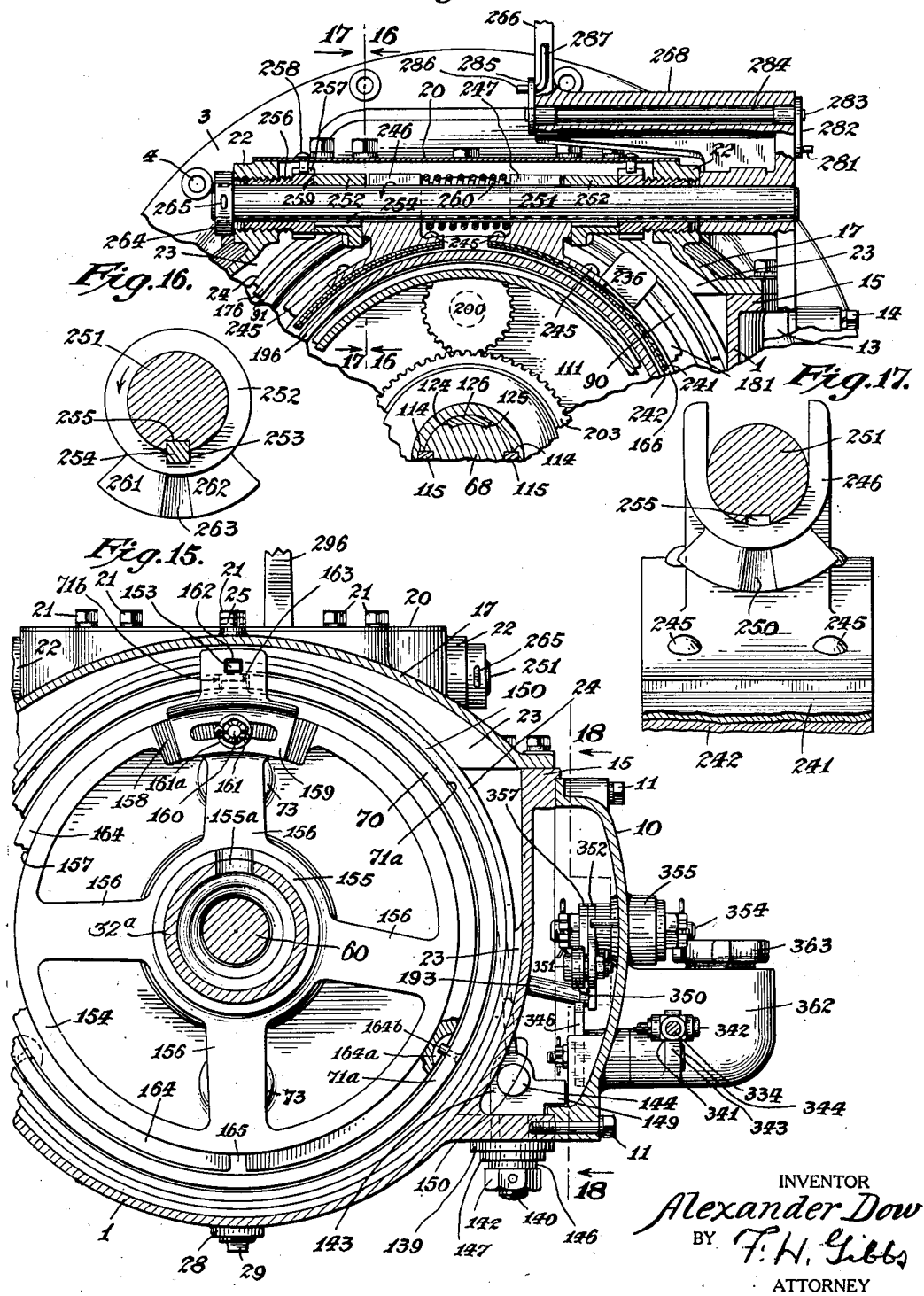

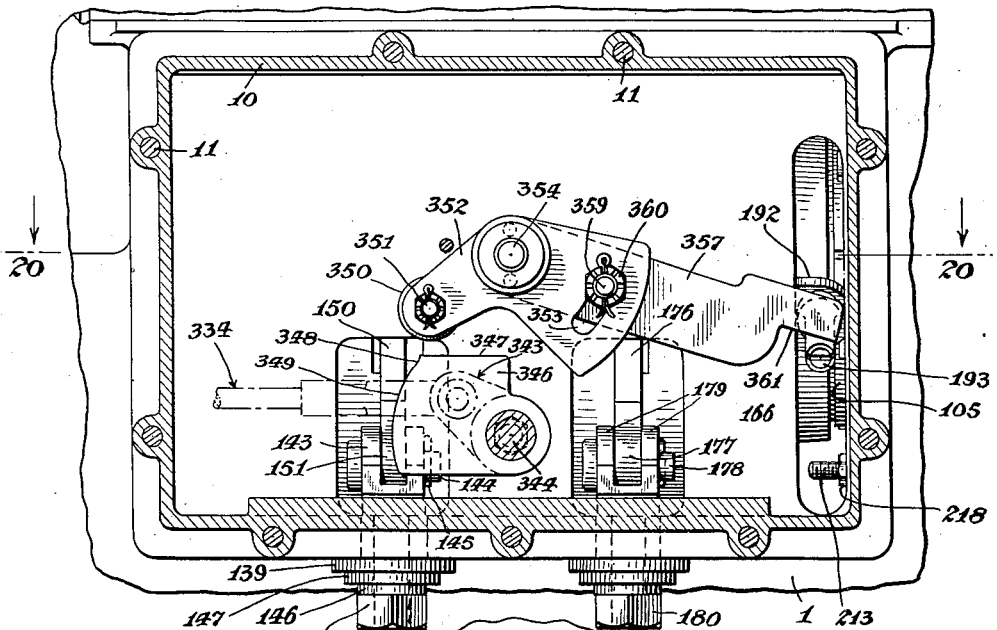

June 12, 1928.

A. DOW 1,673,278

VARIABLE SPEED POWER TRANSMISSION

Filed July 11, 1924     22 Sheets-Sheet 12

INVENTOR
Alexander Dow
BY F. H. Gibbs
ATTORNEY

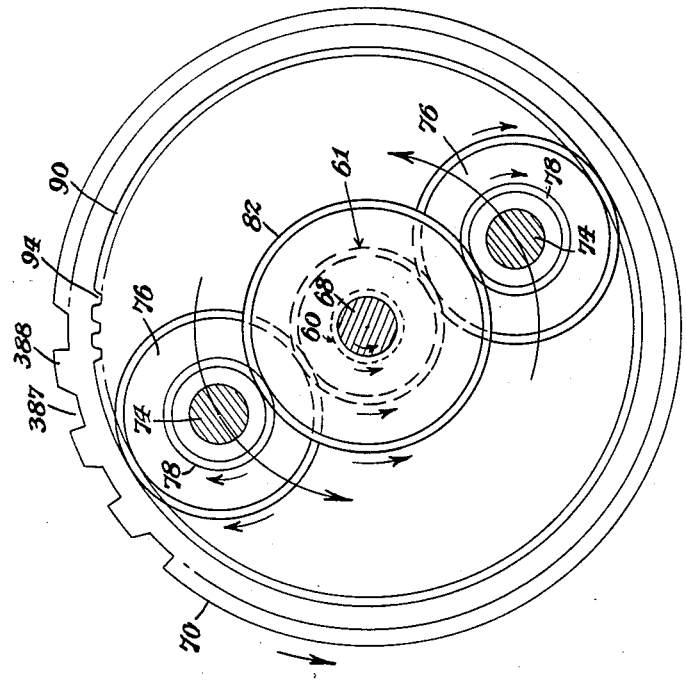
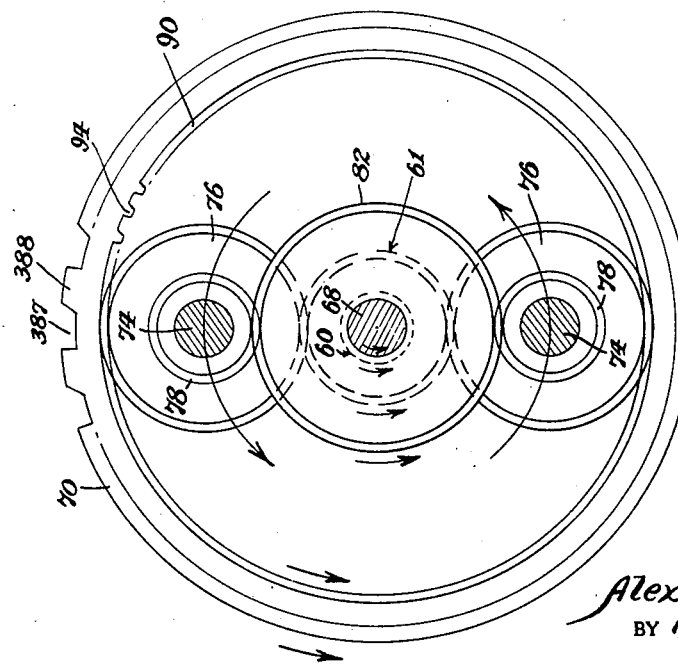

June 12, 1928.　　　　　　　　　　　　　　　1,673,278
A. DOW
VARIABLE SPEED POWER TRANSMISSION
Filed July 11, 1924　　22 Sheets-Sheet 14
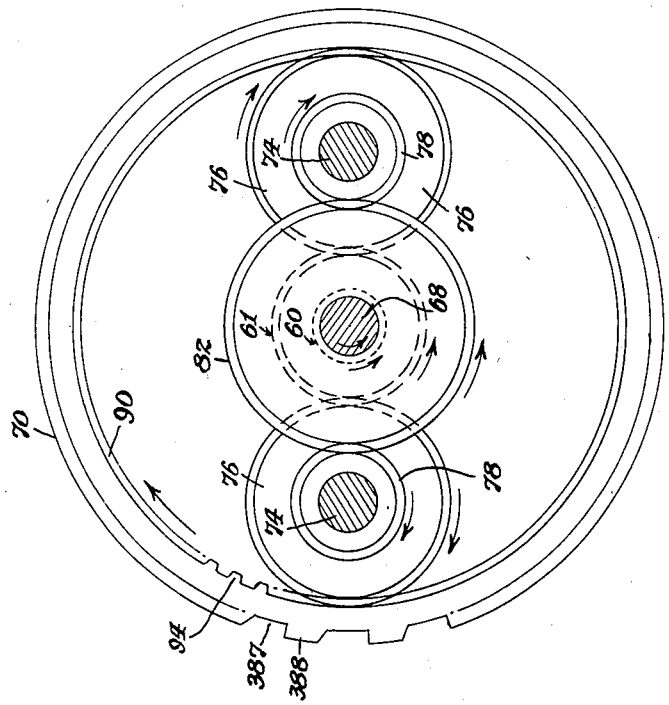
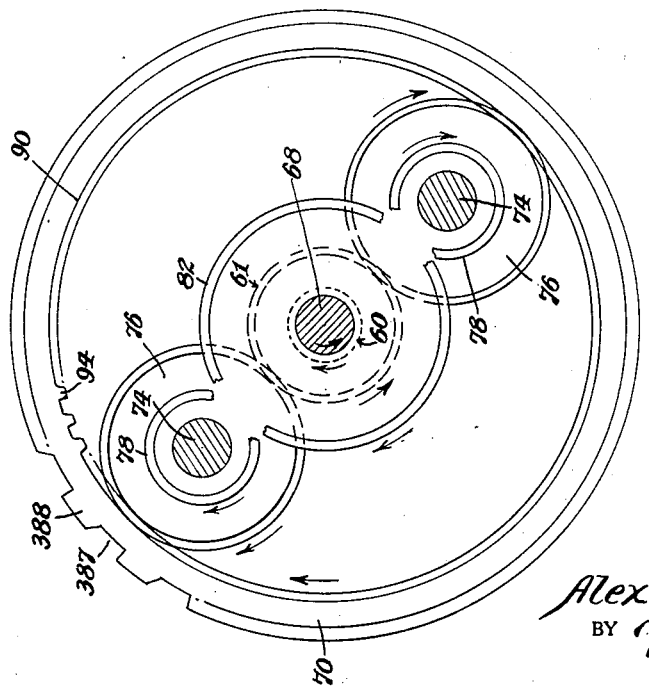
INVENTOR
Alexander Dow
BY
ATTORNEY

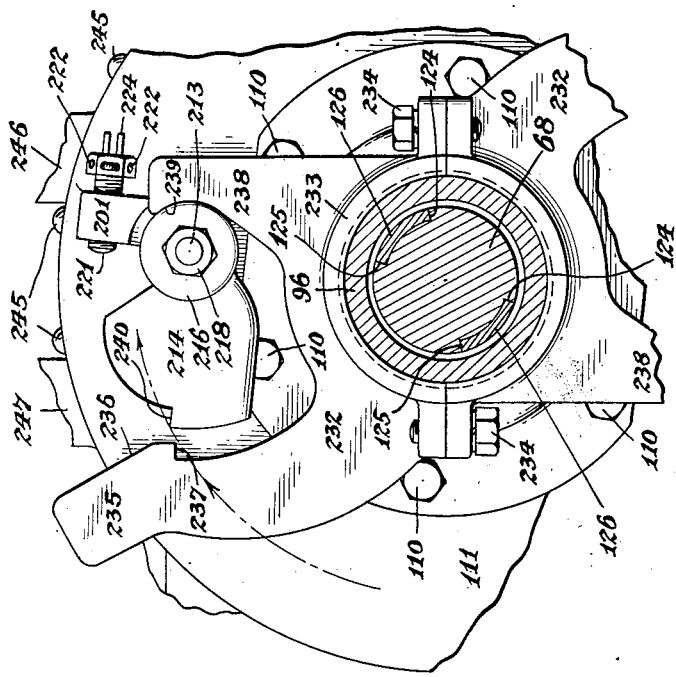
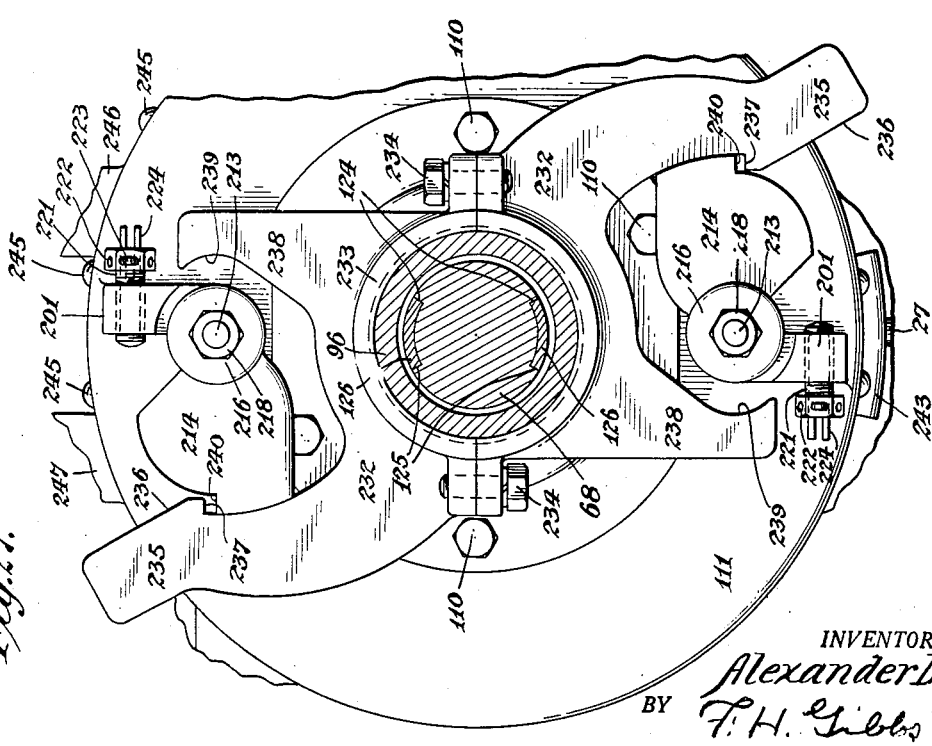

June 12, 1928.

A. DOW 1,673,278

VARIABLE SPEED POWER TRANSMISSION

Filed July 11, 1924  22 Sheets-Sheet 16

INVENTOR
Alexander Dow
BY F. H. Gibbs
ATTORNEY

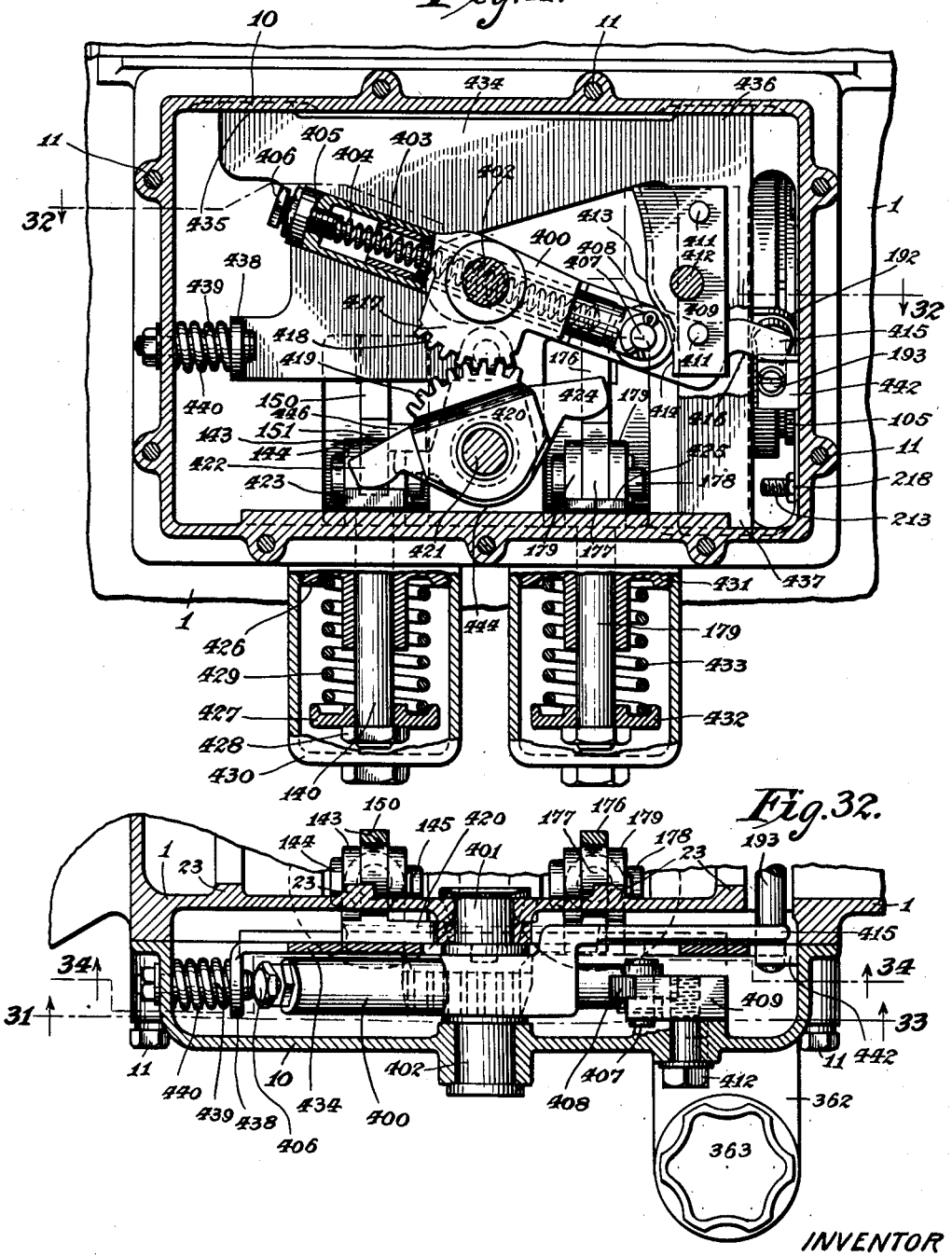

June 12, 1928.

A. DOW 1,673,278

VARIABLE SPEED POWER TRANSMISSION

Filed July 11, 1924 22 Sheets-Sheet 18

INVENTOR
Alexander Dow
BY
ATTORNEY

June 12, 1928.

A. DOW 1,673,278

VARIABLE SPEED POWER TRANSMISSION

Filed July 11, 1924        22 Sheets-Sheet 20

INVENTOR
Alexander Dow
BY F. H. Gibbs
ATTORNEY

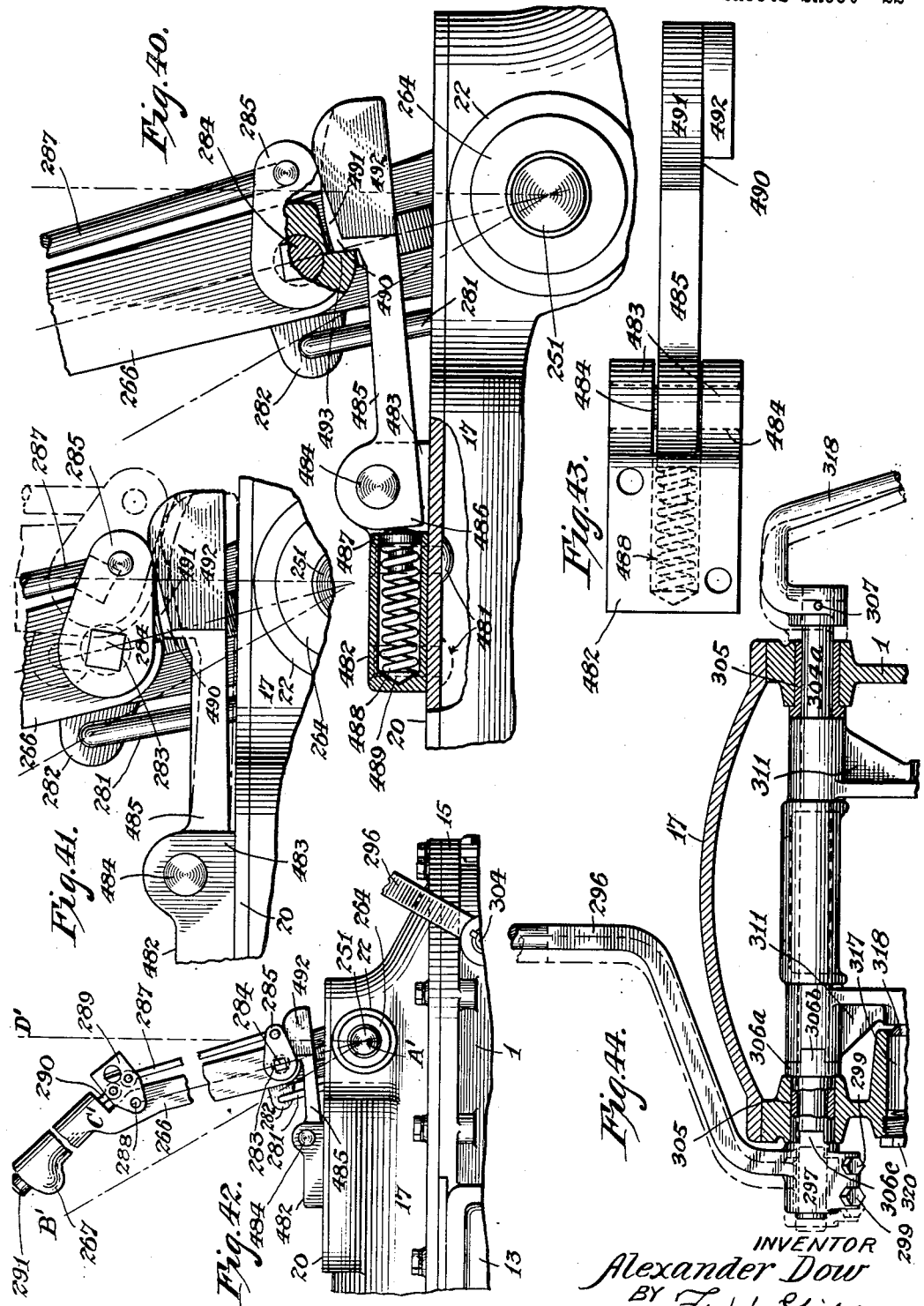

Patented June 12, 1928.

1,673,278

UNITED STATES PATENT OFFICE.

ALEXANDER DOW, OF NEW YORK, N. Y., ASSIGNOR TO THE DOW TRANSMISSION CORPORATION, OF NEW YORK, N. Y., A CORPORATION OF NEW YORK.

VARIABLE-SPEED POWER TRANSMISSION.

Application filed July 11, 1924. Serial No. 725,402.

The accompanying drawings illustrate an embodiment of one application of my invention, though it is to be understood that the invention is not limited to the exact details of construction shown and described, as modifications thereof will occur to persons skilled in the art.

My invention relates to geared power transmission mechanism whereby the relative speeds of a prime mover and driven shaft may be altered in a manner to afford such changes in their relative torques as conditions may demand.

One object of my invention is to provide new and useful means in power transmission mechanism whereby the changes in gear ratio between the driving and the driven shafts are made without shock and without effort by the operator.

A further object of my invention when applied to automobile construction is to afford a means of transmission control whereby the manual shifting of gears is eliminated; to increase the life of the car and all its parts by removing the shock and jar incident to de-clutching and gear shifting as at present practiced; to increase the safety and comfort of automobile driving; to add increased steadiness to the rolling motion of the car at all speeds; by superior brakes to largely eliminate the danger of side slip on wet and slippery roads; to afford a much faster get-away or acceleration from a standing start and quicker gear changes than can possibly be made by hand; to remove the necessity of the constant clutching and de-clutching of the motor; to decrease the likelihood of stalling the engine upon hills and to greatly lessen the danger of descending them under bad conditions, and to otherwise improve the general characteristics of motor car operation.

It consists of an improved construction whereby changes from one gear ratio to another is effected without clashing of the gears or jarring of any parts of the mechanisms, by means of a gradual rolling of the members of the gear train one upon another to the end that one gear ratio flows or develops into another with imperceptible gradation, thus gradually altering the relative speeds of the driving and driven shafts and eliminating all the shock ordinarily existing in speed changing devices.

Furthermore the gear ratios are established at the will of the driver by manipulating only the throttle of the prime mover, which in turn governs the transmission mechanism and causes it to automatically assume the relative speeds desired.

While my invention can be used for many purposes in the arts, it is particularly desirable and effective where frequent changes of gear ratios are required as in the driving of a motor car.

In the following specification and accompanying drawings I have disclosed in what manner my invention is applied to control the gearing necessary in an automobile, but I do not limit myself to this particular use, or to any particular prime mover or source of power to which the mechanism may be adaptable.

As embodied in a motor car my transmission is furnished with a hand shifting lever by which changes of direction of the movement of the car from forward to reverse, and to a neutral position of the gearing which permits the engine to idle, are determined. But in all other changes of gear in a forward direction of movement of the car, the driver does not actuate any levers or parts directly controlling the transmission gearing, as is the usual practice at present, but merely synchronizes the speed of the engine to that of the car for the new gear, which is done with the utmost ease by the use of the ordinary hand throttle or foot accelerator.

In said drawings: Figure 1 is a side elevation of my improved power transmission as particularly applied to an automobile, and shows a portion of the floor board of the car in section; the clutch pedal lever and connecting portions being broken away and the position of the various parts corresponding with that of forward high speed;

Fig. 5 is a plan view of the major portion of Fig. 1 on a larger scale than that of Fig.

Figure 4:
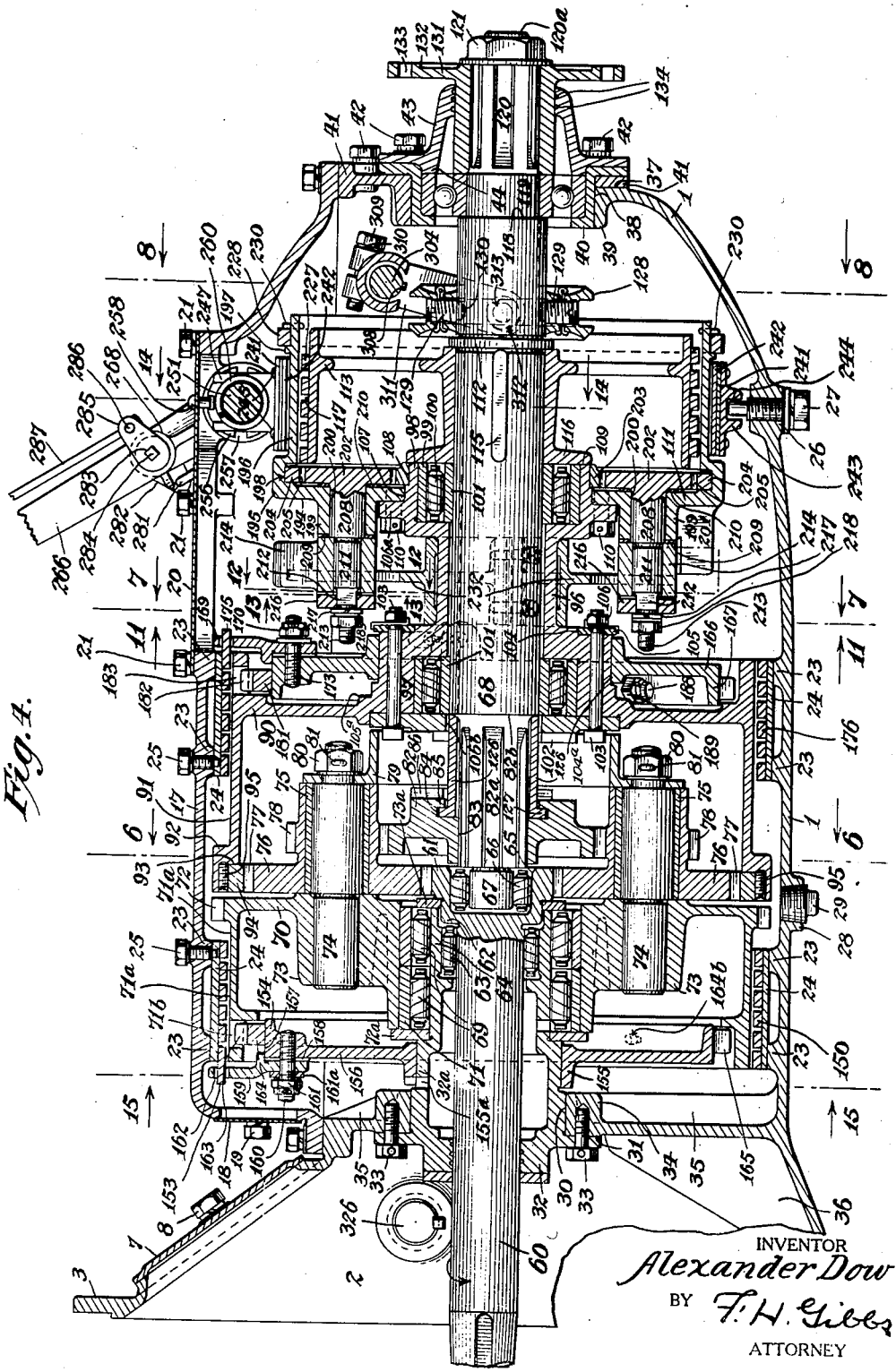
Fig. 4 is a central vertical longitudinal section of Fig. 1 on an enlarged scale.

4, with the casing cover removed and some of the parts broken away and in section;

Fig. 6 is a vertical cross section taken on the line 6—6 of Fig. 4 and upon the same scale;

Fig. 7 is a similar view on a similar scale taken upon line 7—7 of Fig. 4;

Fig. 8 is a similar view on the line 8—8 of Fig. 4 also upon the same scale;

Fig. 9 is an enlarged detail section on the line 9—9 of Fig. 8;

Fig. 10 is an enlarged detail section upon line 10—10 of Fig. 8;

Fig. 11 is a vertical cross section upon the line 11—11 of Fig. 4 and upon the same scale.

Figure 1:
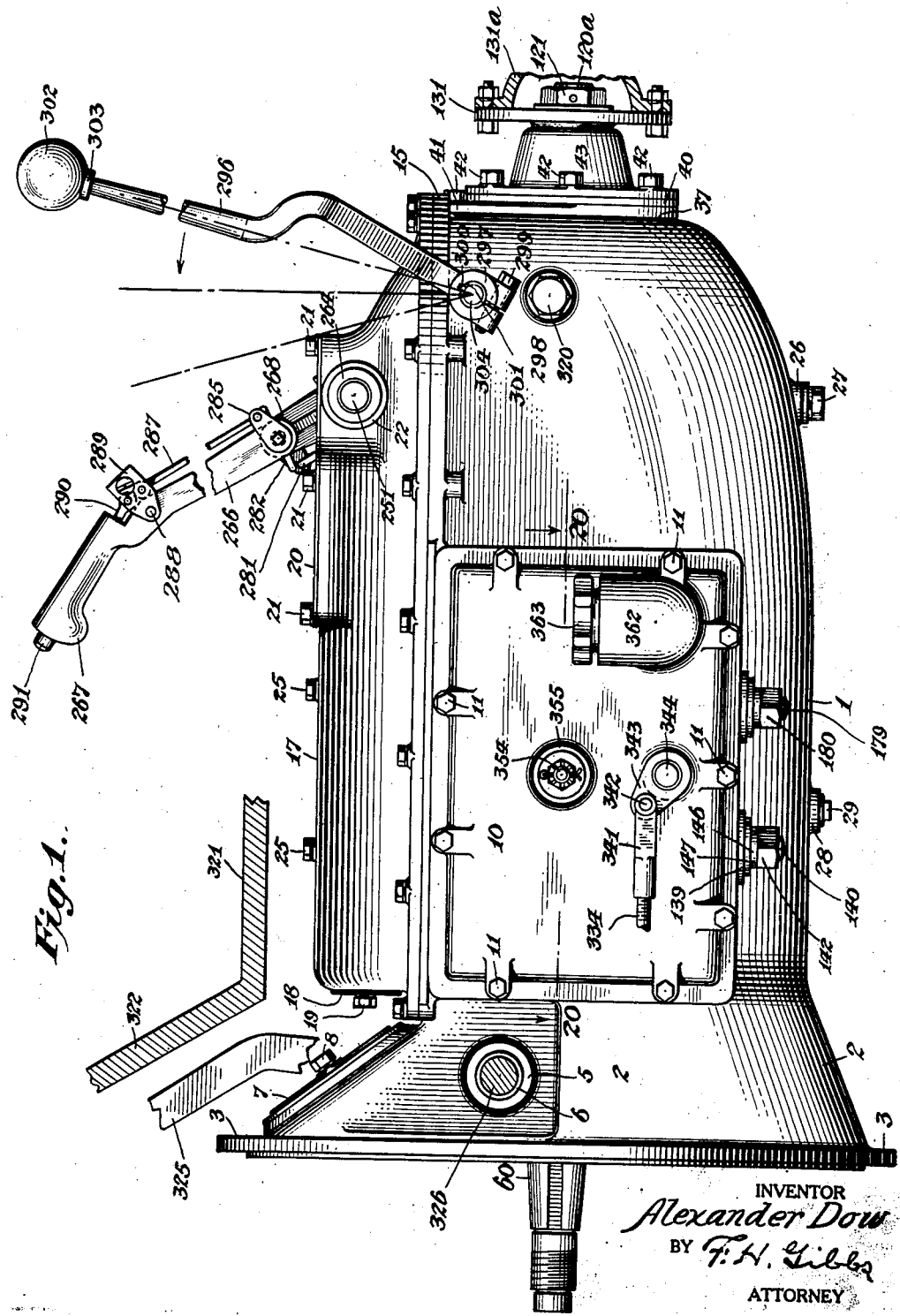
Figure 2:
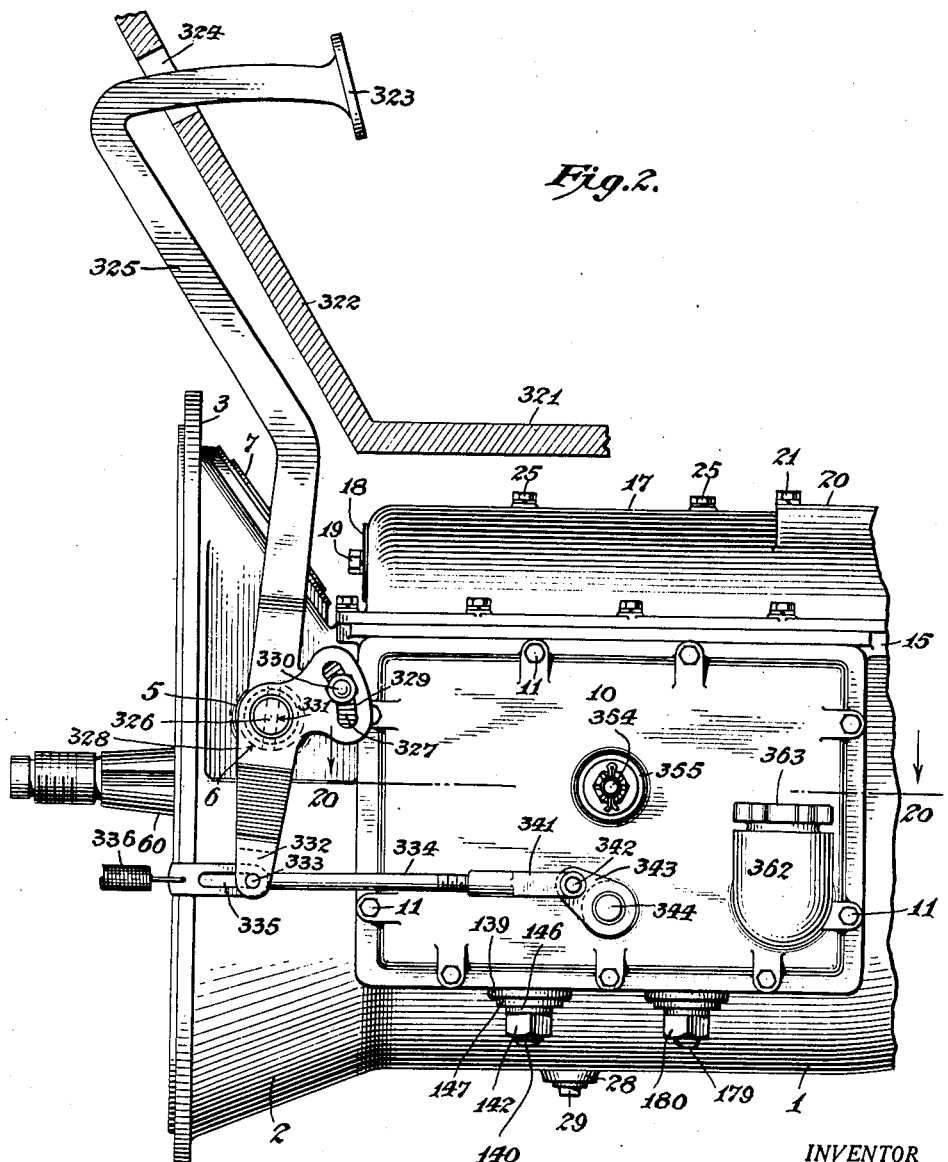
Fig. 2 is a similar view of the clutch portion of Fig. 1, showing the clutch pedal lever and its connecting parts for controlling low gear.
Figure 3:
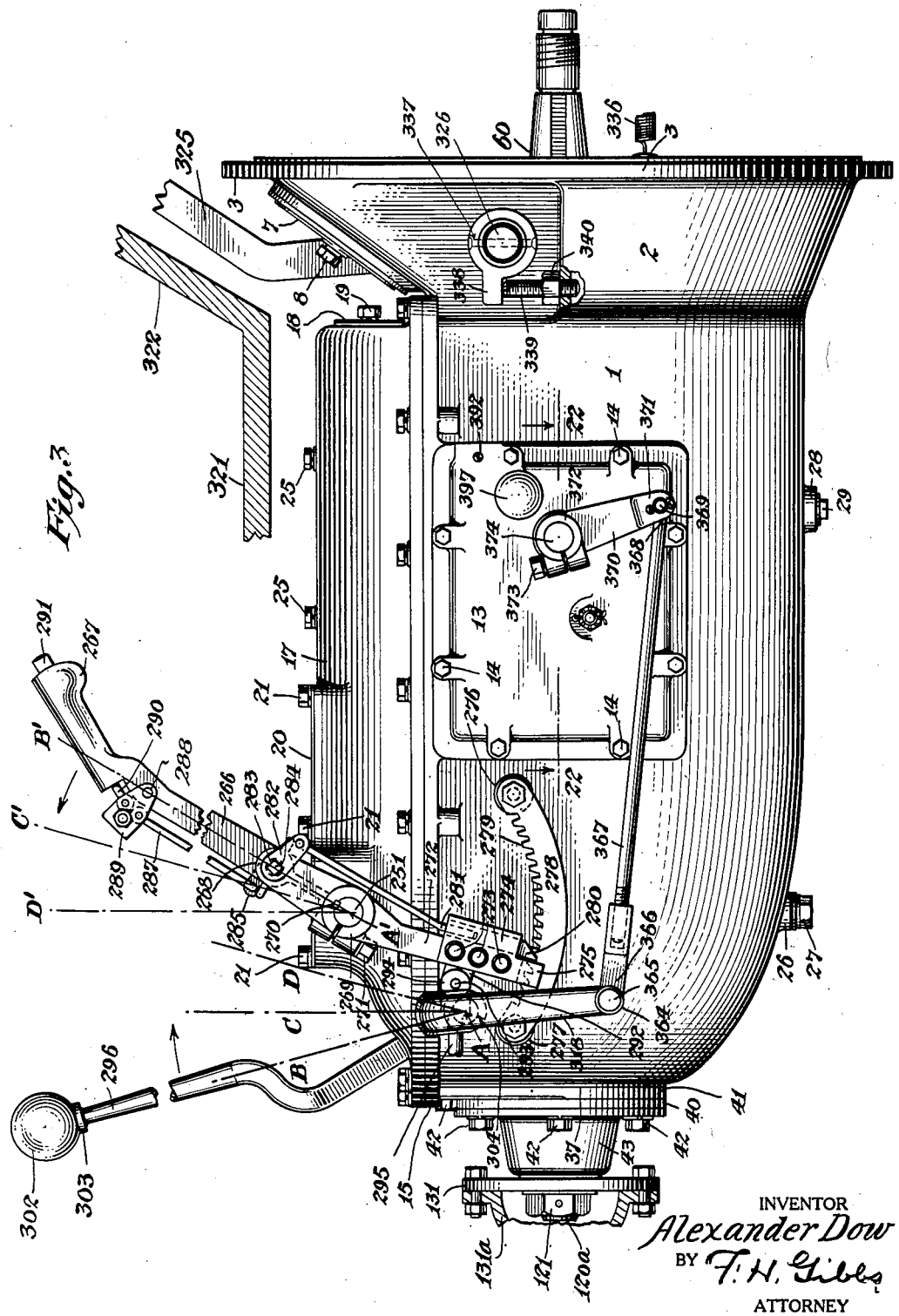
Fig. 3 is a side elevation of my improved transmission looking in a direction opposite to that of Fig. 1.
Figure 21:
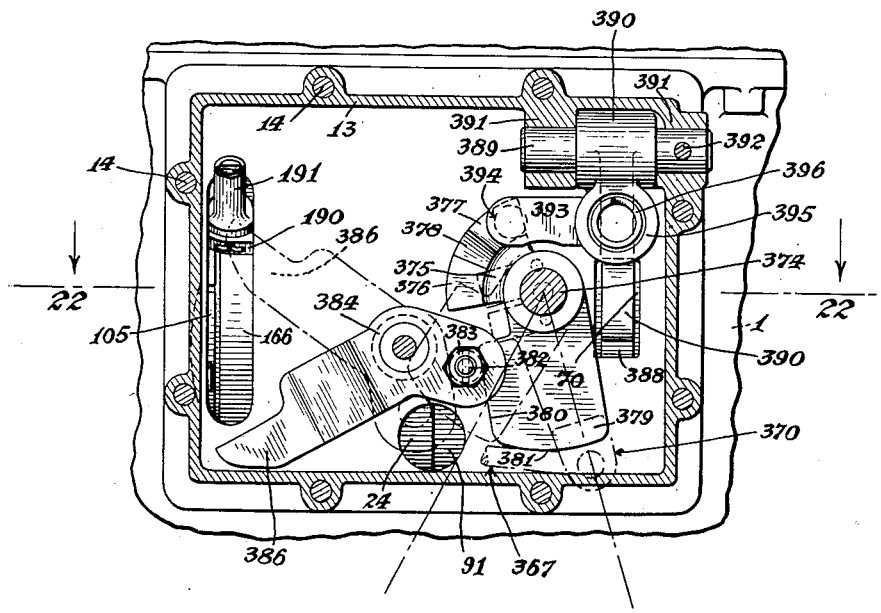
Figure 22:
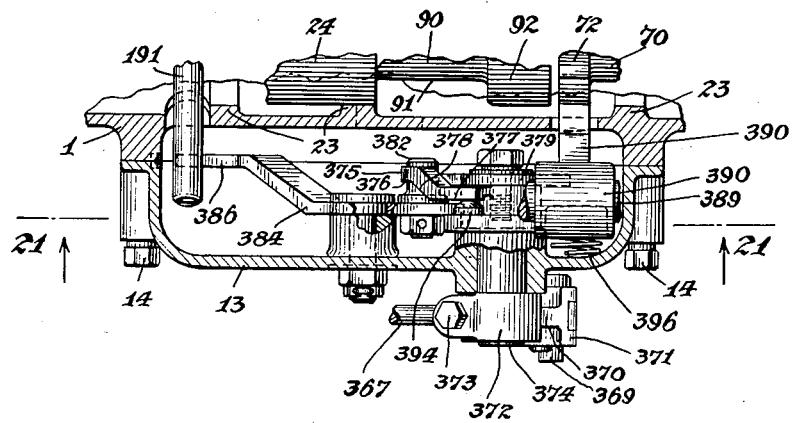
Figure 29:
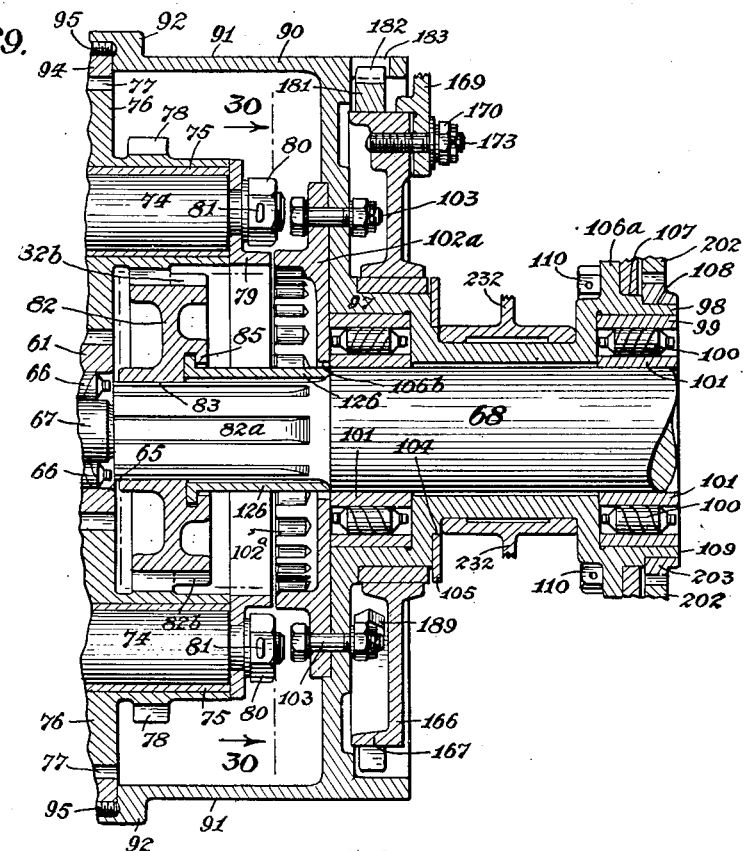
Figure 30:
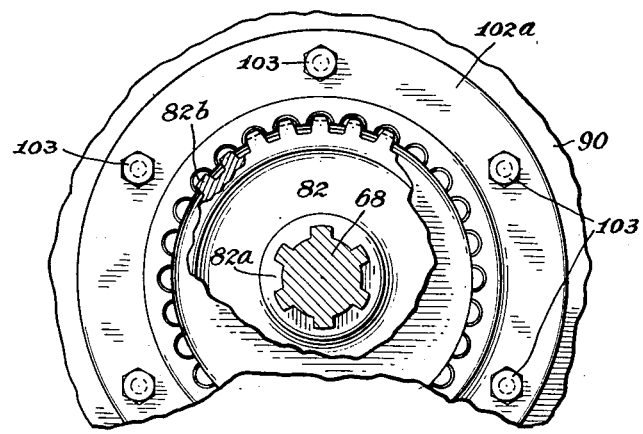

Fig. 12 is an enlarged detail section upon the line 12—12 of Fig. 4;

Fig. 13 is a similar section taken on the line 13—13 of Fig. 4;

Fig. 14 is a detail section upon the line 14—14 of Fig. 4 upon the same scale;

Fig. 15 is a vertical cross section upon the line 15—15 of Fig. 4, and partly broken away;

Fig. 16 is an enlarged detail section on the line 16—16 of Fig. 14;

Fig. 17 is a similar section on the line 17—17 of Fig. 14;

Fig. 18 is an enlarged detail section upon the line 18—18 of Figs. 6, 15 and 20;

Fig. 19 is a detail view of a portion of Fig. 18 with some of the parts in another position;

Fig. 20 is a horizontal section, similar in scale to Fig. 18, on the line 20—20 of Figs. 1, 2 and 18;

Fig. 21 is an enlarged detail section on the line 21—21 of Figs. 6 and 22;

Fig. 22 is a horizontal section, similar in scale to Fig. 21, on the line 22—22 of Figs. 3 and 21;

Figs. 23, 24, 25 and 26 are diagrammatic view of the gear and its correlated parts and illustrate the relative rotation and direction thereof in high speed, second speed, reverse and low speed respectively;

Fig. 27 is an enlarged detail section on a plane similar to Fig. 11, showing the flyball latch and adjustable stop for the flyballs, the parts being in a position they might assume when at rest;

Fig. 28 is a similar view more broken away, and illustrates the relative position of the fly-balls and latch therefor immediately after the second speed rotor has advanced in the direction of forward speed, as indicated by the arrow, and before any centrifugal movement of the fly-balls has taken place;

Fig. 29 is an enlarged portion of Fig. 4, showing a modified form of the reverse clutch mechanism;

Fig. 30 is a vertical cross section of the same on the line 30—30 of Fig. 29.

Fig. 31 is a side elevation of a modified form of the low and second speed coil brake control shown in Fig. 18 with the cover in section.

Fig. 32 is a horizontal section of the same on line 32—32 of Fig. 31.

Figures 33, 34:
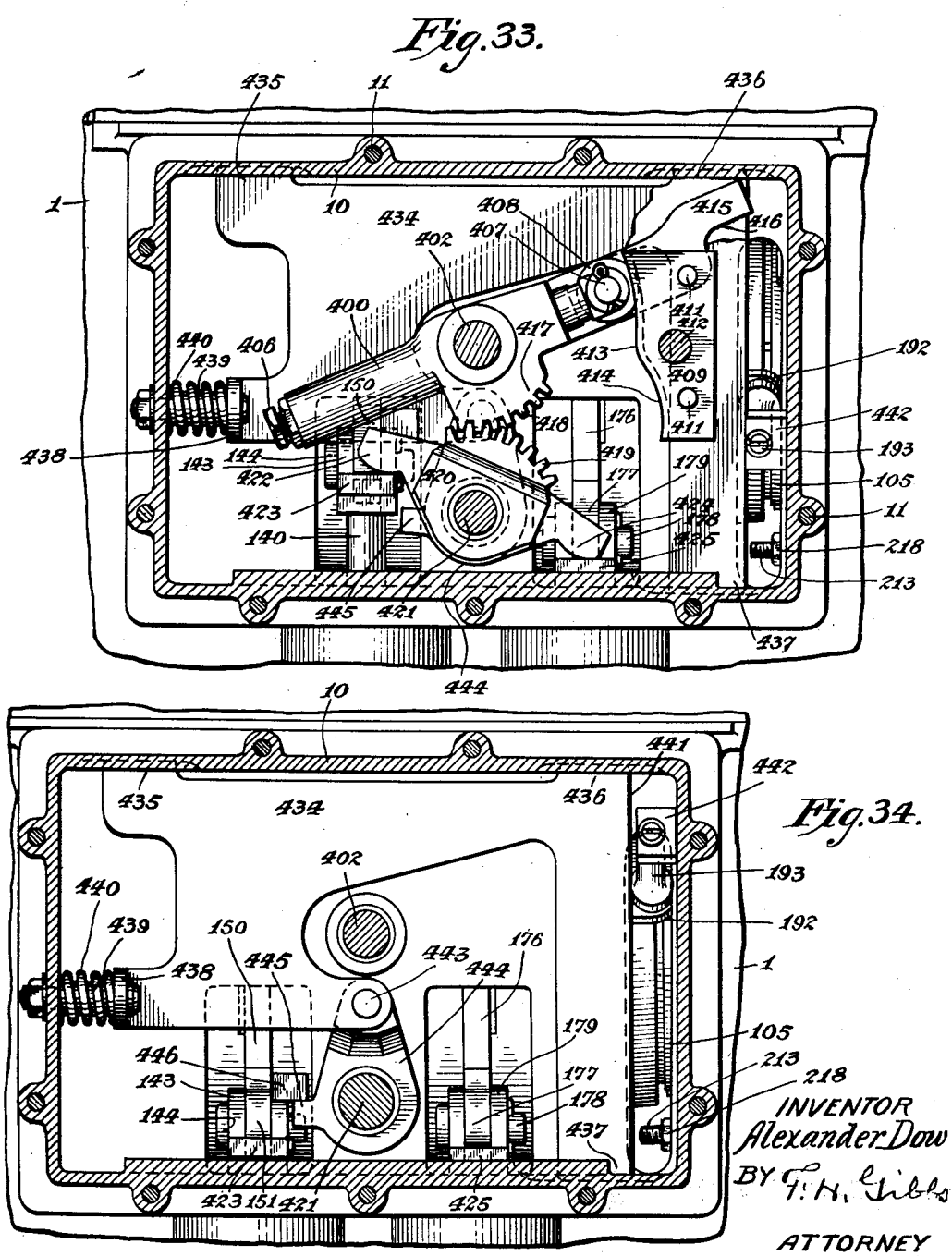

Fig. 33 is a similar view to Fig. 31, on line 33—33 of Fig. 32 but showing the parts in another position.

Fig. 34 is a view similar to Fig. 33 but on the line 34—34 of Fig. 32 and more clearly shows the coil brake controller clamping mechanism more or less concealed in Fig. 33.

Figure 35:
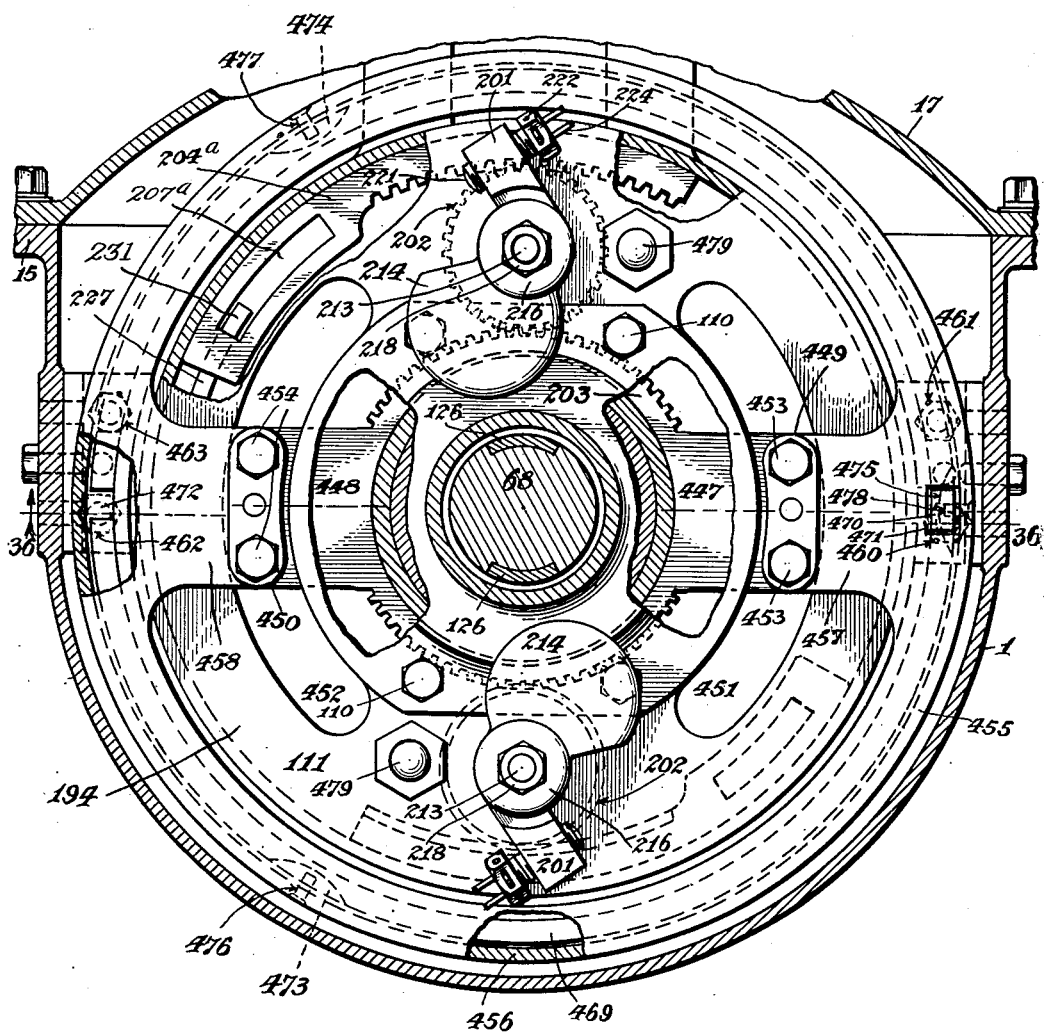
Figure 36:
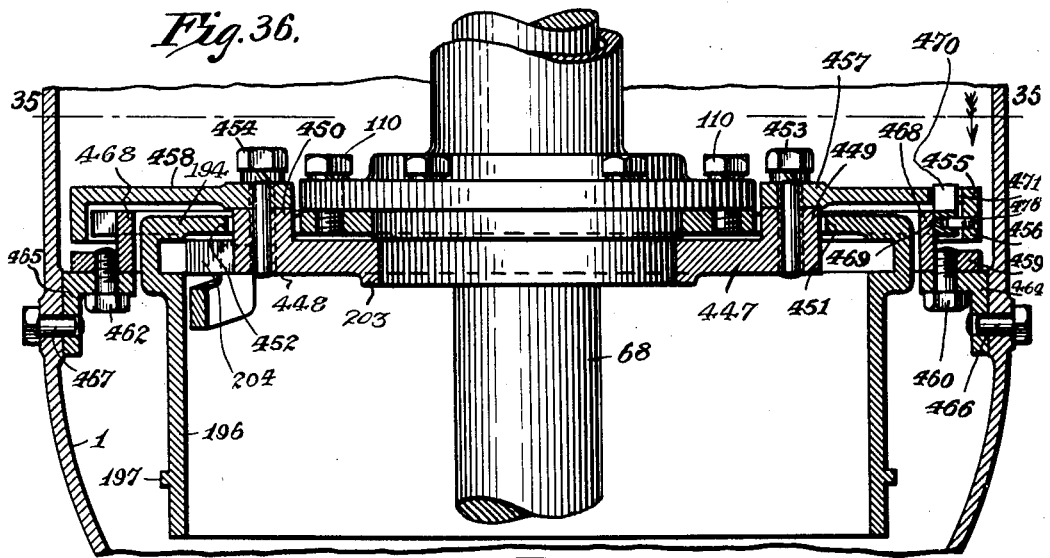

Fig. 35 is a transverse section on the line 35—35 of Fig. 36 looking toward the rear of the transmission.

Fig. 36 is a horizontal cross section on line 36—36 of Fig. 35.

Figure 37:
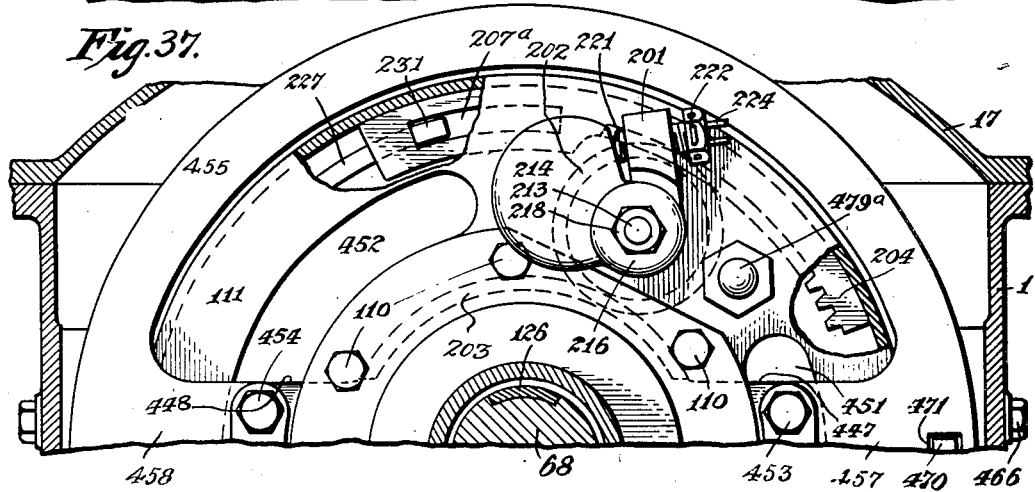

Fig. 37 is a view similar to Fig. 35 but broken away and showing the parts in another position.

Figure 38:
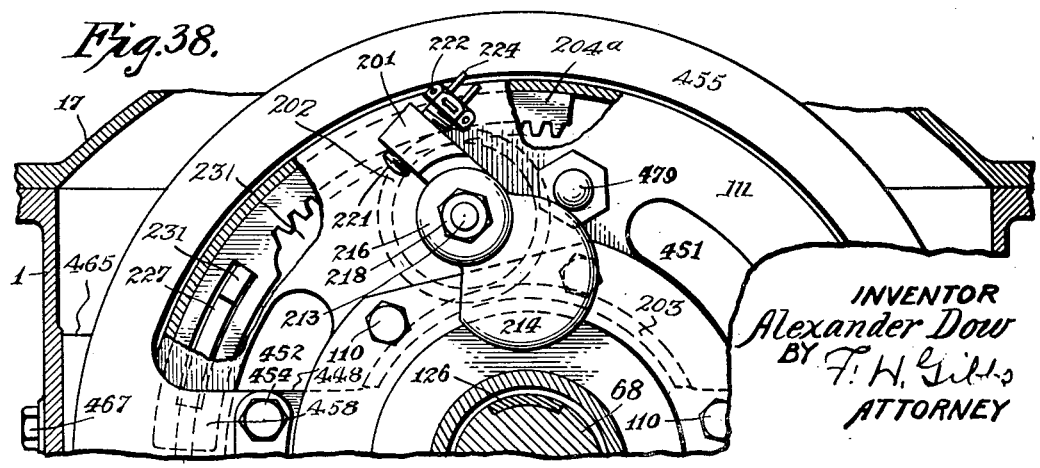

Fig. 38 is a similar view to Fig. 37 but with the parts in the reverse position.

Figure 39:
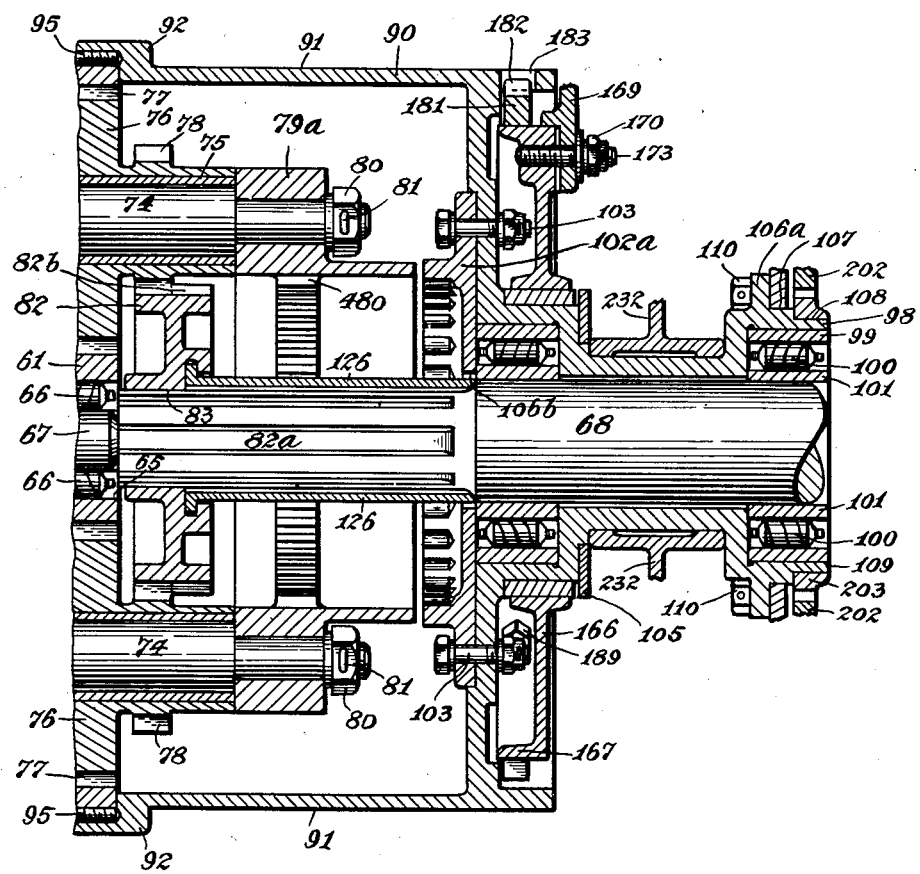

Fig. 39 is a vertical longitudinal cross section, similar to Fig. 29, of a portion of the transmission but showing a modification of the gearing which provides four speeds and reverse.

Fig. 40 is an enlarged detail elevation, partly in section, showing the emergency brake detent device.

Fig. 41 is a view of the same in another position, with a further position in dotted lines.

Fig. 42 is a more extensive view of the same on a reduced scale.

Fig. 43 is an enlarged plan view of the detent shown in Figs 40, 41 and 42, and

Fig. 44 is a view of the upper portion of Fig. 8 modified to provide a low speed lock, and with the gear shift lever shown in dotted lines in another position.

*The frame or casing.*

The frame or casing 1 of the transmission shown in side elevation in Figs. 1 and 3, a portion of it in side elevation in Fig. 2 in central longitudinal vertical section in Fig. 4, in plan in Fig. 5, and in vertical cross section in Figs. 6, 7, 8, 11 and partly in Fig. 14, and in Fig. 15, is of a hollow and substantially U-shaped configuration, in vertical cross section, throughout the greater portion of its length terminating at the end adjacent to the motor in the bell shaped housing 2 of a flaring form suitable for enclosing the clutch driven by the engine and provided with a flange 3 to fit the frame of the motor, or its bell housing, to which it is securely attached by bolts (not shown) passing through holes 4 shown in Fig. 6 tapped into the motor fly-wheel housing.

Casing 1 is provided with various surfaces, bosses, lugs and apertures to properly receive and support the parts attached to or cooperating with it, the purpose of which will be more fully described hereinafter.

Clutch housing 2 is shown in Figs. 1, 2, 3, 4, 6, 7 and 8 and is of such form and dimensions as to suit the particular type of clutch used in connection with the motor. It is provided on each side with the boss 5 for supporting bushing 6 in which the shaft for operating the clutch through the means of the foot pedal is mounted.

7 is a cover plate attached to housing 2 by means of the bolts 8, the removal of which permits access to parts of the clutch for the purpose of adjustment.

On one side of casing 1, more clearly shown in Fig. 6, is a rib like surface 9 on which cover plate 10 is rigidly secured by bolts 11. Cover plate 10 supports and contains certain of the mechanism relating to the operation of the low speed gear, later to be described. When in place it becomes substantially a part of casing 1, and if desired can be constructed integral with it.

On the opposite side of casing 1 is a similar surface 12 also shown in Fig. 6, to which is securely fastened cover plate 13, attached to casing 1, by means of the bolts 14. Cover plate 13 furnishes means for supporting and housing certain parts relating to the reverse mechanism of the transmission, later to be described, and can be built integral with casing 1, if desired, for when in position it becomes substantially a part of it.

The open top of the U-shaped casing 1 is provided with a suitably extending flange 15, shown in plan in Fig. 5, and in section in various views of the casing. To flange 15, by means of bolts 16 is attached the casing cover 17.

In order that access to certain parts of the transmission may be had without the removal of the casing cover 17, the latter is provided with cover plate 18, see Fig. 1, attached to it by the bolts 19, and another cover plate 20 is held in position by bolts 21.

Casing cover 17 has projecting lugs or bosses 22 shown best in Figs. 8, 11 and 14, for holding in position bushings used in connection with the emergency brake mechanism, hereinafter to be described.

Referring particularly to Figs. 4, 5 and 7, it will be seen that casing 1 and casing cover 17 are each provided with interior circular ribs 23, which, when casing cover 17 is in its correct position, coincide in such a manner as to form a series of substantially continuous circular interior surfaces, of equal diameters and concentric with the shafts of the transmission rotatably mounted in suitable bearings supported by casing 1.

The interior concentric ribs 23, just described, are provided for the purpose of holding concentrically with the axis of the transmission shafts, the coil brake retaining rings 24, which, when the entire mechanism is assembled limits the expansion of the coil brakes, later to be described. The purpose of these rings is to afford continuous interior cylindrical surfaces against which the outer surfaces of the coil brakes can expand. As these rings are always at rest, it is clear that they become substantially a part of casing 1 and casing cover 17, and they are described here in order that it will be understood that these rings could be eliminated providing surfaces were incorporated in casing 1 and case cover 17, to function in their places. But for the purpose of convenience in assembling the mechanism, rings 24 are desirable.

When casing 1 and casing cover 17 are placed in position the coil brake retaining rings 24 fit tightly in place and are prevented from longitudinal displacement by the dowel bolts 25 tapped into the case cover 17, with their dowel ends extending into the coil brake retaining rings 24, as clearly shown in Fig. 4.

On the under side of case 1, Figs. 4 and 8, is shown a boss 26 for receiving a bolt 27 used in conjunction with the emergency brake mechanism, and also a boss 28, in Figs. 4 and 6, tapped for a pipe plug 29, by the removal of which oil can be drained from the interior of the casing.

On the end of casing 1, nearest the motor and within housing 2, best shown in section in Fig. 4, is a circular orifice 30, and the right angled facing 31 surrounding said orifice, suitably constructed to receive and rigidly support in proper alignment the main front bearing support 32, when the same is fastened to it by bolts 33. In order that the walls of the orifice 30 may be adequately stiff to resist distortion casing 1 is provided with an internally projecting lug 34 through which the orifice 30 passes and this is reinforced with radial internal ribs 35, formed on the interior of the head of casing 1, shown in Fig. 5, and flaring external ribs 36, cooperating therewith for the same purpose as above, one of which is shown in Fig. 4.

At the outside of the end of casing 1, opposite the clutch housing in Figs. 1, 3, 4 and 5, is a finished surface 37, which in conjunction with the U-shaped orifice 38, (Fig. 4) that passes through the portion 39 of casing 1, furnishes a means for locating rigidly in alignment in casing 1, the ball-bearing retainer 40, which supports the rear ball bearing of the main shaft of the transmission.

Orifice 38 is U-shaped, that is, open at the top in order that the shaft and rear bearing with its retainer and its complementary portion 41 may be lifted from the case after the removal of bolts 42 by which it is rigidly secured to casing 1.

Bolts 42 also serve to hold in operative position the oil retainer 43, which is provided with an interior lip 44, serving to firmly hold the said main shaft ball-bearing against displacement from longitudinal thrust.

From the foregoing description it is clear when casing 1 is assembled with its various parts and provided with the necessary gaskets that it becomes an oil tight receptacle enclosing all the mechanism of the transmission which obtains its lubrication from the oil placed within the casing and protects the various parts against dust from the exterior during the operation of the car.

In the above description casing 1 has been described as being attached directly to the flywheel housing of the motor by means of flange 3. When attached in this manner the transmission may be termed a "unit power" transmission and conforms with usual automobile practice. Casing 1, however, may be modified in many respects or furnished, if desired, with the necessary means for attaching it to the side members of the frame of the car, interposing a universal joint if necessary between the transmission and the motor.

It is obvious that casing 1 and its collateral parts may be designed in a great variety of form to meet exigencies which may arise, and I do not limit myself to the particular construction described herein but claim any construction of the same not inconsistent with the spirit of this invention.

The gear train and its mechanism.

The clutch or driving shaft 60 of the transmission, a portion of which is disposed in elevation in Figs. 1, 3, 4, and in section in Fig. 15 and in the background of Fig. 6 is the medium through which the transmission receives its torque from the engine.

The end of this shaft 60 nearest the engine is reduced in diameter and ground to fit a pilot ball-bearing centrally located in the flywheel of the motor, not shown in the drawings. This pilot ball-bearing supports the end of clutch shaft 60 and at the same time permits it to freely assume any velocities relative to the flywheel which conditions may demand.

As the engine flywheel and pilot bearing just referred to are common to most "unit power" transmission constructions used in the art, they are not illustrated in these drawings, nor are they considered a part of this invention.

Clutch shaft 60 also has a threaded terminal portion and an adjacent tapered portion, as well as a keyway, which in connection with a threaded nut and washer affords a securing means for holding to shaft 60 one of the members of the conventional friction clutch, the cooperating member of which is attached to the flywheel of the engine, and is rotated by it and not shown in the drawings hereof.

It is by the engagement of this clutch in the usual manner that the engine drives the transmission, and its disengagement is effected at the option of the driver by the regular foot pedal for this purpose. This foot pedal however has in addition to its usual function of controlling the clutch the added function of governing the low speed gear which is a part of this invention and will hereafter be described.

Referring to Fig. 4 clutch shaft 60 at its end opposite the flywheel terminates in the spur gear 61 formed with the shoulder 62, both of which are integral with shaft 60. Clutch shaft 60 rotates freely in a roller bearing 63 which surrounds it, the outer race of which is formed by the inner raceway 64 recessed in the end of main bearing support 32.

Gear 61 is constructed with a central recess or orifice 65 which acts as an outer raceway for roller bearing 66, which in turn surrounds and supports the reduced end 67 of shaft 68 and acts as a pilot bearing therefor.

From the construction just described it is clear that clutch shaft 60 can rotate at any speed relative to the flywheel of the engine and the driven shaft 68 is free to turn at any velocity with reference to clutch shaft 60 in the bearing provided, all of which is shown in Fig. 4.

Mounted on roller bearing 69 and freely rotatable about the main bearing support 32 is the low speed rotor or gear head 70. Gear head 70 also embraces rings 71 which constitute outer raceways for roller bearing 69. Gear head 70 is further prevented from lateral movement relative to clutch shaft 60 by collars 72$^a$ and 73$^a$ which also supply end retaining means for roller bearing 69.

Gear head 70 is best shown in vertical section in Fig. 4 and comprises an exterior drum-like periphery 71$^a$ and a circumferential serrated rib 72 shown in Figs. 4, 5 and 6.

Integral with gear head 70 are two diametrically opposed bosses 73 suitably apertured to receive stud shafts 74 under a driving fit. Rotatably mounted on each of the stud shafts 74 is a compound planet gear 76 carrying a suitable bushing 75. Each of these planet gears 76 is cut with teeth on the larger circumference at 77 and also on the reduced periphery as at 78.

Planet gears 76 are prevented from longitudinal displacement by thrust-ring 79 firmly held in position on the studs shafts 74 by threaded nuts 80 and cotter pins 81. Thrust-ring 79 also serves to prevent any lateral movement of gear head 70 as a whole along main bearing support 32 as will later be described.

The toothed portion 77 of each of the planets 76 is in engagement with the teeth of gear 61 on the end of clutch shaft 60 and said planets are driven by it.

The portion 78 of each of the planets 76 is in toothed engagement with driven gear 82. This gear 82 is formed with a splined central orifice 83 and is thereby slidably mounted upon the corresponding splined exterior 82$^a$ of shaft 68. By means of this construction gear 82 is always rotatably keyed relative to shaft 68, and at the same time can be moved longitudinally into and out of engagement with teeth 78 of planet gear 76 at the will of the operator by means later set forth.

As seen in Fig. 4 gear 82 is further formed in its central orifice with an internal annular groove 84 provided with an inwardly projecting annular lip or flange 85. Its rear face is also cut with a series of radial clutch teeth 86 shown best in Fig. 6 which constitutes a jaw clutch through which the reverse movement of shaft 68 is effected by engagement with the complimentary jaw clutch attached to the second speed rotor to be described later.

In longitudinal vertical section in Fig. 4 and partly in vertical cross section in Fig. 6 is clearly shown second speed rotor 90. Rotor 90 is constructed with a drum-like cylindrical periphery 91 not unlike the exterior of gear head 70 and is fashioned near its open end with a portion of enlarged diameter 92 which is properly recessed at 93 to receive and rigidly maintain in position an annular internal gear 94. Annular gear 94 is cut with teeth upon its inner periphery and is of such a diameter, size of tooth and width of face as to properly engage and run in mesh with gear 77 on each one of the compound planet gears 76.

In order that annular gear 94 may not be displaced relative to rotor 90 under the stress of the driving gear train, it is firmly driven or pressed in to recess 93 of rotor 90 and held firmly by a series of screws 95, headed over to prevent displacement. In this manner annular gear 94 becomes substantially a portion of rotor 90 and if desired could be made integral therewith.

Rotor 90 has a rearwardly extending hub 96 through which driven shaft 68 passes without contact therewith, and this hub is properly formed and recessed at the ends 97 and 98 respectively to enclose in operative concentric relation the outer races 99 of a pair of roller bearings 100 suitably mounted upon the inner races 101 of the same, which in turn are lightly driven upon shaft 68, all of which taken collectively constitute the means by which rotor 90 is permitted to revolve with anti-friction bearings upon the main shaft 68.

To the inner face of rotor 90 in recessed relation therewith, is the jawed reverse driving clutch 102 which is constructed with jaws similar to those extending over the face of main driving gear 82. The teeth of the jaws of clutch 102 are proportioned suitably to effect appropriate driving relations and to engage with adequate clearance between the teeth as may be desired, so that when gear 82 is moved into actuating position for reverse driving by the operator, it will then be driven by engagement with clutch 102 rigidly attached to rotor 90 and made substantially a part of it.

Bolts 103 passing through clutch 102 and the hub of rotor 90 firmly hold clutch 102 in position. Rotor 90 is further constructed with a shoulder 104 upon which is located a ring 105 split for convenience in assembling, and arranged to provide a radially extending lip. Bolts 103 pass through ring 105 and bind this and clutch 102 together by means of threaded nuts 106 securely screwed to the threaded portion of bolts 103.

Consulting Fig. 4 it will be noted that clutch 102 is centrally orificed to afford a clearance space 106$^b$ between the inner periphery of 102 and shaft 68 to the end that it may not contact with this shaft in order that rotor 90 may revolve upon shaft 68 through its roller bearings 100 only.

Clutch 102 when set in position also acts as a retainer for roller bearing 100 confining it properly within rotor 90, and its outer diameter and thickness is such as to act as a limiting stop with suitable clearance for thrust ring 79, attached to the stud shafts 74 of gear head 70. In this manner the alignment of the teeth of planet gear 76 and annular gear 94 is properly maintained, for gear head 70 cannot approach more than a slight extent toward rotor 90 without clutch 102 and thrust ring 79 coming into contact.

Rotor 90 is also held against longitudinal displacement by means to be described later.

The rearwardly extending hub 96 of rotor 90 is provided with a flanged portion 106$^a$ of enlarged diameter extending circumferentially about it and a shoulder of smaller diameter 107, and concentric with this a smaller hub 108 terminating in the finished end 109.

Securely bolted to flange 106$^a$ of rotor 90 by cap screws 110, as can be seen by reference to Fig. 11 as well as Fig. 4, and centrally disposed about it by virtue of shoulder 107, is the hollow drum like member 111, which carries a series of cooperating parts having various functions and which when located in position, becomes and is substantially an extended portion of rotor 90, partaking of its various movements as if the two constituted a single body.

A 112 shaft 68 is formed with a collar or circumferential shoulder of greater diameter than the shaft and of a thickness to fulfill the purposes to be described.

Securely driven upon shaft 68, with one end of its hub in contact with shoulder 112, is the spoked pulley shaped member 113 which consitutes one member of the high speed clutch of the transmission which will hereinafter be referred to as clutch drum 113.

In addition to the fact that it is a driving fit on shaft 68 the hub of clutch drum 113 is also cut with two oppositely disposed keyways as shown in Fig. 14 at 114 which closely fit the cooperating keys 115, set in shaft 68 and clearly shown in Fig. 4. By this means clutch drum 113 is rigidly attached to shaft 68 and always partakes of its movement.

The end of the hub of clutch drum 113 opposite that which contacts with collar 112 is constructed with an annular flanged portion 116, which when the mechanism is entirely assembled acts as a retainer for the rear roller bearing 100 of rotor 90, confining its members for proper functioning and at the same time affording a limiting stop for any longitudinal movement of rotor 90, for, in case the necessary clearance should be all taken up, the finished end 109 of rotor 90 can contact with the flanged portion 116 of clutch drum 113.

It will also be noted that flange 116 also extends somewhat beyond shoulder 108 for purposes to be described.

Clutch drum 113 is constructed with a cylindrical rim 117 of sufficient strength to withstand all the strains which the operation of the transmission may place upon it, the outside surface of said rim being turned to a diameter to enter within drum 111, leaving between its outside periphery and the interior of drum 111 a clearance adequate for the reception and operation of the coil clutch mechanism to be more fully described hereinafter.

Reverting again to shaft 68 described as having a reduced pilot 67 and a splined part 82ª, terminating in a slight shoulder 82ᵇ, shaft 68 continues of equal diameter as far as collar 112. In practice, however, it is desirable to reduce the diameter of shaft 68 between the roller bearing raceways 101 to facilitate the assembly of the raceways upon shaft 68. The diameter, however, is reduced such a small amount that it cannot be shown in the drawings and amounts to not more than two or three thousandths of an inch.

Consulting Fig. 4, shaft 68 to the right of collar 112 is of uniform diameter to shoulder 118 at which point its diameter is reduced as clearly shown at 119 and further slightly reduced to accommodate the splined portion 120, the end of the shaft 68 terminating in a threaded portion 120ª adapted to fit the collar nut 121 cut with threads therefor.

Shaft 68 is milled on opposite sides as shown in Figs. 4 and 7 in a manner to produce a pair of longitudinal diametrically opposite grooves 122 and 123 extending from shoulder 82ᵇ to shoulder 118, parallel with one another and also with the axis of shaft 68. As shown in Fig. 7 these grooves have radially sloping sides 124 and 125 and the bottoms of said grooves are of circular form concentric with the exterior of shaft 68.

Mounted to slide parallel with the axis of shaft 68 and snugly contained within the grooves 122 and 123 are the two gear shifting fingers 126.

These gear shifting fingers 126 are constructed of such a thickness that they pass freely beneath the inner race of roller bearings 101 and also beneath the hub of clutch drum 113. Fingers 126 are provided at one end as shown in Fig. 4 with an outwardly extending lip or ledge 127, with a circular exterior adapted to engage the inturned lip 85 of gear 82.

From the construction it is clear that ledge 127 enters the aperture 84 of gear 82 and affords a means for moving axially gear 82 along the splined exterior of shaft 68 when properly actuated.

Slidably mounted on shaft 68 between the collar 112 and shoulder 118 is the circularly grooved collar shaped member 128, shown in vertical section in Fig. 4 and partly in vertical section in Fig. 8.

As indicated in these two sections, member 128 is constructed with two oppositely opposed radially tapped holes suitably threaded to receive headless screws 129, provided with dowel shaped ends 130. Screws 129 when located in position are secured by cotter pins to prevent displacement during the operation of the transmission.

Gear shifting fingers 126 are furnished with holes at the end opposite gear 82 adapted to receive the dowel ends 130 of screws 129.

From the description just set forth it is clear that the longitudinal position of gear 82 is controlled by the position of gear shifting fingers 126 and these in turn are controlled by the position of the grooved collar 128. Any corresponding movement of 128 is thus conveyed to gear 82. Furthermore it will be observed that the reciprocation of 128 is limited on the one side by collar 112 which acts as a definite stop therefor and on the other by ball bearing retainer 40 hereinbefore described.

The intermediate or neutral position of collar 128 and gear 82 along shaft 60 is determined by the position of the gear shifting lever which is connected to collar 128 by suitable means subsequently to be described.

At 131 Fig. 4 is shown in section the driving face plate from which the torque of the engine after passing through the transmission is conveyed to the propeller shaft (not shown) of the car. The hub of 131 is broached to snugly fit over the splined exterior surface 120 of shaft 68, and is of such a length that when in position one end of the hub engages the shoulder of part 119 of shaft 68 and the face of the other end is engaged by collar nut 121 with its cotter pin (not shown) to firmly hold 131 in position.

The face plate 131 is formed with a shoulder 132 and is drilled with holes 133, six (6) in number, and is in reality one member of the conventional universal joint 131a Fig. 1 commonly used in automobile construction. Its general dimensions may be made to conform to any particular universal joint which may be selected.

It is to be noted that the exterior of the hub of 131 is cylindrical and is of such outer diameter as to enter oil retainer 43 without contact and with a small clearance. Oil grooves 134 are cut on the inside of oil retainer 43 of a helical shape passing one or more times about the interior circumference thereof and thereby progressing along the line of the axis of the shaft 68 in a direction opposite to that of rotation of the shaft. In other words, as the direction of rotation of shaft 68 is clockwise viewed from the motor end of the transmission, the spiral of the oil grooves as it turns about the oil retainer, progresses toward the transmission, to the end that any oil accumulating in the retainer is forced by the rotation of the shaft back along same and through said helical grooves into casing 1. Front bearing support is provided with similar means to prevent oil leakage. Retainer 43 is also provided with lip 44 which serves to retain main ball bearing adjacent thereto.

The arrangement of driving shaft 60, driven shaft 68, with the system of gearing interposed between them above described, constitutes what may be termed a double epicyclic gear, for the reason that it contains two (2) members upon which the gears are mounted, namely gear head 70 and the rotor 90, one rotatable about the driving shaft 60 and the other about the driven shaft 68. When gear head 70 is held at rest and shaft 60 rotates, gear 61 drives gear 76 and gear 78 in turn drives gear 82. At this time as the axes of the planet gears are at rest, the ratio of the gear train is $$\frac{\text{No. of teeth of 61} \times \text{No. of teeth of 78}}{\text{No. of teeth of 76} \times \text{No. of teeth of 82}}$$

answering to the formula of spur gearing with permanently fixed axes. In the operation of the transmission this affords the low gear, or first speed as it is sometimes called, and the parts are so proportioned that the gear reduction between the driving and the driven shaft will meet all the requirements which have been found to be desirable in standard automobile construction, and this gear reduction may be made to meet substantially whatever gear ratios conditions may require.

On the other hand when gear head 70 is permitted to revolve freely, and second speed rotor 90 is fixed in position, a somewhat different condition exists. This for the reason that while the same gear train is involved, planet gear 76 rolls around the annular gear 94 in the same direction as driving shaft 60 is turning gear head 70, causing the axes of the planets 76 secured thereto to advance in the same direction as both the driving shaft 60 and driven shaft 68. In consequence of this driving shaft 60 will revolve driven shaft 68 more rapidly than it would if gear head 70 were at rest. This condition, i. e., with second speed rotor 90 at rest, constitutes the second or intermediate speed of the transmission and affords such a gear ratio between driving shaft 60 and driven shaft 68 as to likewise satisfy all the conditions found desirable and acceptable in standard automobile construction. The formula for determining gear ratios at second speed, being less simple than that for first speed, is not given herein to avoid confusion, but is determinable from the laws of epicyclics.

It will be understood that means are provided to hold head 70 or rotor 90 in a stationary or fixed position as required, such means being described subsequently herein.

During the operation of the low speed, it is to be remembered that gear head 70 is at rest and in consequence gear 77 of planet 76 will drive annular gear 94 in a direction opposite to that of drive shaft 60, which in turn carries with it rotor 90 and all the parts connected therewith, and in the same manner when rotor 90 is at rest gear head 70 turns in the same direction as drive shaft 60.

Further it will be observed that when gear head 70 is fixed in position and gear 82 is moved out of engagement with planet gear 78 in a manner to engage the jaw clutch 86 with the teeth of its corresponding clutch 102, that gear 82 and shaft 68 will be driven in a direction opposite to that of driving shaft 60. This constitutes the gearing for reverse driving and the parts are so proportioned as to afford a reduction suitable to satisfy all conditions for this gear ratio which are required in the automobile.

From the laws governing the rolling of the members of an epicyclic train the following facts must be borne in mind to obtain a clear understanding of the transmission herein described when the driving shaft and the driven shaft are rotating in the same direction. First—if the gearing is such that the number of revolutions of the driving shaft is greater than the number of revolutions of the driven shaft, the members mounted upon them carrying parts of the epicyclic train, will revolve in a direction opposite to the driving shaft when the driven shaft is held at rest. Second—if the gearing is such that the number of revolutions of the driving shaft is less than the number of revolutions of the driven shaft then the free members of the train just referred to will turn in the same direction as the driving shaft when the driven shaft is held.

Let us take the first condition in which the number of rotations of the driving shaft is greater than the number of rotations of the driven shaft. Disregarding the friction of the device it necessarily follows from the different rate of rotation of the two shafts that the torque of the driving shaft is less than the torque of the driven shaft. Let us assume that the torque of the driving shaft is 10 and the torque of the driven shaft is 30. The driven shaft has a torque of 30 because 20 units of torque have been added to the driving shaft torque 10 by the casing or whatever means may have been provided to check the backward rotation of the gear-carrying members. Therefore, as these members are prevented from going backward, or in a reverse direction to the driving shaft, the casing furnishes a torque of 20 upon the driven shaft, and in the same direction as the driving torque of 10, and hence the torque of the driven shaft has been increased to 30.

In the case where the number of rotations of the driving shaft is less than the number of rotations of the driven shaft, it follows that the torque of the driving shaft is greater than the torque of the driven shaft. Let us assume that the torque of the driving shaft is 30 and the torque of the driven shaft is 10. Under these conditions a torque of minus 20 has been added to the driven shaft, or, in other words, the direction of the reaction of the rotating planet gearing has been reversed and the gear-carrying members will tend to travel in the same direction as the driving and driven shafts unless checked by the casing or by some device provided to withstand the reaction of the gearing.

When the driven shaft rotates in a direction reverse to that of the driving shaft then the conditions of the above reactions occur in the reverse order. That is, if the torque of the driving shaft is less than the torque of the driven shaft, the gear-carrying members will tend to travel in the same direction as the driving shaft and vice versa.

It is this fundamental fact which I have discovered and applied in the design and construction of the transmission described herein which furnishes the means by which the gear ratio between the driving shaft and the driven shaft is controlled, not as is accomplished at present by manipulation of parts directly or indirectly attached to the transmission itself, but merely by regulating the speed of the driving shaft of the engine either through the hand throttle or foot accelerator as ordinarily supplied in an automobile.

It is evident, however, that the particular mechanism used to which this transmission is applied, or the nature of its source of power, is quite immaterial as its operation is founded on kinematic laws herein outlined.

As applied to an automobile transmission which is more particularly the subject of this invention, it can now be understood that when the car is driven in first or second speed against a load, either gear head 70 or rotor 90 must be held against turning in the opposite direction of driving shaft 60. But if the speed of revolution of shaft 60 is reduced quickly below its normal speed by the closing of the throttle, the car is no longer driven by the motor, but the members of the epicyclic train are driven from the reverse end by the momentum of the car, the members of the train revolving about gear 61 of clutch shaft 60, and in consequence gear head 70 and rotor 90 are instantly impelled in a direction opposite to which they previously tended to move and are rapidly driven in the same direction as clutch or driving shaft 60, due to the laws hereinbefore set forth. It is this sudden reversing of the conditions in the transmission set up by manipulating the throttle of the engine which causes the gear ratio of the transmission to change from first to second and from second to high gear practically without any effort on the part of the driver and in a manner which might be termed selective automatic, for it is understood that the change of gears is optional and selective with the driver but the operation of the transmission which controls these different gear ratios is in reality purely automatic. It will be observed from what has preceded that the change of gear is not accomplished by any sliding of the gears into and out of engagement as is done at present but is brought about by a condition of motion or rest of gear head 70 and rotor 90, which is governed by coil brakes and their attendant controlling mechanism which will now be explained.

Referring to Fig. 6, which is a section on line 6—6, Fig. 4, showing casing 1 partly in section, there is seen a horizontal shelf 135 projecting from the casing 1. The front face of this, 136, lies in the same plane as rib 9, and completes the lower portion of this rectangular rib to which cover 10 is attached to the case by bolts 11.

Shelf 135 is furnished with an orifice 137, through which passes bushing 138, with an enlarged collar head 139. Through bushing 138 passes anchor bolt 140, which is provided with threaded portion 141, and nut 142 threaded therefor.

The upper end of anchor bolt 140 is also seen in Figs. 18 and 20, and terminates in a yoke end 143, drilled to receive stud 144, which is secured in position by its headed end and a cotter pin 145.

The yoke shaped head of anchor bolt 140 is of larger dimensions than the threaded portion and constitutes a shouldered head which nut 142 is adapted to clamp in position on shelf 135.

In order to lock anchor bolt 140 firmly in place, above the nut is interposed lock washer 146, and plain washer 147. Nut 142 has also a cotter pin 148. The head 143 of anchor bolt 140 has a laterally projecting lip 149 which is sufficiently near a lug on the interior of cover 10 to prevent the rotation of the anchor bolt 140 when nut 142 is firmly tightened with a wrench.

At 150 in Fig. 4, and interposed between the inside circumference of retaining ring 24, shown in Fig. 4, Fig. 6 and Fig. 15, and the external cylindrical periphery of gear head 70 at 71$^a$ is seen in section a helically extending coil brake which checks the anticlockwise rotation of gear head 70 when the same is under the driving strain of the engine. Coil brake 150 appears in the plan view of Fig. 5, one end in elevation in Fig. 6, and also in side elevation in Fig. 15.

Coil brake 150 when in its normal position, due to its size and elasticity, presses lightly with its exterior against the inside of retaining ring 24 and under these conditions does not contact with part 71$^a$ of gear head 70 and is constructed so that there will always be adequate clearance between the coil and part 71$^a$ to permit gear head 70 to rotate freely within the coil brake 150 without any resistance whatever from it. At 151, Fig. 6 is shown a loop or eye at the end of coil brake 150 which encircles the stud 144 mounted in anchor bolt 140—just described. While the form of eye 151 is immaterial, it is essential that its construction and that of anchor bolt 140, be of sufficient strength to withstand the great strain it must endure.

From what may be termed the anchor end 151 of coil brake 150, the coil extends in a right handed helix within the retaining ring 24 a number of convolutions and as shown in the particular construction herein disclosed it makes 5¼ turns to its loose or free end 152 best shown in Fig. 5.

The number of convolutions of coil brake 150 depends upon the torque of the motor and other considerations and is designed to suit the particular conditions imposed. The number of turns may be less or greater than 5¼ turns to the end that when actuated by the coil brake control now to be explained, it may bind the portion 71$^a$ of gear head 70 with sufficient resistance to hold it stationary against movement as required during the operation of the transmission.

Referring again to Fig. 5, at the end 152 of coil brake 150 is seen a formed right angled portion of coil 150, designated 153, which is in reality its actuating end by which it is caused to hug either the retaining ring or the gear head 70 by the coil controlling mechanism.

By reference to Fig. 4 and Fig. 15, and rotatably mounted upon hub 32$^a$ of main bearing support 32 is disclosed coil controller 154, which is built with a hub portion 155 suitable to rotate upon portion 32$^a$ of bearing support 32 which part 155 is provided with an oil orifice 155$^a$ in line with a similar orifice passing through said portion 32$^a$.

Springing from hub 155 and projecting radially are four or more arms 156, shown best in Fig. 15, which arms are surmounted at their ends by a continuous smooth cylindrical surface or rim 157. Made integral with one of these arms 156 and the rim portion 157, is a serrated segment 158. To this serrated surface 158, and provided with coacting teeth, is the coil adjusting block 159, adjustably attached to controller 154 with a stud 160 rigidly fixed in controller 154, and which with the aid of castellated nut 161 and washer 161$^a$ firmly holds coil adjusting block 159 in suitable relation thereto. This coil adjusting block is also constructed with an oblong aperture 162 near its outer end and suitably proportioned to receive the right angled end 152 of coil brake 150. This aperture 162 is not intended to closely confine the end 153 of the coil but with sufficient clearance to actuate it circumferentially and at the same time to permit such radial motion of the coil end as may be desirable to permit the coil as a whole to follow its normal pathway of expansion. From the description just given it is obvious that coil controller 154 is capable of a rocking movement limited by the movement of the coil which can only expand outwardly until its exterior contacts with retaining ring 24, and can only contract to its inner position to an extent limited by contact with portion 71$^a$ of gear head 70. The extent of this rocking motion at the point 162 is governed by the amount of clearance where the coil lies and in ordinary practice is not more than one or two inches.

Coil 150 is a metallic band preferably of tempered spring steel and ground to be cylindrical to conform with cooperating parts. It may be of suitable width and provided with brake lining.

In Fig. 4 and Fig. 15 at 71$^b$ is shown a rectangular orifice passing through the thickened portion of rim 71ª of gear head 70. This orifice 71ᵇ is provided for the reception of a rectangular lug 163 which projects from the split friction controlling ring 164 which elastically surrounds and embraces with frictional contact rim 157 of coil controller 156.

Controller ring 164 is of such dimensions that when it hugs rim 157 it is not in contact with the inner surface of 71ᵇ but has between it a small amount of clearance. Controller ring 164 further is not a continuous ring but is split at one point as at 165 shown in Fig. 4 and Fig. 15 with an opening which permits the ring to freely expand under the action of centrifugal force and assume a position with its exterior in contact with the inside of 71ᵇ and its interior no longer hugging coil controller rim 157 but away from contact with it.

Owing to lug 163 being confined within aperture 71ᵇ of the gear head 70, ring 164 always partakes of the movement of the gear head 70 and rotates in unison with it in either direction. In order that split ring 164 may be incapable of longitudinal displacement, in addition to being held by lug 163 it is provided with two short circumferential slots 164ª, one of which is shown in Fig. 15. Into each of these slots there projects pin 164ᵇ, which in turn is riveted to rim 71ª.

When gear head 70 is revolved slowly, ring 164 remains in contact with coil controller 154 upon the rim 157 but when gear head 70 accelerates and rotates at a higher speed, centrifugal force causes it to expand and it no longer tends to drive controller 154 with it.

From what has preceded, it is evident that whenever gear head 70 revolves in a clockwise direction or in the same direction as clutch shaft 60 (see Fig. 4), through this frictional arrangement coil controller 156 will cause coil brake 150 to expand and press against retaining ring 24 thus permitting gear head 70 to rotate freely without contact with any of the coils of coil brake 150. On the other hand when gear head 70 reverses its direction or moves anti-clockwise, friction ring 164 carries coil controller 156 along with it thus impelling end 153 of the coil brake similarly in an anti-clockwise direction, thereby causing it to close and tighten on rim 71ª of gear head 70 gently and without any shock whatever, checking its backward movement, stopping it without jar to the mechanism and holding it against further anti-clockwise movement. In this manner does the coil brake perform the function of holding gear head 70 of the epicyclic train so that the engine can drive the transmission with a gear ratio to afford first or low speed of the car.

Rotatably mounted on portion 104ª of hub 96 of the second speed rotor 90, and confined against longitudinal displacement at one side by the radially extending periphery of split ring 105 above referred to and at the other by a shoulder 105ª of rotor 90, is second speed coil controller 166, best shown in Fig. 4. Second speed coil controller has radially extending arms supporting rim 167, which is of the same diameter as coil controller 154 just described in connection with gear head 70, and which performs the same function in operating the coil brake for the second speed rotor that controller 154 performs for the low speed coil brake. Referring to Fig. 7 which includes a side elevation of controller 166, looking from the rear of the transmission towards the motor, there is clearly shown the serrated portion 168 to which is adjustably attached coil adjusting block 169, which has co-acting teeth and which is held in position by castellated nut 170, washer 171 and cotter pin 172 the same cooperating with fixed screw stud 173. In the same manner as adjusting block 159 for the low speed, adjusting block 168 is provided with a rectangular orifice 174 for receiving and actuating the right angled end 175 of coil brake band 176. Coil brake band 176 is proportioned in a manner to lie between retaining ring 24 provided for it and the periphery 91 of second speed rotor 90 with adequate clearance therefrom. Coil brake band 176 progresses from its free end 175, see Fig. 5, in helical convolutions 5¼ turns more or less to its anchoring eyelet 177, as best shown in Fig. 18.

Stud 178 passes through both sides of the yoke end of second speed anchor bolt 179 and through eyelet 177 and is held in position by its enlarged head on one end and a cotter pin on the other. Anchor bolt 179 is firmly held to casing 1 by threaded nut 180. It is unnecessary to describe in detail anchor bolt 179 and its attaching means as it is in every particular like anchor bolt 140 used for anchoring low speed coil 150 and which has just been fully described.

Upon the rim 167 of controller 166, Fig. 4 is a split friction ring 181 embracing the periphery of said rim and provided with a lug 182 entering aperture 183 in rotor 90 as best shown in Fig. 5.

Consulting Fig. 7 the coil controller 166 is shown to be diametrically split in halves in order to afford ease in assembly of the mechanism, and for the purpose of removing controller 166 in case it is desirable. To maintain the two parts correctly positioned, each half has upon appropriate arms 184 and 185 a milled portion with a radially extending shoulder 186 shown in Fig. 7 and also with co-acting lateral shoulders 187 which serve by means of studs 188 and nuts 189 to hold the opposed members in proper circumferential alignment.

Coil controller 166 with its cooperating parts performs in an automatic manner exactly the same functions in checking the anti-clockwise movements of second speed rotor 90, which coil controller 154 effects with gear head 70. It is substantially identical in construction with coil controller 154 with one important difference, however, which will now be explained.

In the description which has been given of the movements of the members of the epicyclic train it was pointed out that during any operation of the transmission when gear head 70 was held stationary, the second speed rotor 90 freely revolved in an anti-clockwise direction. Gear head 70 is always stationary during the operation of the low speed gear and also while driving shaft 68 in a reverse direction. Under both of these sets of conditions rotor 90 must rotate anti-clockwise freely without any resistance from the coil brake. Unless mechanism was provided to prevent it, coil brake band 176, due to its automatic action, would lock rotor 90 against any anti-clockwise turning. Actuating mechanism through the gear shifting lever for holding the coil brake band free from rotor 90 during the operation of the reverse gear is contained and supported in cover 13 shown in Fig. 6 and described in connection with casing 1. The elements and operation of this mechanism will be explained hereinafter, but it is desirable at this time to point out the connecting member which causes the reverse mechanism to control the position of the coil brake 176 of rotor 90. Referring to Fig. 7, it is seen that one of the arms of coil controller 166 is provided with a lug 190 into which is firmly fixed by threaded engagement reverse controller stud 191, shown also in Fig. 5. Stud 191 thereby becomes substantially a part of coil controller 166 and projects radially from it beyond the confines of casing 1 through a suitable opening and well into the chamber provided within cover 13. Stud 191, as will be described later, projects over the reverse actuating mechanism contained in Figs. 6, 21 and 22 and when the shifting lever for controlling the reverse is moved to its proper position the mechanism connected thereto and contained within cover 13 raises stud 191 to the position shown in Fig. 7, to thus move coil controller 166 which in turn frees brake band 176 from rotor 90, and permit rotor 90 to turn in an anti-clockwise direction freely and without any resistance whatever from it until such time as this reverse lever is returned to its former position.

Again referring to Fig. 7, a lug 192, similar to 190 just described is also located upon controller 166 diametrically opposite 190, and this is provided with a controller stud 193 which extends radially in an opposite direction from the stud 191 and projects over the pathway of the low speed actuating mechanism which will be later described and which is supported and contained within cover 10 attached to the outside of casing 1 and opposite cover 13.

When stud 193 is depressed into the position shown in Fig. 7, it will move coil controller 166 into such a position that the controller will cause coil brake band 176 to be entirely free from rotor 90 and rotor 90 can thus turn anti-clockwise without any resistance, which is a necessary condition to the movement of the low speed gear as has been previously described.

In all other conditions, however, excepting that of low speed or reverse, coil controller 166 is free to follow the automatic actions imposed upon it through the medium of rotor 90 and its split ring 181. In high gear it moves clock-wise to its brake extended position and in second speed it moves anti-clockwise to its brake closed position and all these movements take place without jar or vibration to its correlated mechanism.

It has already been pointed out that rotor 90 has a portion 111 rigidly fastened to it by bolts 110 passing through the flange portion 106ᵃ. 111 and high speed drum 113 in combination with their collateral parts constitute the high gear clutch of the transmission, that is to say, form the parts which function to cause rotor 90 to rotate as a unit with shaft 68. This follows from the fact that gear 82 being splined to shaft 68 turns in unison with it, and as 111 and drum 113 are arranged to be firmly clutched together there can then be no rolling movement between gear 82 and annular gear 94. Therefore, the two planet gears 76 cannot rotate as their respective teeth are locked between 82 and 94. In consequence of this, gear 61 of the clutch shaft 60 cannot rotate without carrying with it gear head 70, rotor 90 and clutch drum 113, in other words, shaft 68 being keyed to drum 113 is compelled to turn in unison with shaft 60. This is termed high gear in that the gear ratio between driving shaft 60 and driven shaft 68 is 1:1. The means by which 111 is clutched to drum 113 and the conditions under which this occurs will now be described.

Part 111 shown in section in Fig. 4, in elevation with some of its cooperating parts in Fig. 8, and in elevation and partly in section in Fig. 11 consists of a disc-like rotatable portion 194 carrying a rib 195, converging into a cylindrical rim 196 with parallel interior and exterior surfaces. 196 near its rear extremity has an outwardly extending annular rib 197. From this point rim 196 extends rearwardly of the transmission to a plane somewhat beyond the edge of drum 113. Rib 195 is also supplied with an internal groove 198 which passes about its interior circumference. 111 has also two bosses 199 springing from its front face diametrically opposite one another each bored at 200. At a greater distance from the center of these bosses 199 are two lugs 201 extending beyond the faces of bosses 199 axially.

Rotatably mounted in bosses 199 are the two clutch gears 202 in toothed engagement with a central idling gear 203 which can turn freely on shoulder 108 of rotor 90, and which is prevented from longitudinal movement on the one side by the shoulder of hub 107 and on the other by the flange of the hub 116 of drum 113.

It follows from this arrangement that both the clutch gears 202 can turn only in synchronism and in the same direction.

Referring to Figs. 4 and 11. In these figures it is seen that slidably mounted in circumferential internal groove 198 of the rib portion 195 of 111, and in toothed engagement with clutched gears 202 are the two circular segmental racks 204, provided with teeth 205 suitable to engage the teeth of gears 202 and also provided with enlarged portions 206 which are perforated with rectangular orifices 207.

From this construction it is clear that racks 204, clutch gears 202 and central gear 203 form a gear train all toothed together and that the two racks 204 will rock or move in the same circumferential direction and maintain a perfect balance of the aforesaid gear train irrespective of any intermediate positions they may assume.

Integral with clutch gears 202 are the shoulder portions or studs 208 upon which said gears rock in the bosses 199 and they are of such a length as to afford space for washers 209 and 210 at their ends. Gears 202 also have cylindrical portions 211, squared portions 212, and terminate in threaded ends 213. Mounted to turn freely with gears 202 at 211 are the two fly-balls 214, shown in Figs. 4, 5, 11, 13, 27, 28, 35, 36, 37 and 38, each provided with the radially serrated sides 215. Mounted upon the squared shoulder 212 of gears 202 is collar 216, toothed upon one face with serrations similar to and co-acting with the serrations 215 of fly-balls 214. Upon the threaded portions of gears 202 at 213 are split washers 217 and nuts 218 fitting the threads upon end 213 of gears 202.

From the description which has just been outlined, it will be seen that upon loosening nuts 218 sufficiently, fly-balls 214 can be turned and relatively adjusted and secured on 211 by setting them to engage any of the serrations of washer 216, which latter being squared upon 212 of gear 202 necessarily turns with it at all times.

Fly-balls 214 as seen in Fig. 13 are also provided with flat faces 219 which co-act with similar faces 220 on lugs 201 and furnish the means for limiting the outward movements of the fly-balls. In Figs. 27 and 28 adjusting screws 221 are provided in these lugs in order that a fine adjustment of such movement of the fly-balls may be accomplished without difficulty.

Adjustable stop screws 221 have hexagon heads drilled through their faces with holes 222 to receive locking cotter pins 223, one end of each of which passes through slotted studs 224 driven in lugs 201 for maintaining screws 221 in any desired position.

As the center of gravity of fly-balls 214 does not lie in a radius passing through the center of gears 202, it is obvious that when member 111 of rotor 90 turns at a sufficient speed in either direction that these fly-balls will tend to assume a position with the surfaces 219 and 220 in contact, and in moving to this position from some starting point will actuate the entire gear train impelling the two racks 204 simultaneously and in a clockwise direction viewed as in Fig. 11.

Passing through a rectangular slot 225, (Fig. 8), on the rear edge of rim 196 of 111 is the hooked end 226 of clutch coil 227. As it is essential for the operation of the machine that clutch coil 227 at one end be strongly anchored to rim 196, this hooked end 226 is formed passing from the interior of rim 196 to the exterior, through slot 225, and then turned back upon itself, to embrace a portion of the rim. In order that this hook may not bend under the stress of the operation of the transmission, ring 228 is provided to extend circumferentially about rim 196, being aligned against shoulder 197. Ring 228 is cut with an opening to embrace the end 226 of clutch coil 227. As seen in section in Fig. 9 the aperture for receiving 226 has a shoulder 229 which prevents hook 226 from displacement. Further ring 228 is prevented from axial movement by a series of cotter pins 230 passing through rim 196, two of which are shown in Fig. 4 and Fig. 8.

Clutch coil 227 as viewed in Figs. 4 and 5 passes in a series of left handed helical convolutions about the interior of rim 196 terminating at a suitable point in a right angled end 231, formed and fitted to enter into aperture 207 in the end of one of the coil tightening racks 204, in which it is loosely fitted in order that it may follow its proper pathway without interference.

Clutch coil 227 is of rectangular configuration in section and of suitable strength to carry any load imposed upon it. It is preferably composed of tempered steel spring wire and when rotor 90 is at rest the elasticity of the coil causes it to expand and snugly hug the interior of rim 196 and at the same time to impel rack 204 through the agency of the end 231 and move said rack in an anti-clockwise direction rotating both flyballs 214 also anti-clockwise through the medium of the clutch gear train which has just been described. When coil 227 is in the above described position, that is, hugging the interior of rim 196, the interior of the coil clears rim 117 of clutch drum 113 about 1/32 of an inch, or sufficiently so that the drum may revolve freely within it without any contact whatever.

The amount of spring tension when the coil is within its housing must be sufficient to actuate the fly-balls quickly and freely and is easily determinable by experiment.

After this disclosure as to the relations of the parts involved in the coil clutch it will be seen that the tightening of the coil upon the clutch drum 113 is effected by the centrifugal force developed in the fly-balls upon the rotation of rotor 90. Centrifugal force is the medium used through the clutch gear train to pull one end of the coil and thus close it upon the clutch drum.

I have discovered that the amount of centrifugal force developed by a pair of comparatively light fly-balls at the velocities of rotation at which it is desirable and necessary for the clutch to engage and hold, is quite sufficient, through the clutch gear described to actuate one end of the coil 227 with a suitable number of convolutions, to cause the aforesaid clutch to function in a perfect manner.

As it is desirable that the high speed clutch hold and drive the car at about 12 miles per hour, when the engine is developing its maximum torque, at which times its revolutions may be about 600 turns per minute, the clutch mechanism is designed with fly-balls of sufficient weight, taken in connection with the coil, to afford the necessary grip upon clutch drum 113.

In order, however, that too much stress may not be brought upon the coil as the result of the centrifugal force developed at higher velocities, an adjustment can be made by means of the co-acting teeth on the side of fly-ball 214 as described, so that, when sufficiently tightened for the purpose, the fly-balls can engage stops 220 on lugs 201 or abut against the adjustable screws 221 shown in Figs. 27 and 28.

In considering the operation of the clutch mechanism certain facts must be borne in mind. First—that through the adjustment of the stop for the fly-balls not more than a prescribed amount of tension on the coil can ever develop whatever may be the speed of rotation of rotor 90. Second—that any maximum tension desired of the coil can easily be provided by adjusting the stop against which the fly-balls impinge.

Due to the elasticity of the coil it is always tending to open and disengage the clutch, but the centrifugal force of the fly-balls at the same time is tending to close it, hence, a balance at all times exists which can be maintained wih very great accuracy.

It can also be easily understood that before reaching their point of ultimate rest the fly-balls are exerting a pull upon the coil which may be sufficient to hold the clutch in complete engagement at very low speeds of the car when the torque of the motor is light, which is the case when running over smooth and level roads. The tendency for the clutch to disengage emanates from the motor itself and in practice it has been found that it will hold or slip as the driver may desire over a very large range of speeds.

Referring again to that portion of this specification which has described the manner in which the various speeds are reached through the operation of the epicyclic train, it is to be remembered that second or intermediate speed of the transmission follows when rotor 90 is held at rest. When this is done, the engine can be running at substantially any speed and the car will travel in second speed. However, when the engine through the medium of the throttle is permitted suddenly to slow down, the epicyclic train is driven by the momentum of the car and the gear head 70 and rotor 90 are immediately caused to accelerate in a clockwise direction. In consequence of this rotation of rotor 90, fly-balls 214 are immediately impelled to travel outwardly, causing the high speed coil 227 to tighten upon the drum 117 and before the actual final engagement of the clutch occurs, to gradually accelerate the car from the speed due to second gear, without any jar or jerk whatever, to the one to one (1:1) relation which is finally assumed when the engine has slowed down to synchronize with the speed of the propeller shaft. Once the clutch is engaged in high, the car can be driven indefinitely in this condition. But when the car falls below some predetermined velocity and the torque of the engine is sufficiently great, the clutch disengages, rotor 90 gradually stops, it is then held against anti-clockwise motion by its coil brake band 176, and the car proceeds in second or intermediate gear.

It has been previously pointed out that fly-balls 214 due to the centrifugal force tend to tighten the high speed clutch coil 227 whenever rotor 90 reaches a definite speed in either direction. It has also been shown that when the low speed gear is driving, shaft 68 is rotating clockwise and rotor 90 anti-clockwise. Under these circumstances unless means were provided to prevent it, the clutch coil 227 would tighten upon clutch drum 113 and interfere with its free rotation These means I will now describe.

Referring to Figs. 4, 5, 11, 27 and 28, and particularly to the two latter figures, is seen the two curvilinear symmetrical members 232 attached together forming one complete hub portion 233 with bolts 234. These two members 232 when bolted together form practically one piece to which I shall hereinafter refer as inertia member 232. Hub 233 loosely encircles that portion of rotor 90 heretofore designated as 96, shown in Fig. 4, and is prevented from longitudinal displacement by the two side walls of rotor 90 between which it is free to oscillate. Referring to Figs. 27 and 28 inertia member 232 is seen to have two oppositely disposed prongs 235 each provided with a pawl shaped face 236 and ledge or tooth 237. Inertia member 232 also has two other oppositely disposed arms 238 formed with curvilinear faces 239.

Interposed between the two projecting prongs 235 and 238 are the two fly-balls 214 as they would appear in Figs. 15, 27 and 28 if observed from the engine end of the transmission.

Let it be assumed that inertia member 232 stands in the position shown in Fig. 27 at the moment the car is started in low gear. In low gear, due to the epicyclic train, portion 111 of rotor 90 turns anti-clockwise or in the reverse direction of clutch drum 113. Fig. 27 shows the fly-balls 214 in the position when the coil clutch is loose from the clutch drum 113. Fly-balls 214 are each seen to have a projecting ledge or detent 240 which lies between teeth 237 of the inertia member and the center of shaft 68. When rotor 90 starts turning anti-clockwise ledges 240 and teeth 237 engage in overlapping relation and any radial movement of the fly-balls due to centrifugal force is thus prevented and therefore the coil clutch cannot engage drum 113, and the mechanism can run freely and without interference in low gear.

It matters not what position inertia member 232 may assume when driving in second gear for at that time rotor 90 is at rest and there exists no centrifugal force tending to cause fly-balls 214 to operate the coil clutch.

Let it be assumed that when driving in second gear inertia member 232 remains in the position shown in Fig. 27.

When high gear is required, however, due to the epicyclic train, rotor 90 instantly accelerates clockwise and as there is nothing to urge inertia member 232 clockwise except the light friction due to its resting on hub 96, it lags behind rotor 90 until face 239 engages the hub of fly-ball 214, which causes inertia member 232 to revolve in unison with rotor 90, 237 disengaging from 240, and fly-balls 214 being free to move radially and operate the high speed coil clutch for driving the car in high gear. From what has just been described it is easily understood that the coil clutch cannot engage when rotor 90 is turning anti-clockwise, and can only do so when rotor 90 rotates clockwise as in high gear.

Located between the enlarged rib 195 of 111 and the shoulder 197, which prevent any longitudinal displacement beyond certain limits, and loosely encircling rim 196 upon its exterior as shown in Fig. 4 and partially in section and elevation in Fig. 14, is the manually operable second speed rotor brake band 241 to which is riveted brake lining band 242. At the lower portion of the band as seen in Fig. 4 is a slotted brake guide block 243, formed with a slot 244 intended to surround loosely the dowel end of the bolt 27 which passes through the bottom of casing 1 and furnishes not only a guide to properly align the brake band 242 but also to act as a support of the same with suitable clearance between it and rim 196. Owing to guide block 243 being slotted, band 241 is free to move circumferentially in order that the brake tightening mechanism may adjust itself to any conditions imposed as will now be set forth.

Referring to Fig. 14, brake band 241 and its lining 242, are held, by rivets 245, at their ends to the right and left handed cam blocks 246 and 247, one of which is best shown in Fig. 17. The cam blocks 246 and 247 are each slotted through their upper portion to permit the brake actuating shaft 251 to pass freely through them. Cam blocks 246 and 247 are each provided with cam shaped exterior faces consisting of two dead time surfaces, parallel with one another and extending in radial planes. Connecting one with the other is the inclined surface 250 of such a configuration and angularity as to properly cooperate with two similar inclined faces on parts rotated by shaft 251 and numbered 252. The co-acting members 252 shown in elevation in Fig. 16 are provided with a keyway 253 embracing key 254, which in turn is fitted to slide freely in keyway 255 cut throughout the length of shaft 251. In this manner cams 252 can rotate or rock, with any movement of brake shaft 251, and can adjust themselves to any necessary axial movement.

Brake shaft 251 is mounted to turn freely in bushings 256. These bushings are threaded into the bosses 22 of cover plate 17 of casing 1 for the purpose of longitudinal adjustment. Each of the bushings 256 has a head portion of greater diameter, milled with six (6) slots 257 each suitable to engage rivet pins 258 passing through cover plate 20. From the construction described it is evident that by the removal of cover plate 20, bushings 256 can be longitudinally moved along shaft 251 to meet any necessary requirements for the adjustment of the brake band 241 on rim 196, and that when cover plate is restored to its position, pins 258 lock parts 256 and hold them so adjusted, the slots 257 being of suitable length to remain in engagement with pins 258. Bushings 256 have smoothed ends at 259 against which abut parts 252. Examining Fig. 14 there is further shown a compression spring 260 which loosely surrounds shaft 251 and by its elasticity holds the cam members of the brake band 241 always in contact with parts 252. 252 are each provided with reciprocal cam surfaces consisting of two dead time portions 261 and 262 in parallel radial planes and between them the cam portion 263.

From the above it is understood that the cam surfaces of blocks 246 are firmly pressed in opposite directions by spring 260 against the corresponding cam surfaces of blocks 252 with such timing relations that the instant brake shaft 251 is rotated in a clockwise direction viewed from the left hand side of the transmission, brake band 250 commences to close and take up the clearance between itself and rim 196 of part 111 of rotor 90. In practice the configuration of the cams just described is such that blocks 246 are drawn tightly together while brake shaft 251 rotates through an angle of 15° and during this movement causes the brake band 241 to move from its outward loose position to a position where it grips rim 196 with any desired degree of firmness to control the mechanism as desired.

After brake shaft 251 has rotated about 15° the inclined surface of the cam parts are no longer in engagement with one another, surface 263 having passed beyond the range of 250. In consequence any further rotation of shaft 251 holds blocks 246 firmly together due to the dead time portions 262 provided on each of the members 252. Viewed in Fig. 14 is shown collar 264 attached by pin 265 to the left hand end of shaft 251, which serves to prevent its longitudinal movement in one direction yet permitting it to oscillate when rocked by the brake lever now to be described.

In Fig. 3 is shown a side elevation of the emergency brake lever by which brake shaft 251 is actuated. It also appears partially in Figs. 1, 4, 8 and 11 and partly in section in Fig. 14. Referring to Fig. 3, this emergency brake lever is seen to consist of an upwardly extending body portion 266, terminating at its upper end in the handle 267, and offset with a lateral extension 268, best shown in Fig. 14, for the purpose of clearing the frame beneath it, and in order that it may, without any interference from the frame or any of its parts, actuate brake shaft 251.

Referring to Fig. 3, brake lever 266 is provided with a split hub 269 which is keyed to shaft 251 by key 270, and is prevented from displacement on shaft 251 by bolt 271 which pass through the two bosses on hub 269 and which is threaded on one end to hold lever 266 firmly in position. Extending below hub 269 is the portion of the lever 272 to which is attached by means of bolts 273 the part 274 of a U-shape in cross section, having a bifurcated end 275. Part 274 is made of steel and formed or bent in a manner to embrace part 272 of lever 266 and serves as a guide for some of the parts to be described.

Referring to Figs. 3 and 5 and also appearing in other of the drawings, casing 1 is seen to have two outwardly extending bosses 276 and 277, the outer faces of which are finished in the same plane parallel with the central axis of the transmission. Attached to these bosses 276 and 277, seen best in Fig. 3, is the rack 278 circumferentially disposed about shaft 251 as a center. Rack 278 has upon its inner circumference ratchet teeth 279 designed to co-act with the latch or pawl 280, which is capable of sliding freely and radially within 274. In other words 274 affords a closed channel limiting the movements of 280 that it may move only in a radial direction with respect to the center of shaft 251. It is also to be noted that the bifurcated ends of 274 serve as guides on either side of the rack 278 just described.

Threaded into pawl 280 is a rod 281, the upper end of which is bent at right angles as seen in Fig. 8 to enter a hole provided for it in rocker arm 282. The end of rod 281 may be held in position in rocker arm 282 by a cotter pin in the ordinary manner.

Noting Figs. 3 and 14 rocker arm 282 is seen to be attached by a squared portion 283 on the end of rock shaft 284, which latter passes through portion 268 of brake lever 266, with suitable clearance. Opposite rocker arm 282, and also attached to shaft 284 in a similar manner is the rocking arm 285, constructed with a hole at the end to receive the end 286 of a rod 287, said end being bent at right angles to the rod 287. The manner in which rods 281 and 287 are bent and the relation of the parts are such that rod 281 extends downwardly in front of the center line of 272 and rod 287 extends upwardly to the rear of the center line of the body 266, of the emergency brake lever. Mounted on pin 288 in a manner to rock upon it is the link 289 adapted to receive an eye upon the upper end of rod 287, and also to receive an eye upon the lower end of rod 290 which latter passes upwardly through an aperture provided for it and terminates in a stud 291 in a position to be actuated by the thumb of the driver.

The handle 267 in its interior is provided with a hole for a spring which presses rod 290 in an upward direction at all times and by the arrangement of the mechanism and combination of levers which has been described tends to maintain pawl 280 in engagement with teeth 279 of the circular ratchet 278 whatever may be the angular position of lever 266. The compression spring located in handle 267 which actuates 287 is not shown in the drawings and is of a well known form.

When the driver desires to operate the brake he grasps the handle and with his thumb depresses stud 291 which lifts pawl 280 out of engagement with the teeth of ratchet 278, he then moves lever 266 to whatever position he desires. Upon releasing stud 291, lever 266 remains in the position so assumed until unlatched at the option of the driver.

Referring again to Fig. 3 a projecting lug 292 is seen as a part of 272, to which by a pin 293, is attached yoke end 294 of a brake rod 295. The continuation of brake rod 295 is not shown in the drawings but is connected in the ordinary manner by suitable levers to actuate the usual band brake upon the drum of the rear wheels, and controls in effect what is commonly known as the emergency brake of the car.

In practice the total angular movement of the emergency brake lever 266 is about 30° from line A'—B', shown in Fig. 3, to line A'—D'. At A'—C' is shown a line bisecting this angle or 15° from A'—B'. As has been previously set forth in connection with the manually operable second speed rotor brake and the cams controlling this brake, it was stated that during the rotation of shaft 251 for the first 15° the band brake was tightened on rim 196 and that a further movement of 15° only sufficed to continue to hold the band so positioned upon the rim 196.

In practice the brakes referred to are adjusted in such a manner that during the first motion of 15° the brake rod 295 does not cause the emergency brake bands upon the drums of the rear wheels to tighten, but merely takes up the lost motion in their various connections.

Hence, the first movement of 15° of brake lever 266 tightens the band brake on rim 196 of the second speed rotor 90 and any further movement of lever 266 serves to put the brakes upon the drums of the rear wheels in the ordinary manner and continues the application of the brake on rim 196.

From what has been disclosed of the action of the epicyclic train and the brake mechanism just described, it follows that when the car is travelling in high gear, as shown throughout the drawings, and the driver sets up the lever 266 that it performs three (3) functions.

First—as long as the centrifugal high speed clutch remains in engagement brake band 241 upon its drum 196 acts exactly like the ordinary so-called transmission brake, reducing the speed of the car by the application of resistance to the propeller shaft. When the car is slowed up to such an extent that the centrifugal high speed clutch disengages, brake band 241 holds rotor 90 locked, and the transmission automatically assumes second speed.

In driving cars down long hills it is most desirable to use the engine as the braking means to save wear and tear upon the brake bands and drums and hence it is customary to set the gears of cars in intermediate speed when traveling down hill. It is also a matter of experience that the change from high speed to second speed in the standard transmission when the car is under headway, is very difficult to accomplish. In the transmission which is the subject of this application this difficulty is entirely removed for second speed is gradually assumed by the mechanism at any time by setting up lever 266. Once lever 266 has been set up to the line A'—C', the car will continue running freely in second gear, as only the lost motion has been taken up by brake rod 295 on the rear brake drums.

However, if the driver needs further braking action, moving lever 266 from A'—C' toward A'—D' applies the usual brake upon the rear wheels.

From what has been said it is clear that the mechanism described adds greatly to the safety of driving for the difficulty of changing gears is entirely eliminated and the control of the car is easily and positively assured. Furthermore at any time in stopping while ascending a hill the application of the emergency brake not only brakes the rear wheels but puts the car in second speed, thereby greatly augmenting the holding power of the brakes, and eliminates dangers otherwise present. In descending grades in second gear as just described the transmission immediately resumes high gear as soon as lever 266 is returning to its normal starting point as shown in Fig. 3 with its center line on A'—B'.

In each of Figs. 1 and 3 at 296 is shown in side elevation a gear shift lever, by means of which at his option the driver places the transmission in either a position for driving the car forward, or for driving it in reverse, or for putting it in a neutral position where the rotation of clutch shaft 60 does not cause driven shaft 68 to turn. In Fig. 8, 296 is shown together with the mechanism by which it controls the position of clutch collar 128, which in turn controls the position of driving gear 82 already described.

In the figures referred to 296 is seen to have a hub portion 297, constructed with a slot 298 and adapted to receive bolts 299 to firmly clamp the hub of 296 upon gear shifting shaft 304. Hub 297 has also a keyway 300 fitted to receive key 301 set in one el of shaft 304 which latter is rotatably mounted in bushings 305. Bushings 305 are pressed firmly into the bosses provided therefor one on each side of casing 1 when in proper location. Bushings 305 are formed with heads 306 on the interior ends for purposes to be described.

Shaft 304 is of such a length as to pass transversely completely through casing 1 and to project an amount sufficient at one end to be actuated by lever 296, and at the other end to rotate with it lever 318 which controls part of the reverse mechanism and which will be alluded to when that is described. Lever 318 is rigidly attached to shaft 304 by means of pin 307.

Again referring to Figs. 1 and 3, lever 296 is shown as having mounted upon its upper extremity the ball shaped handle 302. From the hub portion 297, lever 296 extends upwardly and then curves toward the axis of the transmission (see Fig. 8), and then again bends upwardly in such a manner that during its forward and backward movements it will clear all parts of casing 1 without interference. This upwardly extending portion may be threaded at its upper extremity to receive ball 302 and is also designed with a shoulder 303 forming a seat for 302. Below 303, lever 296 gradually tapers and is cylindrical in cross section. When the transmission is mounted in the car the tapering portion just referred to extends above the usual floor board and ball 302 is such a distance above it as to be most conveniently grasped by the hand of the driver. Referring to Fig. 3, lever 296 is seen to have its center line upon the line A—B and when in this position sets gear 82 in a position to properly engage the teeth of gear 78 of planet 76, as shown in Fig. 4. When lever 296 is moved to the position A—C, as shown in Fig. 3, gear 82 is moved longitudinally so that its teeth will be out of engagement with the teeth of 78 and when so positioned there is adequate clearance axially between 82 and 78, and also between the clutch teeth 86 and the teeth 102 of the reverse clutch mounted on rotor 90 already described. This is the neutral position of the transmission above referred to, for now if shaft 60 revolves it only drives planet 76 idly which then cannot rotate 82, the latter remaining stationary.

When lever 296 is moved to the position shown at A—D, in Fig. 3, gear 82 is then moved axially to a position where the clutch teeth 86 are in full engagement with the teeth of 102 of the reverse clutch. In this position any revolution of shaft 60 will cause shaft 68 to revolve in a reverse direction thus driving the car backwards. Thus it will be obvious that the meshing and demeshing of gears takes place only when the car is standing still, and at all other times the gears remain engaged, as distinguished from transmissions in common use.

The means by which the rocking of lever 296 and shaft 304 actuates clutch collar 128, which governs the position of gear 82 and the manner in which it is held firmly in any of the three (3) positions just described at the will of the operator, will now be described.

Rigidly attached to shaft 304 by key 308, see Fig. 10, and bolts 309 and lock washers 310 thereby clamping it at either end, are the double ended rocking levers 311 depending downwardly from shaft 304 and provided at each of their extremities with the inwardly horizontal projecting studs 312, firmly pressed into the ends of levers 311 as shown. The arms of the levers 311 are of such a length that these studs extend downwardly to about the center line of shaft 68 and are constructed to enter the annular groove cut in gear shifting collar 128 as shown in Fig. 4, with such clearance that while studs 312 can position collar 128 they will not in any way interfere with its free rotation.

In Fig. 10 one of the levers 311 is shown as having upon one end thereof the finished portion 313, formed with three (3) conical apertures 314, 315, and 316, of such dimensions as to permit spring plug 317, shown in Fig. 8, to introduce therein its tapered end 318, thereby locating by its centering contact the position of lever 311.

Spring plug 317 is suitably hollow to receive compression spring 319, one end of which abuts against plug 320, threaded into the boss on casing 1. The other end of spring 319 presses against the end of the interior opening in plug 314. Spring plug 317 can slide freely in the boss provided for it in casing 1 and is so located that its conical end 318 can enter any one of the conical orifices 314, 315 or 316. Fig. 10 shows a section of the conical end 318 in orifice 316. When in this position collar 128 holds gear 82 in the position shown in Fig. 4, i. e., in engagement with gear 78 of planet 76.

When gear shifting lever 296 is moved toward the engine to coincide with line A—C, spring plug 317 rides over the intervening surface and enters orifice 315, at which time gear 82 is held in its proper neutral position as just described. When lever 296 is further advanced towards the engine the conical end 318 of spring plug 317 will enter orifice 314, at which time the center line of lever 296 will tally with the line A—D as shown in Fig. 3 and the gear 82 will be properly set for driving shaft 68 in the reverse direction.

The tension of spring 319, and the radial distance of orifices 314, 315 and 316 are so proportioned that while lever 296 is easily moved by the driver, he is instantly cognizant of the fact that any one of the three (3) positions is reached and permits the lever to rest at any point which he may desire.

*Low speed gear.*

Referring to Figs. 1, 2, 3, 6, 8, 18, 19 and 20, and particularly Fig. 2, the latter drawings show approximately the relative position of the transmission when attached to the engine in a car. 321 is a section of the floor board, 322 the inclined foot board, 323 the clutch pedal, 324 the opening in the foot board through which the clutch pedal lever 325 passes. 325 is a curvilinear lever rotatable upon the usual clutch shaft 326 for the purpose of adjustment and furnished with teeth 327 upon a portion thereof to maintain such adjustment. 328 is a supplementary lever provided with a projecting portion slotted at 329. On each side of this slot (not shown in the drawings) are complementary teeth co-acting with the teeth 327. These two members are held rigidly together by means of adjusting bolt 330. Lever 328 is rigidly pinned to clutch shaft 326 by tapered pin 331. Lever 328 has a yoke end 332 and a stud 333. Extending between the members of yoke end 332 is a connecting rod 334 formed with a slot 335 to receive stud 333. Attached to the left hand side of connecting rod 334 in Fig. 2 is spring 336 elastically drawing connecting rod 334 in a direction toward the engine. Spring 336 may be arranged in various ways but in practice it may be attached at its other end to a stud on the engine frame, or it may even be located within cover 10.

Referring now to Fig. 3. In this view clutch shaft 326 at its end most remote from the clutch pedal lever 325 has attached to it by pin 337 the rocking lever 338. Beneath lever 338 is adjusting screw 339 tapped into casing 1 and furnished with a locking nut 340.

Under the tension of spring 336 lever 338 is held upon adjusting screw 339 and thus the zero position of the clutch shaft through lever 328 is established.

In usual automobile clutch practice a certain amount of clearance exists between the clutch shaft yoke and the clutch collar by which the clutch is disengaged in order that no hindrance to the engagement of the clutch may result from the zero position of the clutch pedal lever. It is this clearance which is utilized in my transmission for operating and controlling the low speed gear.

In practice adjusting screw 339 is so set that, before operating the clutch collar and commencing to disengage the clutch lever, 328 will have a certain amount of predetermined movement.

Fig. 2 shows the clutch pedal lever 325 in its normal position as when held by spring 336 against the adjustable stop screw 339.

Connecting rod 334 is seen to have a yoke end 341 which by stud 342 is formed to rock crank 343 when the clutch pedal is depressed by the foot of the driver. Crank 343 is rigidly attached to rock shaft 344 which turns with it when the foot pedal is depressed and which is free to rock in a boss in case cover 10 best shown in Fig. 6. Inside of cover 10 and rigidly attached to shaft 344 by means of castellated nut 345 is cam 346 best shown in contour in Fig. 18. Cam 346 is provided with an actuating face 347 and curvilinear portion 348 and a dead time portion 349. Particular attention will later be directed to the function of the curvilinear depression 348 which can be modified in many ways but which is so proportioned with reference to the operation of the other parts as to hold the transmission indefinitely in low gear.

In operative relation to cam 346 is cam roller 350, confined to rotate freely on stud 351 on the end of lever 352 which at its opposite end is provided with the slot 353. Lever 352 is rotatably mounted on stud 354 constructed to turn in an appropriate boss 355 in cover 10.

Referring to Figs. 18 and 20, stud 354 has a shouldered portion 356 upon which can freely turn lever 357. Stud 354 has also a castellated nut 358 which clamps levers 352 and 357 closely together in combination with a bolt 359 and nut 360.

In Fig. 18 lever 357 is seen to have an actuating portion 361 which when said lever oscillates about stud 354 travels in a manner to engage and force in a downward direction coil controller stud 193 shown also in Fig. 7, the purpose of which has been described.

Let it be assumed that the car is standing at rest and the driver desires to start. He throws out the engine clutch by depressing pedal 323. The first portion of this stroke, namely, that of taking up the lost motion before the clutch yoke engages its collar, causes the mechanism which has just been described to actuate lever 357, depressing collar controller stud 193 to a point where second speed coil brake band 176 is free from rotor 90 and held against its retaining ring 24. Cam 346 has now been rocked and moved to the position shown in Fig. 19, in which roller 350 has completely passed into the curvilinear depression 348 provided therefor.

The foot pedal is now further depressed, to disengage the clutch, and moves cam 346 on its dead time under roller 350.

The driver starts his engine and when properly running permits the clutch to engage. The engine takes up the driving load gradually and rotor 90 moves anti-clockwise tending to carry frictionally with it coil controller 166. But controller 166 cannot move anticlockwise due to the fact that lever 357, just described, holds controller stud 193 depressed in its lowest position thus preventing coil brake 176 from checking the anticlockwise movement of rotor 90.

Due to this succession of events, controller stud 193 presses, to the extent of the friction of the split ring 181, upwardly against lever 357, just described. This holds roller 350 in the depression 348 of cam 346 as the clutch pedal is permitted to rise when released by the driver.

In consequence of the pressure between roller 350 and depression 348 in cam 346, spring 336 cannot return cam 346 beyond the position shown in Fig. 19. The foot pedal, however, returns to its zero position against its stop 339 as it then can, due to the slot 335 provided therefor in connecting rod 334.

Under these conditions and in the manner described the gear continues indefinitely to travel in low until the driver decides to progress to second speed. In order to accomplish this he throttles down the engine, the epicyclic train rapidly accelerates rotor 90 in a clockwise direction; through the momentum of the car the upward pressure of control stud 193 against lever 357 becomes zero due to reversing the direction of movement of rotor 90 and with it the pressure of roller 350 against cam 346 in depression 348 vanishes. With this pressure eliminated spring 336 instantly returns cam 348 to its zero position, as in Fig. 18, when, coil controller stud 193 being no longer held down can follow freely the movements of 166 and the split ring 181 in an anticlockwise direction.

The instant the motor has reached the synchronizing speed for second gear, the driver opens the throttle and the engine accelerates; rotor 90 is gradually checked in its backward movement by coil brake 176 and the transmission commences to drive in second gear as desired.

From what has preceded it is evident that at any time when rotor 90 has an anticlockwise tendency, as when the car is traveling in second speed, it reverts instantly to low gear the moment the driver presses the clutch pedal enough to take up its lost motion without throwing out of the clutch. He does not have to keep his foot on the pedal as it continues to travel in low due to the position of roller 350 in depression 348 as has been set forth.

In this manner it matters not whether the car was traveling in high gear or in second when stopped, for it always automatically starts on low gear, further when traveling on high gear the throwing out of the clutch by the foot pedal does not change it to low gear due to the fact that at that time rotor 90 is traveling clockwise and has no anticlockwise tendency.

In Fig. 8 cover 10 is shown partly in section and exhibits oil duct 362 provided with the threaded end plug 363. When the cap 363 is removed oil can be poured into the transmission and when cap 363 is restored casing 1 is again oil tight.

*Reversing mechanism.*

Referring again to the epicyclic train. In order that the car can be driven in the reverse direction, three conditions must be provided for:

First—gear 82 must be moved by the gear shifting lever 296 so that the clutch teeth 86 of gear 82 will engage teeth 102 of the coacting clutch on rotor 90.

Second—second speed coil brake band 176 must be held free from rotor 90 so that it can rotate freely anticlockwise. As has been set forth this is accomplished by moving in an upward direction coil controller 191 shown in Fig. 7.

Third—gear head 70 must be held stationary against its tendency under these conditions to rotate clockwise.

The first of these conditions is brought about directly by moving gear shifting lever 296 to its extreme forward position coinciding with line A—D.

The two remaining conditions are controlled by actuating the reverse mechanism already referred to and which is contained in cover 13 attached to casing 1 as seen in Figs. 3, 6, 7, 8, 21 and 22.

In Fig. 8 on the end opposite gear shifting lever 296 is bent lever 318 which controls the position of the reverse mechanism.

In Figs. 3 and 8, lever 318 is observed to have a finished end 364 carrying a stud 365 which passes through yoke end 366 of the adjustable connecting rod 367, and which terminates at the other end in eye 368 which fitted to stud 369 is adapted to rock lever 370 by engagement with its yoke end 371.

Through these connections the various positions of lever 370 are determined by the position of gear shifting lever 296 which in turn can be held in any one of the three positions A—B, A—C, or A—D by spring plug 317, Fig. 8.

Lever 370 has a split hub 372 and is clamped by bolt 373 on shaft 374 and fitted with a key, not shown.

Rigidly attached to shaft 374, or made integral therewith, is cam shaft member 375 having two dead time portions 376 and 377, connected together by the inclined cam surface 378. Depending downward from 374 and attached to 375, or made integral with it, is cam 379, provided with the actuating face 380 and the dead time portion 381. In operative relation to face 380 of cam 379 is cam stud 382 held by nut 383 firmly on the short end 385 of coil controller stud locking lever 384 best seen in side elevation in Fig. 21.

Lever 384 on its longer end 386 is so formed and bent that when actuated by cam 379 its longer end 386 will properly engage and force to its uppermost position coil controlling stud 191, thus holding second speed coil brake band 176 free from rotor 90 so that the latter may revolve freely anticlockwise.

The purpose of the cam construction to operate lever 386 instead of a plain lever is so that a quick movement of controller stud 191 can be effected in order that it may move its entire distance while gear shift lever 296 moves from position A—B to position A—C, shown in Fig. 3. This is for the reason that when the gear is neutral it is desirable that the coil brake be free from rotor 90. During the time gear shift lever passes from A—C to A—D the dead time of 381 of cam 379 merely holds lever 384 in its uppermost position, holding the coil disengaged.

Now referring to Figs. 4, 5, 6, and 22, and particularly to Fig. 4, gear head 70, as has been described, has upon its outer periphery a serrated rib 72. Rib 72 is best seen in Fig. 6 and has cut through it a series of equally spaced locking cuts 387 separated one from another by teeth 388 shown in dotted lines.

Mounted so that it can rock freely on stud 389 is locking pawl 390. Stud 389 is driven tightly in bosses 391 located in cover 13 and held in position by pin 392.

Locking pawl 390 at its end is provided with a face which fits the spaces between teeth 388 which have been described, and which when permitted to enter one of these spaces locks gear head 70 against rotation in either direction. Referring to Fig. 21 it is seen that pawl 390 is provided with a sideways extending arm 393 and stud 394 located in such a position that this stud can engage and lie in the path of face cam 375.

Locking pawl 390 also has a cup like projection 395 adapted to receive compression spring 396 which is contained in a hollow cavity in cover 13 marked 397, best shown in Fig. 6. From this construction it is clear that locking pawl 390 is always acted upon by the compression spring 396 and its actuating end would enter spaces 387 were it not prevented from so doing by stud 394 which has to follow cam 375 against which it is pressed by compression spring 396.

From the timing relations which are established between gear shift lever 296 and cam 375 and its connections it follows that when driving in forward gear, the gear shift lever is on line A—B, see Fig. 3, and pawl 390 is held out of engagement with spaces 387 by pawl stud 394 pressing against that portion 377 of cam 375 shown in Fig. 21.

When lever 296 is moved to A—C, pawl stud 394 follows down cam portion 378 but not sufficient for pawl 390 to engage one of the spaces 387. This is the neutral position of the transmission and when lever 296 is so set rotor 90 remains at rest and gear head 70 moves clockwise, gear 82 being out of mesh with the driving planets and the second speed coil brake band 176 being also held free from rotor 90.

When gear shift lever 296 is moved to A—D, locking pawl 390 is permitted to take its full stroke and enter one of the spaces 387 thus locking gear head 70 against rotation in either direction. Under these conditions the car drives in the reverse direction due to the fulfilling of the three (3) conditions first mentioned.

When gear lever is returned to position A—B, locking pawl 390 is again retracted and the transmission assumes the position to again drive the car in a forward direction.

Reverse clutch.

Referring to the modified form of the reverse clutch shown in Fig. 29, in order that it may be more easily compared with the detailed description which has preceded, and that the location of its collateral parts may be better understood, the same numbers of the parts will be maintained where possible.

Gear 82 is modified in the following manner: Clutch teeth 86 are eliminated and in place thereof the periphery of gear 82 is widened and a portion of the face reduced in outside diameter as seen at $82^b$ and the teeth are cut across the entire face. Gear 82 is moved horizontally by the same shifting fingers 126 as have been described. Clutch 102, however, instead of having a four (4) jawed clutch, consists of a ring provided substantially with internal gear teeth $102^b$ having semi-circular spaces between the teeth adapted to receive and engage the teeth $82^b$ of gear 82, when the same is moved axially. In order to facilitate the entrance and engagement of the clutch teeth, gear 82 has its teeth $82^b$ rounded on the outside facing clutch 102, and the teeth of clutch 102 are suitably beveled as is shown in Fig. 29.

In order that clutch 102 may be properly attached to rotor 90, bolts 103 are placed radially more remote from the center of shaft 68.

The advantage of this construction is that the clutch may be engaged more readily, in that there are more openings for the teeth than when the four (4) jawed construction is employed.

Gear diagrams.

Referring to Figs. 23, 24, 25 and 26.

In order that the gearing may be shown more clearly these diagrams are shown as looking toward the engine from the rear of the transmission. Under these circumstances what was previously referred to as "clockwise", now becomes "anticlockwise" and what was "anticlockwise" becomes "clockwise". The numbers of the gears are, however, the same as those referred to in the description herein.

Arrows are placed to show the direction of movement of each of the members. The absence of an arrow indicates that that particular member is at rest.

Fig. 23 shows the movement of the gear in high speed in which all the members of the epicyclic train rotate anticlockwise in unison, and in the same direction, which follows from the engagement of the high speed clutch.

Fig. 24 shows the conditions which exist when driving the gear in second speed. Annular gear 94 of rotor 90 is at rest hence the rotation of driving gear 61 causes planets to rotate clockwise and roll on the annular gear 94, causing their studs 74 to travel anticlockwise carrying with them gear head 70. The result of this is that the velocity of gear 82 is the resultant of the rotational speed of planets 76 as well as the rotation of stud 74.

Fig. 26 indicates the low speed conditions in which the rotation of gear 61 turns planets 76 clockwise but as their studs 74 are held at rest by rotor 70, annular gear 94 turns clockwise and 82 anticlockwise at a lower velocity than when the gear is driven in second speed.

In Fig. 25 is seen the condition during the running of the gear in the reverse direction. In this view the teeth of 78 and 82 are only shown in part indicating that the teeth of these gears are no longer engaged due to the moving of gear 82 out of engagement with 78, and into engagement with rotor 90 through the clutching of the members heretofore described. On this account gear 82 travels clockwise in the same direction as annular gear 94. Note that while driving gear 61 travels in the same direction as before, 82 rotates in the opposite direction.

In Figs. 31, 32, 33 and 34 is shown a modified form of the second speed coil controlling mechanism governed in a different manner from that which has been described. These four (4) views illustrate the mechanism wholly contained in cover 10 which is of the same form as heretofore and is attached to casing 1 in the same way by bolts 11.

In Figs. 31, 32 and 33 is seen the trunnion lever 400 rotatably mounted on one side with its stud in bushing 401 pressed into a suitable hole in casing 1, and upon the other side with its stud in the bushing 402 driven into an opposite aperture in cover 10.

As best shown in Fig. 31, lever 400 has a hollow cylindrical portion adapted to receive in its interior the hollow sliding plunger 403 which permits the insertion within it of spring 404.

Spring 404 is held in a central position with 403 by bolt 405 which is fixed in position by lock nut 406.

One end of 403 is yoke shaped as seen in Fig. 32, and is bored to receive stud 407 upon which can freely rotate roller 408. Stud 407 is formed with an enlarged head and cotter pin to hold it in position.

In Fig. 33 is seen cam block 409 rigidly attached to cover 10 by dowels 411 and bolt 412. Cam block 409 is adapted to afford a raceway for roller 408. It is formed with a substantially dead time portion 413 and an actuating surface 414.

In Fig. 32 cam block 409 is shown to have upon its cam surface a ledge portion for the purpose of preventing roller 408 from turning about the axis of shaft 403, and to maintain the same in line with its raceway.

In Fig. 33 lever 400 is shown with roller 408 upon the dead time of cam block 409, at which time spring 404 has no tendency to move the lever, but when lever 400 is moved in a downward direction to the position shown in Fig. 31, spring 404 through the medium of cam block 409 serves to force lever 400 to its downward position as shown in this figure.

Lever 400 has a projecting arm 415 having an operating face 416 which during its rocking movement can engage coil controller stud 193 and force it as shown in Fig. 31 to its most downward position, thus causing coil brakeband 176 to be free from the drum of second speed rotor 90, which will permit rotor 90 to revolve anti-clockwise as is necessary during the operation of the low speed gear.

On the other hand when lever 400 is in the position shown in Fig. 33, 415 is sufficiently elevated so that coil controller stud 193 can freely move upward permitting the aforesaid coil to engage the drum of rotor 90 and hold the same against anti-clockwise movement.

Lever 400 is provided with a geared sector 417 with teeth 418 having toothed engagement with teeth 419 of rocking lever 420. Lever 420 is rotatably mounted on stud 421 upon which it can freely turn and which is securely mounted in cover 10.

Lever 420 is further furnished with the actuating ends 422 and 424 adapted to be moved by the ledges 423 and 425 of anchor bolts 140 and 179, which lie within the path of movement of 422 and 424 and which will now be described.

In Fig. 31 it will be seen that low speed coil brakeband 150 by means of its eyelet 151 and stud is attached as before to anchor bolt 140 which instead of being rigidly fastened to casing 1 passes through bushing 426 and collar 427 and is held to the latter by nut 428. Interposed between bushing 426 and collar 427 is compression spring 429 designed to hold anchor bolt 140 in its lowermost position under this force acting upon it. It will be noticed that the distance between bushing 426 and collar 427 is sufficient to permit of a certain amount of vertical movement of bolt 140 the purpose of which will be described.

Surrounding spring 429 is case 430 threaded to bushing 426, keeping the mechanism oil tight and protecting it against injury.

In the same manner anchor bolt 179 is slidably mounted in bushing 431 and fastened to brakeband 176 and interposed, as in low speed just described, lies compression spring 433. It is to be especially noted that this compression spring 433 supplies a force sufficient to withstand such an amount of reaction due to the resistance of the load, that bolt 179 will not be raised from its lowermost position when the car is driving in second gear unless this resistance becomes excessive for second speed.

When the engine torque does become too great for the car to be properly driven in second gear, spring 433 will be compressed, and anchor bolt 179 will be raised until collar 432 and bushing 431 come into contact, and the transmission will then assume low gear as will now be set forth.

In Fig. 34 is seen the curvilinear locking plate 434 adapted to move over a small range horizontally guided by the corners 435, 436 and 437 of the plate 434, which are free to slide in grooves in cover 10 formed with appropriate clearance to receive them.

Locking plate 434 is provided with a bent projecting lug 438 through which passes stud 439 threaded into cover 10 and designed to guide compression spring 440 which presses locking plate 434 in such a manner that its vertical face 441 under certain conditions engages block 442 attached to stud 193 and firmly holds it against the inside surface of cover 10, as shown in Fig. 33.

Locking plate 434 has a stud 443 entering a hole in the end of lever 444 rotatably mounted upon a shoulder of stud 421 previously referred to.

Lever 444 has a projecting lip 445 designed to engage lug 446 integral with the head of low speed anchor bolt 140.

From the construction just described it is apparent that at any time when the low speed brake coil 150 is under no tension, its anchor bolt 140 will be in its lowermost or zero position as shown in Fig. 34, and lug 445 being engaged by the projection 446 on low speed anchor bolt 140, will hold locking plate 434 away from block 442 on stud 193 thus permitting the second speed coil to be tight or loose upon the drum of rotor 90 governed entirely by the automatic action of its frictional controlling means.

On the other hand the moment sufficient tension occurs in the low speed coil anchor bolt 140 it will be raised into the position shown in Fig. 33 and block 442 will be clamped tightly by locking plate 434 against the side of cover 10. The clamping force due to spring 440 is adapted to be sufficient to prevent coil controller stud 193 from being actuated by the frictional coil controller 166 thus holding second speed coil brakeband 166 free from the drum or rotor 90 to the end that the same can travel anti-clockwise without any resistance therefrom.

It will also be observed that when the tension on anchor bolt 140 is relieved it will return to a zero position as shown in Fig. 31, leaving, however, lever 400 and lever 420 in the position shown in Fig. 33.

Under these conditions end 424 of lever 420 is seen to be in contact with ledge 425 of anchor bolt 179 of the second speed coil brakeband 176.

In this position it will further be observed that any movement upwardly of anchor bolt 179 will cause lever 420 to rock thus moving lever 400 and causing roller 408 to descend upon cam block 409 until it reaches the curved portion 413. As soon as roller 408 reaches this portion of cam 409, the curved portion 413 will permit this end of lever 400 to descend due to the pressure of spring 404 contained in shaft 403. During the descent of lever 400 its extending edge 416 will encounter stud 193 in whatever position it may be and will force it to its lowermost position as shown in Fig. 31, and will hold the same there against the friction of the coil controller 166. As this forcing down of stud 193 causes second speed coil brakeband 176 to be free from its drum on rotor 90, there is no longer any tension upon it and under the action of compression spring 433 anchor bolt 179 is instantly returned to a zero position as shown in Fig. 31.

As it matters not for its successful operation what may be the initial position of the mechanism herein described when the car is started, let it be assumed that it is at rest as shown in Fig. 31.

In this position the second speed coil brakeband 176 is held free from the drum of rotor 90 as stud 193 is held downwards by the lever 400. Under these conditions second speed rotor 90 can turn freely anti-clockwise and the car can only start in low gear.

As the foot clutch is permitted to engage and the torque of the engine passes through the transmission, tension is developed in coil 150 of the drum on gear head 70, which gradually elevates anchor bolt 140 to the position shown in Fig. 33.

Due to the rotation of lever 420 which is turned clockwise by the lug-like projection 423 from the head of anchor bolt 140, the teeth of its segment rotate lever 400 into the position shown in Fig. 33, and at the same time lug 446 by raising permits the locking plate 434 to move forward thus locking stud 193 against any movement due to the frictional impulse of its coil controller 166.

Under these conditions as the second speed controller 166 cannot actuate, the car advances in low gear and so continues at the option of the driver.

When he wishes to progress to second speed he closes the engine throttle in consequence of which the central members of the epicyclic train both rotate clockwise; the tension upon low speed coil 150 is entirely removed and anchor bolt 140 returns to its lower most or zero position. The return of the anchor bolt causes lever 444 to return clamp plate 434 and release coil controller stud 193 so that when necessary the second speed coil brakeband 176 can engage.

Upon again opening the throttle rotor 90 commences to revolve anti-clockwise and is instantly checked by the second speed coil controller 166 which is now free to actuate and the transmission drives in second or intermediate gear.

At any time when driving in second speed if the tension upon the second speed coil becomes greater than is desirable, second speed anchor bolt 179 will elevate thus causing the transmission to resume low gear.

The mechanism which has just been described in no way controls or influences its advance from second to high speed or from high speed back to second, but has to do only with its progress from first to second speed and back again.

From what has preceded it will be clearly understood that the actual torque of the motor is measured through the reacting coils of the transmission and the tension in the second speed coil at all times determines whether the car should travel in second or low gear and at any time should the stress upon this coil be more than a stipulated amount it will automatically resume low gear. Further it will be observed that in starting the car from a state of rest it will always start in second gear unless such starting would require more than a predetermined torque in which case it instantly resumes low gear without any selective action on the part of the operator.

Compression spring 433 is of the nature of a spring balance, measuring the amount of torque of the motor through coil 176. When the reaction is not sufficient to compress spring 433, the car runs in second and when this balance is exceeded, spring 433 is compressed and thus operates to initiate the functioning of the low gear speed.

In Figs. 35, 36, 37 and 38 is shown a preferred modification of the fly ball mechanism previously described and shown in Figs. 27 and 28. In these latter figures inertia member 232 in connection with detent 240 on each of the fly balls serves to prevent the fly balls from rotating to operate the high speed coil clutch when rotor 90 commences to revolve in an anti-clockwise direction, at the same time permitting them to operate this coil clutch when rotor 90 turns clockwise.

In Figs. 35 and 36, center gear 203 which is in toothed engagement with gears 202 on each of the fly ball shafts is seen to be provided with oppositely positioned radially extending arms 447 and 448 made integral with gear 203.

Upon the end of each of these arms 447 and 448 are the two lugs or bosses 449 and 450 extending through the slots 451 and 452 cut through the disc like portion 194 of member 111 which is attached to rotor 90 by bolts 110. Each of these slots is of sufficient circumferential length to permit lugs 449 and 450 to rock freely without interference from rotor 90 so that gear 203 can follow any movement of the fly ball gears.

Rigidly attached to lugs 449 and 450 by bolts 453 and 454, is the ring 455 provided with the flange portion 456 and the inwardly projecting arms 457 and 458 through which passes the bolts 453 and 454. This construction is best seen in section in Fig. 36.

Concentric with ring 455 is the fixed ring 459 which is firmly held in position by bolts 460 and 461, 462 and 463 to the two angled members 464 and 465 which in turn are bolted to casing 1 by bolts 466 and 467 and suitably doweled.

Fixed ring 459 has an axially extending flange 468, which, when the parts are in position, extends inside of flange 456 of ring 455.

Mounted within the flange 456 of ring 455 is the split ring 469 provided with a projecting lug 470 which projects through the rectangular orifice 471 in arm 457 and which compels the ring 469 to be driven by ring 455. As shown in Fig. 35, ring 469 is split in its circumference at 472.

Ring 469 is also furnished upon its exterior with three narrow slots 473, 474 and 475 shown in dotted lines in Fig. 35 into which project studs 476, 477 and 478, which serve to maintain the two rings 469 and 455 in circumferential alignment, while at the same time permitting ring 469 to move radially.

Ring 469 is of such dimensions that when assembled in position it snugly embraces flange 468 of fixed ring 459 and provides a frictional engagement between it and ring 455.

It will now be observed that when ring 455 is at rest or moving slowly a resistance to its movement is afforded by the elasticity of ring 469, but that when ring 455 reaches a suitable velocity of rotation, split ring 469 will be opened by centrifugal force and will rotate as one with ring 455 without any contact whatever with flange 468 of fixed ring 459.

In Figs. 35, 37 and 38 the fly balls which control the movement of the coil clutch 237 are exhibited in three different positions with their cooperating parts similarly displaced. Before proceeding to the description of the manner of operation of the parts just described, it is to be noted that the rectangular orifice 207ª in circular racks 204ª is extended to form a slot of suitable length surrounding the lug 231 of the coil brake-band 227. By virtue of this slot a certain amount of lost motion can be had by the racks and fly ball gears without disturbing the position of this coil.

In Fig. 35 the relative positions of the fly balls 214, the racks 204ª and coil lug 231 are such that in the clockwise rotation of the fly balls due to centrifugal force they will immediately cause rack 204ª to exert a pull on coil lug 231 and tighten the high speed coil 227. This may be assumed to be the normal position of the fly balls during the operation of second speed. In Fig. 37 rotor 90 is seen to have rotated clockwise and the fly ball to have engaged its stop screw 221 sufficiently tightening the coil 227 for high speed driving.

On the other hand in Fig. 38 is shown the fly ball in a reversed position against its backward stop 479, with the lost motion in slot 207ª entirely taken up and with coil lug 231 in such a position that the coil 227 is tightly held against the inside of its housing 196 entirely free from the clutch drum 113.

In this last position of the fly ball shown in Fig. 38 and just described, it will be noted that the center of gravity of the fly ball has now passed to the opposite side of a radial line through the center of the main shaft and the center of the fly ball shaft and in consequence any anti-clockwise rotation of rotor 90 will develop a centrifugal force which will maintain fly balls 214 locked against their stops 479 and securely hold 196 the coil clutch tightly against the interior of its housing and away from the clutch drum 113.

Under these conditions the anti-clockwise rotation of rotor 90 in the operation of the low gear will not in the least be interfered with by the high speed coil 227 as it is positively held away from the drum 113.

During the change from low to second speed, rotor 90 simply stops, leaving the coil clutch drum free to turn.

However, when high gear is required rotor 90 turns in a clockwise direction. Due to the friction exerted upon ring 455 by the close frictional contact of its split ring upon ring 459, ring 455 does not immediately follow the rotation of rotor 90 but remains at rest, and the fly ball gears 202 rotate clockwise upon gear 203 thus positively returning the fly balls to the position shown in Fig. 35, where their centers of gravity are upon the opposite side of the radial line just referred to, and centrifugal force tends to rotate them further into the position shown in Fig. 37 which operates the high coil clutch 227 as desired.

In order that the car may again drive in low, rotor 90 must stop and reverse its direction of rotation, and when this is done it follows that ring 455 is again for an instant or more at rest, and the rolling of the gears 202 upon 203 rotates the fly balls anti-clockwise against stops 479 in a position to positively hold the coil clutch 227 open for low speed driving, as shown in Fig. 38.

In the operation of the mechanism which has just been described centrifugal force becomes the locking agent for holding the fly balls in proper position and in changing to high gear it causes the high speed clutch to engage more quickly.

The description of the transmission herein shows it to be provided with three speeds and a reverse as practice has demonstrated this to be entirely satisfactory for ordinary passenger cars. Gear 82 is shown as having three positions, any one of which it assumes when actuated by the hand shift lever 296 and held by the spring stop 317 shown in Figs. 8 and 10. In describing Fig. 10, it has been pointed out that lever 311 has three conical orifices 314, 315 and 316 which determine the longitudinal position of gear 82 along shaft 68.

The preferred form of gear 82 and reverse clutch 102 has been shown and described in connection with Fig. 29 and it is to this figure that reference will be had in describing the modification of the gear shown in Fig. 39.

In the construction of some passenger cars and more particularly in the case of heavy commercial vehicles, three speeds and reverse have been found not to possess all the speed ratios desirable and in consequence it is customary to provide four forward speeds and a reverse.

In the modification shown in Fig. 39, four forward speeds and a reverse can, by departing but slightly from the structure herein described, be incorporated in the transmission to meet the conditions which prevail in such practice.

In Fig. 39 main shaft 68 is seen to be somewhat elongated in its splined portion 82ª permitting a greater longitudinal movement of gear 82 when shifted by the hand lever through the medium of the shift fingers 126.

The thrust ring 79ª is also shown to be more heavily constructed, and if so desired, can be attached to rotor 70 at a greater number of points to provide adequate strength. The annular gear 480 is cut with its teeth on the interior circumference of ring 79ª.

This annular gear 480 is cut with the same pitch and number of teeth as gear 82, but with such an increased tooth depth and clearance, and rounded upon the edges of the teeth, so that shifting fingers 126 can readily draw gear 82 into or out of engagement with annular gear 480, or to pass completely beyond it and engage the reverse clutch as has been heretofore pointed out.

For the satisfactory operation of this arrangement, lever 311 should be provided with four conical orifices, not shown in the drawings and the hand shifting lever in consequence would have four distinct positions.

In the operation of the gearing shown in Fig. 39 when positioned as shown in this figure, the gear is set to run in low, intermediate and high automatically by the throttle in the same manner as heretofore described.

When gear 82 is moved out of engagement with the planet 78 but not sufficiently to engage annular gear 480, the mechanism is set in a neutral position.

When gear 82 is still further moved axially it engages annular gear 480 thus locking gear 82 to rotor 70. Under these conditions when rotor 90 is held by its coil brake against anti-clockwise rotation, main shaft 68 is driven clockwise or appropriately for a forward speed but at the velocity of rotation of gear head 70 due to its planet 76 rolling upon the annular gear 94.

When this gear relation is maintained, for one revolution of shaft 68 the driving shaft 60 must make one more revolution than when driving the reverse, at which time gear 82 is locked to and driven by rotor 90.

When the gear is set as above, an extremely low forward emergency speed is developed sufficient to meet any ordinary conditions arising in practice.

In the driving of commercial vehicles such as heavy trucks, it is customary for the driver not to start under ordinary circumstances upon the lowest gear but to operate through three speeds, leaving the lowest speed for emergency use only.

Thus in the operation of a vehicle equipped with this form of transmission, its control follows the same automatic action as that of the three speed transmission for a passenger car, but at any time the driver can call into action the emergency speed if he so desires.

When gear 82 is moved out of engagement with annular gear 480, it assumes another neutral position, as it now rests between gear 480 and reverse clutch 102ª. When he desires to drive forward under ordinary circumstances he sets the gear as shown in Fig. 39, at which time its three speeds follow one another automatically.

During the ordinary operation of the gear when a car is started down hill and second speed is not required the transmission automatically steps from the low gear to high gear, and this condition also follows when the car is being driven in low gear at such a velocity that the fly balls can tighten the high speed clutch by throttling down the engine, and further in driving a grade on high gear it will descend to low gear, eliminating second when the clutch pedal is slightly depressed.

*Brake lever detent stop.*

Referring to Figs. 1, 3, 14, and particularly to Fig. 3, it has been pointed out that brake lever 266 has a stroke from A'—B' to A'—D', and that at A'—C' it causes the transmission to positively assume second gear by the application of brakeband 241 around the second speed rotor 90, and that during the stroke from A'—C' to A'—D' the emergency brake is applied upon the drums of the rear wheels.

In the operation of an automobile it is desirable that the operator should be able to move brake lever 266 to the position A'—C' quickly and stop it positively in that position without applying the rear brakes.

Figs. 40, 41, 42 and 43 illustrate a simple and positive means of checking the movement of lever 266 at that point, and at the same time enabling the operator without effort if he so desires to pass over this stop and apply the rear band brakes.

The stop mechanism is shown in detail in side elevation and partly in section in Fig. 40, in two positions in Fig. 41 and in a position similar to Fig. 40 in Fig. 42, the latter being a partial view of Fig. 3, but with the brake lever in the position A'—C'.

Consulting Fig. 40. Securely riveted to cover plate 20 by rivets 481 is the block 482 provided with the yoke ends 483, through which passes the stud 484. Rotatably mounted on stud 484 is the pawl 485, having the right angle portion 486 against which presses stud 487, which guides spring 488, which is enclosed in aperture 489 of block 482. Spring 488 causes pawl 485 to rotate into the position shown in this figure. Pawl 485 is constructed with a stop surface or detent 490 and a curved surface 491. Projecting from the side of 485 is the cam block 492, which is a part of 485. In Fig. 40 the underside of lever 266 is shown to be cut away into the form of a tooth 493, which co-acts with detent 490 of pawl 485 when lever 266 is in its central position A'—C'.

When the operator desires to use the second speed lock he simply grasps the brake handle and moves it until tooth 493 encounters the stop 490.

In position A'—C', cam surface 492 is located in contact with and directly beneath rocking lever 285, which is actuated by thumb latch 291 in the brake handle. Should the driver desire to move the brake lever beyond A'—C' to engage the rear brake band, he presses thumb latch 291 down and lever 285 at once depresses pawl 485, permitting tooth 493 to pass over detent 490, thus allowing the application of the rear brakes. The position of lever 285 at this time is best shown in Fig. 41.

It is also clear from what has been described that if the brake lever is in position A'—B' and the driver depresses the thumb latch 291, lever 266 will not encounter the stop, but will pass over it into position A'—D'. Further, when the latch 291 is depressed, lever 266 can be moved backward and forward from one extreme position to another without any interference from the stop mechanism.

*Low speed locking device.*

In Fig. 44 is illustrated a modification of the gear shift lever mechanism shown in Fig. 8, and which provides a means by which the transmission may be locked positively in forward low gear if the driver so desires. In this figure the head 306ª of the left hand bushing 305 is seen to be cut with a clutch face 306ᵇ engaging a corresponding female surface cut in the end of lever 311 shown in Fig. 8. Bushing 305 at its other end is formed into a similar clutch 306ᶜ capable of clutching with lever 296 when in the position shown in solid lines in Fig. 44.

In this figure it is to be noted that the slits and binding bolts as well as the keys and keyways shown in Fig. 8 are eliminated. In this way shaft 304ª can rotate and slide freely through the two bushings 305 and through the double lever 311. It is also to be observed that an amount of clearance is introduced between the head of lever 318 and the face of the boss on casing 1 to permit shaft 304ª to be moved in a left hand direction sufficiently to permit the tooth of the clutch formed on the hub of lever 296 at 306ᵇ to be disengaged from the clutch in collar 305. In consequence, when lever 296 is moved sideways to the position shown in the dotted lines in Fig. 44, any rocking movement of the gear shift lever 296 will not disturb the position of double lever 311 as shaft 304 will turn freely within it. Under these circumstances the backward and forward movement of the gear shifting lever will simply rock lever 318.

When, however, lever 296 is in the position shown in solid lines, the clutch surfaces of bushing 305 will remain engaged and the mechanism will follow precisely the movements described in connection with Fig. 8. When the driver desires to lock the mechanism in low gear, as for instance when descending an unusually steep decline, he moves lever 296 as shown slightly to the left and then moves the lever in the position which would ordinarily cause the transmission to drive the car in a reverse direction i. e. position A—D of Fig. 3.

The car does not, however, drive backward for the reason that the position of lever 311 has not been disturbed and gear 82 is still in engagement with planets 76 and in a position to drive the car forward. The new position of shift lever 296 simply serves to permit the positive locking of gear head 70 by means of pawl 390 having entered one of the toothed spaces 387 in gear head 70. At the same time this has been accomplished the second speed coil brake band has been forced against its retaining ring in the same manner as though the car were driving to the rear. The toothed spaces in gear head 70 and the conformation of the pawl are such as to prevent rotation of gear head 70 in either direction. Hence, under these conditions, the car will travel in low until the driver restores gear shift lever to its original position.

To those skilled in the art of constructing a mechanism of the class described, many alterations in structure and widely differing embodiments and applications of my invention will suggest themselves, without departing from the spirit and scope thereof. Hence I do not desire to be limited to any of the details enumerated in the construction set forth herein.

Having thus fully described my invention, what I claim as new and desire to secure by Letters Patent, is:—

1. In a transmission of the character described, the combination of driving and driven shafts and gears thereon, planetary gearing for interconnecting said gears, including independently rotatable gear carriers whose revolution and arrest give different transmission ratios, and centrifugal clutch means for connecting said gear carriers together when both released.

2. An epicyclic gear train comprising alined driving and driven shafts with corresponding gears thereon, planet gears engaging said driving and driven gears, with a carrier therefor rotatable about the axis of said shafts, braking means for said carrier, and an automatic controlling device for actuating said braking means having a fixed pivotal point and rockable about the axis of said shafts through a limited arc only.

3. An epicyclic gear train comprising a driving shaft with a gear thereon, a driven shaft in alinement therewith and provided with a driven gear, planet gears engaging both the driving gear and the driven gear, a member rotatable about the axis of said shafts and carrying said planet gears, a brake, and a frictionally controlled automatic device adapted to actuate said brake to check the rotation of the planet gear carrying member.

4. An epicyclic gear train comprising a driving shaft with a gear thereon, a driven shaft in alignment therewith and provided with a driven gear, planet gears engaging both the driving gear and the driven gear, a member rotatable about the axis of said shafts and carrying said planet gears, a braking means, and a device frictionally controlled by said member for actuating said braking means to check the rotation of the planet gear carrying member.

5. An epicyclic gear train comprising a stationary casing, a driving shaft with a gear thereon, a driven shaft in alignment therewith and provided with a driven gear, planet gears engaging both the driving gear and the driven gear, a planet gear carrying member rotatable about the axis of said shafts, a coil brake having one end thereof attached to said casing, and an automatic device operated by the rotation of the gear carrying member and engaging said coil brake for actuating it to check the rotation of the planet gear carrying member.

6. In a power transmission, the combination comprising a stationary casing, a driving shaft, a driven shaft, planet gear mechanisms and rotatable members for connecting the driving shaft to the driven shaft, and a coil brake having one end thereof attached to said casing, and means frictionally controlled according to the direction of rotation of one of said rotatable members for operating said brake to check the rotation of one of said members and vary the speed of said driven shaft.

7. In a power transmission, the combination comprising a stationary casing, a driving shaft, a driven shaft, a planet gear mechanism and rotatable members for connecting the driving shaft to the driven shaft, a coil brake having one end thereof attached to said casing for checking the rotation of one of said members to vary the speed of said driven shaft, and automatic means for controlling said brake in accordance with the direction of rotation of said member.

8. In a power transmission, the combination comprising a driving shaft, a driven shaft, a planet gear mechanism and rotatable members for connecting the driving shaft to the driven shaft, a coil brake for checking the rotation of one of said members to vary the speed of said driven shaft, a controller for controlling said brake, and means automatically operated by the momentum of the load on the driven shaft for operating said controller.

9. In a power transmission, the combination comprising a driving shaft, a driven shaft, a planet gear mechanism and a plurality of rotatable members for connecting the driving shaft to the driven shaft, coil brakes for checking the rotation of said members to vary the speed of said driven shaft, and automatic means for controlling said brakes in accordance with the direction of rotation of said members.

10. In a power transmission, the combination comprising a driving shaft, a driven shaft, a planet gear mechanism and a plurality of rotatable members for connecting the driving shaft to the driven shaft, coil brakes for checking the rotation of said members to vary the speed of said driven shaft, controllers for setting said brakes, and means automatically operated by the momentum of the load on the driven shaft for operating the controllers.

11. In a power transmission, the combination comprising a stationary casing, a driving shaft, a driven shaft, a gear carrying member rotatable about the axis of the driving shaft, planet gears carried by said rotatable member and connected to said shafts, a coil brake having one end thereof attached to said casing and operated for engaging said rotatable member, and automatic means for setting said brake to hold said member against rotation in only one direction and for releasing said brake upon rotative movement of said member in a reverse direction.

12. In a power transmission, the combination comprising a stationary casing, a driving shaft, a driven shaft, gearing mechanism and a member rotatable about one of said shafts for connecting said shafts to operate the driven shaft at various speeds, a coil brake having one end thereof attached to said casing and operated for engaging said member to control said mechanism, and automatic means for setting said brake when the member is given a movement of rotation in one direction to hold the member only against rotation in one direction and for releasing said brake upon movement of the member in a reverse direction.

13. In a power transmission, the combination comprising a driving shaft, a driven shaft, gearing mechanism and a member rotatable about the axis of one of said shafts for connecting said shafts to operate the driven shaft at various speeds, a brake for said member to control said mechanisms, a rockable member having a fixed pivotal point for controlling said brake, and means operated by rotation of the rotatable member in one direction for operating said rockable member to set said brake and operated by movement of rotation of the rotatable member in a reverse direction for operating said rockable member to release the brake.

14. An epicyclic gear train comprising a driving shaft with a gear thereon, a driven shaft in alignment therewith and provided with a driven gear, planet gears engaging both the driving gear and the driven gear, a planet gear carrying member rotatable about the axis of said shafts, a coil brake, and a brake controlling device mounted to rock about said driving shaft and adapted to actuate said coil brake to check the rotation of the planet gear carrying member.

15. An epicyclic gear train comprising a driving shaft with a gear thereon, a driven shaft in alignment therewith and provided with a driven gear, planet gears engaging both the driving gear and driven gear, a planet gear carrying member rotatable about the axis of said shafts, a coil brake, and a brake controlling device mounted to rock about said driving shaft and adapted to actuate said coil brake to check the rotation of the planet gear carrying member in only one direction.

16. An epicyclic gear train comprising a driving shaft with a gear thereon, a driven shaft provided with a driven gear, planet gears engaging both the driving gear and the driven gear, a planet gear carrying member rotatable about the axis of said driving shaft, a coil brake, a brake controlling device and a split ring operated by said planet gear carrying member for actuating said brake controlling device to operate said brake and check the rotation of the planet gear carrying member.

17. An epicyclic gear train comprising a driving shaft with a gear thereon, a driven shaft in alignment therewith and provided with a driven gear, planet gears engaging both the driving gear and the driven gear, a planet gear carrying member rotatable about the axis of said shafts, a coil brake, a brake controlling device, a split ring driven by said planet gear carrying member adapted for actuating said brake controlling device to operate said brake and check the rotation of the planet gear carrying member, and means to limit the expansion of said coil brake.

18. An epicyclic gear train comprising a driving shaft with a gear thereon, a driven shaft provided with a driven gear, planet gears engaging both the driving gear and the driven gear, a planet gear carrying member rotatable about the axis of said driving shaft, said member being provided with locking teeth, separate locking means for engaging said teeth to positively lock said member, a braking means, and an automatic controlling device therefor adapted to actuate said braking means to check the rotation of the planet gear carrying member.

19. In an epicyclic gear train the combination of a driving shaft with a driving gear thereon, a gear carrying member rotatable about said shaft, said member being provided with compound planet gears mounted to rotate upon it, one of which compound planet gears is adapted to mesh with said driving shaft gear, a driven shaft in alignment with said driving shaft and provided with a driven gear, said driven gear being adapted to mesh with another one of said compound planet gears, a gear carrying member rotatable about said driven shaft and provided with an internal annular gear adapted to mesh with the one of the compound planet gears which engages the driving gear, a coil brake encircling each of the said gear carrying members and adapted to check their rotation in one direction, an automatic coil brake controller mounted concentric with each of said rotatable members, separate means arranged to actuate the coil brake controller associated with the gear carrying member rotatable about the driven shaft and means to limit the expansion of the coil brakes.

20. In a power transmission mechanism the combination of a frame or casing, a driving shaft mounted therein, a gear carrying member rotatable about said driving shaft, a driven shaft mounted in the casing and a gear carrying member rotatable about said driven shaft, gearing mechanisms connected to said members for connecting said shafts, coil brakes anchored to said casing and adapted to check the rotation of either of said gear carrying members, controllers actuated by the rotation of the gear carrying members for controlling each of said brakes, separate auxiliary means for actuating one of said brake controllers, and a centrifugal clutch mechanism driven by one of said gear carrying members for connecting the latter to the driven shaft.

21. In a power transmission mechanism, the combination of a casing, a driving shaft, a driving gear thereon, a gear carrying member rotatable about said driving shaft, locking teeth on said gear carrying member, separate locking means for engaging said teeth to positively hold the gear carrying member against rotation, a driven shaft mounted in said casing and provided with a driven gear, a clutch face on said driven gear, means to move the driven gear along the driven shaft, an auxiliary gear carrying member rotatable about said driven shaft, a clutch face on said auxiliary gear carrying member suitable to engage the clutch face on said driven gear, a centrifugal clutch for connecting said auxiliary gear carrying member to the driven shaft, separate braking means adapted to control said auxiliary member, coil brakes anchored to said casing and adapted to check the rotation of either of said gear carrying members, controllers actuated by the rotation of the gear carrying members for controlling each of said brakes, separate auxiliary means for actuating one of said brake controllers, and means to limit the expansion of said brakes.

22. In an epicyclic geared power transmission, the combination of a casing, a driving shaft, a driven shaft, two gear carrying members respectively rotatable about said shafts and gearing mechanisms for connecting said shafts, a brake for one of said gear carrying members, a controller for said brake, a bearing housing attached to said casing and providing a bearing for said brake controller and an inner raceway for an anti-friction bearing mounting one of the rotatable gear carrying members, said bearing housing also having on the interior thereof a helically grooved oil retainer and an outer raceway for an anti-friction bearing for said driving shaft, a driving gear on said driving shaft provided with an aperture, an anti-friction bearing mounted in the aperture formed in the driving shaft for supporting one end of said driven shaft.

23. In an epicyclic three speed and reverse power transmission, the combination of a casing, a driving shaft with a driving gear thereon, a driven shaft, a driven gear splined to said driven shaft, gear shifting fingers arranged to slide upon the driven shaft and actuate said driven gear, a grooved collar attached to said fingers, a transverse shaft mounted in said casing, a yoked lever mounted on said transverse shaft for moving said collar and for holding it in different predetermined positions, a gear shifting lever outside of said casing for rocking said transverse shaft to actuate said yoked lever, and a lever fixed to said transverse shaft and arranged to actuate auxiliary reversing mechanism.

24. In an epicyclic three-speed and reverse power transmission, the combination of a casing, a driving shaft with a driven gear thereon, a driven shaft, a driven gear splined to said driven shaft, gear-shifting fingers for shifting said driven gear and carried by said driven shaft, a grooved collar attached to said fingers, a transverse shaft mounted in said casing, a yoke lever mounted on said transverse shaft for moving said collar, a shifting lever outside of said casing for rocking said transverse shaft to operate the yoke lever and for moving it longitudinally with respect to said casing and yoke lever, and means for controlling the connection of said transverse shaft to the yoke lever by the longitudinal movement thereof.

25. In an epicyclic gear power transmission, a driving shaft, a driven shaft, a driven gear splined to said driven shaft, clutch teeth formed on said driven gear, two gear carrying members respectively rotatable about said shafts and gearing mechanism for connecting the shafts together, locking teeth on said gear carrying member rotatable about the driving shaft, locking means to engage said teeth, clutch teeth on the second gear carrying member to engage the clutch teeth upon the driven gear, brake mechanism for controlling the rotation of said second gear carrying member, a gear shifting lever for moving said driven gear into engagement with the clutch teeth upon the second gear carrying member, and means actuated by said gear shifting lever to operate said locking means and said brake mechanism.

26. In an epicyclic gear power transmission with a reversing mechanism, the combination of a driving shaft with a driving gear thereon, a gear carrying member rotatable about the driving shaft, locking teeth on said gear carrying member, locking means for engaging said teeth, a driven shaft, a longitudinally movable driven gear mounted on said driven shaft, a clutch face thereon, a second rotatable gear carrying member mounted upon the driven shaft, gearing mechanism carried by said gear carrying members for interconnecting said gears on said driving and driven shafts, a clutch face on said second rotatable gear carrying member adapted to engage the clutch face upon the driven gear, a braking means for said second gear carrying member, a brake controller for operating said brake, a gear shifting lever and means operated by said lever for clutching the driven gear with the second gear carrying member, for operating the brake controller to hold the brake in released position and for operating said locking means to engage the locking teeth upon the first mentioned gear carrying member and to hold the same against rotation in either direction.

27. In an epicyclic gear power transmission, a clutch pedal, a driving shaft, a driven shaft, gearing mechanism and a gear carrying member for connecting the driving shaft to the driven shaft, a braking means for said gear carrying member, a controller for said braking means, an adjustable lever adapted to actuate said brake controller, a cam adapted to rock said adjusting lever, a slotted spring actuated connecting rod, and means operating the cam in one direction by depressing said clutch pedal and for retracting the cam by the slotted connecting rod.

28. In an epicyclic gear power transmission, the combination of a driving shaft, a driven shaft, gearing mechanism and a gear carrying member for connecting said shafts, a braking means for said member and provided with a brake controller, a rocking lever suitably mounted to actuate said controller, a cam member in operative relation to said rocking lever, said cam member being provided with a circular and an ogee curved surface, and a spring actuating means for rotating said cam member in one direction, said spring actuating means being adapted to rotate said cam member beyond the ogee curved point only when the stress upon the brake controller is removed.

29. In an epicyclic transmission, a driving shaft, a driven shaft, gearing mechanism and a gear carrying member for connecting the driving shaft to the driven shaft and operating the latter at a predetermined speed when the gearing carrying member is held stationary, a centrifugal clutch for directly connecting said member to the driven shaft, and a brake for said member; so that the driven shaft may be braked directly when the clutch is in operative position, and the member may be held stationary by the brake when the clutch is released.

30. In a self-propelled vehicle having an emergency brake, the combination therewith of a power transmission comprising a driving and driven shafts; change speed gearing for interconnecting said shafts, including rotatable parts for controlling and varying the transmission ratio; a brake for one of said rotatable parts; an emergency brake lever; and means operated by the emergency brake lever for applying said brake prior to the application of the emergency brake.

31. In an epicyclic transmission, the combination comprising a driving shaft, a driven shaft, gearing mechanisms and a gear carrying member for connecting the driving shaft to the driven shaft and operating the driven shaft at a predetermined speed when the gear carrying member is held stationary, a clutch mechanism for fixedly connecting the gear carrying member to the driven shaft to operate the driven shaft at a higher speed, centrifugal means for controlling said clutch mechanism and a brake for checking said member to effect a braking action on the driven shaft and for releasing said clutch mechanism when operating the driven shaft at the higher speed and for holding said member to operate the transmission in lower gear when operated and the clutch mechanism is in released position.

32. In an epicyclic transmission, a driving shaft, a driven shaft, gearing mechanisms and a rotatable gear carrying member for connecting the driving shaft to the driven shaft, braking means for holding said member against rotation to operate the driven shaft at one speed, clutching mechanism for fixedly securing said member to the driven shaft to operate the latter at a different speed, and centrifugal means controlled by the rotation of said member for automatically operating said clutching mechanism.

33. In an epicyclic automobile transmission, a driving shaft, a driven shaft, gearing mechanisms and a gear carrying member for connecting the driving shaft to the driven shaft, a brake mechanism acting on said member, a centrifugal clutch for connecting the member fixedly to the driven shaft, said brake mechanism being adapted to apply a brake upon the driven shaft of the automobile while said clutch is engaged, to hold the transmission in a lower gear when the said clutch is disengaged and to apply a separate braking means upon the rear wheels, a hand lever provided with a latch and adapted to actuate said brake mechanism, a fixed ratchet segment to hold the hand lever in position, a detent upon the same adapted to limit the movement of the hand lever, and means actuated by the latch to control the movement of the said hand lever.

34. In a variable speed automobile transmission the combination of a frame or casing, a driving shaft, a driving gear thereon, a gear carrying member rotatable about said driving shaft and provided with locking teeth, locking means to engage said teeth, a coil brake for said gear carrying member, a retainer therefor, a coil brake controlling means, compound planet gears carried by said member, one of said planet gears being in mesh with the said driving gear, a driven shaft provided with a driven gear in mesh with one of the aforesaid compound planet gears, said driven gear having a clutch face and being longitudinally movable upon the said driven shaft, means for moving said driven gear along said shaft, means for holding the same in a predetermined position, said driven shaft being mounted in said casing, a second gear carrying member provided with an internal gear in mesh with one of the compound planet gears, said second gear carrying member being rotatable about said driven shaft and provided with a clutch element suitable to engage the clutch face upon the said driven gear, a coil brake cooperating with said second gear carrying member, a retainer therefor, a second coil brake controlling means, a reversing mechanism adapted to actuate said second coil brake controlling means and said locking means, a gear shift lever to actuate said reversing mechanism, a low speed mechanism actuated by a foot pedal and adapted to actuate said second coil brake controlling means, a centrifugal clutch arranged to engage said second gear carrying member with said driven shaft when said second gear carrying member rotates in one direction, emergency braking means, a hand lever therefor adapted to apply a brake upon said second gear carrying member, a segmental ratchet for said hand lever, and a limiting stop and detent.

35. In an automatic variable speed geared power transmission a combination of a frame or casing, a driving shaft, a driven shaft, gearing mechanisms and gear carrying members rotatable about said shafts for driving the driven shaft at various speeds by the driving shaft, spring actuated means attached to said casing to sustain the reaction of the gear carrying members, and means governed by the deflection of said spring actuated means to alter the gearing mechanisms between the driving and the driven shafts.

36. In an automatic variable speed geared power transmission the combination of a driving shaft, a driven shaft, gearing mechanisms and gear carrying members rotatable about said shafts for driving the driven shaft at various speeds by the driving shaft, coil brakes surrounding said gear carrying members, and means actuated by the tension of the coil brakes to alter the gearing mechanisms between the driving and the driven shafts.

37. In an automatic variable speed geared power transmission the combination of a frame or casing, a driving shaft, a driven shaft, gearing mechanisms and gear carrying members rotatable about said shafts for driving the driven shafts at various speeds by the driving shaft, coil brakes elastically anchored to said casing and surrounding said members, and means actuated by the tension of the coil brakes to alter the gearing mechanisms between the driving and the driven shafts.

38. In a power transmission, the combination comprising a driving shaft, a driven shaft, gearing mechanisms and gear carrying members rotatable about said shafts for driving the driven shaft from the driving shaft, brakes for engaging said gear carrying members, and means operated by the tension on said brakes for changing the gearing mechanisms between said shafts.

39. In an epicyclic power transmission, the combination comprising a casing, a driving shaft having a driving gear thereon, a driven shaft having a longitudinally movable driven gear mounted thereon, gear shifting fingers arranged to slide upon said driven shaft and actuate said driven gear, a grooved collar attached to said fingers, a transverse shaft, a yoke lever adapted to move said collar and mounted on said transverse shaft, a shifting lever outside of said casing adapted to rock said transverse shaft, said transverse shaft also being longitudinally movable with respect to said casing and yoke lever, and means for engaging and disengaging said shifting lever and said yoke lever upon moving the transverse shaft longitudinally, and a lever on said transverse shaft adapted to actuate auxiliary mechanism.

40. In a four speed and reverse epicyclic power transmission, the combination of a driving shaft, a driving gear upon the same, a gear carrying member rotatable about said shaft, compound planet gears carried by said member, one of said planet gears engaging said driving gear, a toothed clutch element upon said gear carrying member, a driven shaft, a driven gear adapted to engage one of the planet gears, said driven gear being longitudinally movable along said driven shaft, a rotor freely mounted on said driven shaft and provided with an internal gear meshing with one of the compound planet gears, a clutch element formed on said rotor to engage said driven gear, and selective means to engage said driven gear with one of the planet gears, with the toothed clutch element mounted on the member carrying the planet gears, and with the clutch upon the rotor on the driven shaft.

41. In a power transmission, a driving shaft, a driving gear on said driving shaft, a driven shaft having a driven gear splined thereon, a rotor and a gear carrying member rotatable about the axes of said shafts, a planet gear wheel meshing with said driving gear, a set of internal gear teeth on said rotor meshing with said planet gear, an auxiliary set of teeth formed on said rotor, and means for moving the driven gear into mesh with said planet gear to operate the driven shaft at one speed, and for moving the driven gear wheel into mesh with the auxiliary set of teeth to drive the driven shaft in a reverse direction.

42. In a power transmission, a driving shaft, a driven shaft having a driven gear splined thereon, a gear carrying member rotatable about the axis of said driving shaft, planet gears and an auxiliary gear mounted on said gear carrying member and connected to the driving shaft, a rotor geared to said planet gears and rotatable about the axis of the driven shaft, auxiliary gear teeth formed on said rotor, and means for meshing the driven gear wheel with said planet gears while holding the gear carrying member stationary to drive the driven shaft at one speed, for meshing the driven gear with the planet gear while holding the rotor stationary to drive the driven shaft at a different speed, for meshing the driven gear with the auxiliary gear on the gear carrying member to drive the driven shaft at another speed, and for moving the driven gear into engagement with the auxiliary teeth on the rotor to drive the driven shaft in a reverse direction.

43. In an automatic change speed device, the combination of a drive shaft, a driven shaft, a variable step by step transmission gear device, and means including a gear holding device for controlling the rotation of parts of the transmission device and actuated by the transmission device to establish a selected gear ratio between the shafts when the transmission device is initially operated by the drive shaft.

44. In an automatic change speed device, the combination of a drive shaft, a driven shaft, a variable step by step transmission gear device, and means including a resilient contractible gear holding device for controlling the rotation of parts of the transmission device and actuated by the transmission device to establish a selected gear ratio between the shafts when the transmission device is initially operated by the drive shaft.

45. In an automatic change speed device, the combination of a drive shaft, a driven shaft, a variable step by step transmission gear device operatively connected to said shafts, and means actuated by the transmission device to change the gear ratio between the shafts when the transmission device is operated by the drive shaft upon acceleration thereof and subsequent to a reduction in speed on the part of the drive shaft below the speed of the driven shaft.

46. In an automatic change speed device, the combination of a drive shaft, a driven shaft, a variable step by step transmission gear device operatively connected to said shafts, and a gear holding device for controlling the rotation of parts of the transmission device and actuated by the transmission device to change the gear ratio between the shafts when the transmission device is operated by the drive shaft upon acceleration thereof and subsequent to a reduction in speed on the part of the drive shaft below the speed of the driven shaft.

47. In an automatic change speed device, the combination of a drive shaft, a driven shaft, a variable step by step transmission gear device operatively connected to said shafts, and means actuated by the transmission device to change the gear ratio between the shafts when the transmission device is operated by the driven shaft upon a temporary reduction in speed of the drive shaft below the speed of the driven shaft.

48. In an automatic change speed device, the combination of a drive shaft, a driven shaft, a variable step by step transmission gear device operatively connected to said shafts, and a resilient gear holding device for controlling the rotation of parts of the transmission device and actuated by the transmission device to change the gear ratio between the shafts when the transmission device is operated by the driven shaft upon a temporary reduction in speed of the drive shaft below the speed of the driven shaft.

49. In an automatic change speed device, the combination of a drive shaft, a driven shaft, a variable step by step transmission gear device, and means actuated by the transmission device to establish a selected gear ratio between the shafts when the transmission device is initially operated by the drive shaft, said means being further operable by the transmission device to change the previously selected gear ratio between the shafts to a different gear ratio when the transmission device is operated by the drive shaft upon acceleration of the latter subsequent to a reduction in speed thereof below the speed of the driven shaft.

50. In an automatic change speed device, the combination of a drive shaft, a driven shaft, a variable step by step transmission gear device, and a resilient contractible gear holding device for controlling the rotation of parts of the transmission device and actuated by the transmission device to establish a selected gear ratio between the shafts when the transmission device is initially operated by the drive shaft, said resilient gear holding device being further operable by the transmission device to change the previously selected gear ratio between the shafts to a different gear ratio when the transmission device is operated by the drive shaft upon acceleration of the latter subsequent to a reduction in speed thereof below the speed of the driven shaft.

51. In an automatic change speed device, the combination of a drive shaft, a driven shaft, a variable step by step transmission gear device operatively connected to said shafts, and means actuated by the transmission device to establish a gear ratio between the shafts when the transmission device is operated by the drive shaft and upon acceleration of the same subsequent to a reduction in speed thereof below the speed of the driven shaft, said means being further operable by the transmission device to change the previously established gear ratio between the shafts to a different gear ratio when the transmission device is operated by the driven shaft upon a temporary reduction in speed of the drive shaft below the speed of the driven shaft.

52. In an automatic change speed device, the combination of a drive shaft, a driven shaft, a variable step by step transmission gear device operatively connected to said shafts, a resilient contactible gear holding device for controlling the rotation of parts of the transmission device and actuated by the transmission device to establish a gear ratio between the shafts when the transmission device is operated by the drive shaft and upon acceleration of the same subsequent to a reduction in speed thereof below the speed of the driven shaft, said means being further operable by the transmission device to change the previously established gear ratio between the shafts to a different gear ratio when the transmission device is operated by the driven shaft upon a temporary reduction in speed of the drive shaft below the speed of the driven shaft.

53. In an automatic change speed device, the combination of a drive shaft, a driven shaft, a variable step by step transmission gear device, a gear holding device for controlling the rotation of parts of the transmission device and actuated by the transmission device to establish a selected gear ratio between the shafts when the transmission device is initially operated by the drive shaft, said gear holding device being further adapted to be actuated by the transmission device to change the previously established gear ratio between the shafts to a second and different gear ratio when the transmission device is operated by the drive shaft upon acceleration thereof and subsequent to a reduction in speed on the part of the drive shaft below the speed of the driven shaft, said gear holding device being still further operable by the transmission device to change the second gear ratio established between the shafts to a third and different gear ratio when the transmission device is operated by the driven shaft upon a temporary reduction in speed of the drive shaft below the speed of the driven shaft.

54. In a transmission, the combination of a frame or casing, a driving shaft, a driven shaft, gearing mechanisms and gear carrying members rotatable about said shafts for driving the driven shaft from the driving shaft, coil brakes surrounding said gear carrying members, movable anchor bolts to which the coil brakes are connected, springs interposed between the heads of said anchor bolts and the casing for holding the bolts in fixed position until a predetermined tension in the coil brakes is exceeded, a double ended rocking lever operated by said anchor bolts and having a segmental gear thereon, a spring plunger lever mounted in the casing and having a segmental gear in mesh with the segmental gear on the aforesaid double ended lever and a projecting arm, a cam roller for said plunger, a cam fixed in the casing adapted to be followed by the spring plunger roller, a brake controller for one of said brakes adapted to be engaged by the arm on said spring plunger lever, a bell crank lever mounted upon the axis of the said double ended lever, one end of which bell crank lever is adapted to be engaged by one of the said anchor bolts, a sliding gate operable by the other end of said bell crank, and spring acuating means for said sliding gate, said gate having a face arranged to engage and lock the coil brake controller when one of the anchor bolt springs yields under the tension of the coil brakes.

In witness whereof I have hereunto set my hand.

ALEXANDER DOW.